US010857450B1

(12) United States Patent
Aman et al.

(10) Patent No.: US 10,857,450 B1
(45) Date of Patent: Dec. 8, 2020

(54) PHYSICAL-VIRTUAL GAME BOARD AND CONTENT DELIVERY PLATFORM

(71) Applicants: James Aman, Celebration, FL (US); Jeffery Paul Cheesman, Upper Saddle River, NJ (US)

(72) Inventors: James Aman, Celebration, FL (US); Jeffery Paul Cheesman, Upper Saddle River, NJ (US)

( * ) Notice: Subject to any disclaimer, the term of this patent is extended or adjusted under 35 U.S.C. 154(b) by 53 days.

(21) Appl. No.: 16/536,929

(22) Filed: Aug. 9, 2019

Related U.S. Application Data

(63) Continuation-in-part of application No. 16/027,301, filed on Jul. 4, 2018, and a continuation-in-part of application No. 15/975,236, filed on May 9, 2018, and a continuation-in-part of application No. 16/144,161, filed on Sep. 27, 2018.

(60) Provisional application No. 62/716,392, filed on Aug. 9, 2018.

(51) Int. Cl.
*A63F 3/00* (2006.01)
*A63F 13/21* (2014.01)

(52) U.S. Cl.
CPC ...... *A63F 3/00214* (2013.01); *A63F 3/00634* (2013.01); *A63F 3/00643* (2013.01); *A63F 13/21* (2014.09); *A63F 2003/00662* (2013.01)

(58) Field of Classification Search
CPC ........ A63F 3/022; A63F 3/00643; A63F 9/24; A63F 13/214; A63F 2003/00662; A63F 2003/00665; A63F 2003/00668; A63F 2003/00671; A63F 2009/2402; A63F 2009/2486; A63F 2009/2489
See application file for complete search history.

(56) References Cited

U.S. PATENT DOCUMENTS

| 5,853,327 A * | 12/1998 | Gilboa | A63F 3/00643 463/39 |
| 9,717,981 B2 * | 8/2017 | Robbins | A63F 3/00643 |
| 2012/0077593 A1 * | 3/2012 | Sarmenta | A63F 3/00643 463/40 |
| 2017/0232348 A1 * | 8/2017 | Williams | A63F 13/235 463/31 |
| 2018/0178113 A1 * | 6/2018 | Knippen | A63F 3/00643 |

* cited by examiner

*Primary Examiner* — Lawrence S Galka

(57) ABSTRACT

A physical-virtual gaming platform comprising a game board overlay including logical locations for the placement of game pieces, where the overlay is placed in relationship to the combination of a game board and game pieces. The combination of the game board and game pieces include electronic means that are in communication with a computing device. The computing device processes the information provided by the electronic means to determine the logical location of a game piece with respect to the game overlay and then provides a sensory output to gamers based at least upon the determined locations. The game overlay can be active and in communication with the computing device such that the overlay is operated to alter one or more logical locations thereby changing game play in response to determined game piece movements. The platform includes visualization and audio devices for providing customized visual and audio experiences.

23 Claims, 18 Drawing Sheets

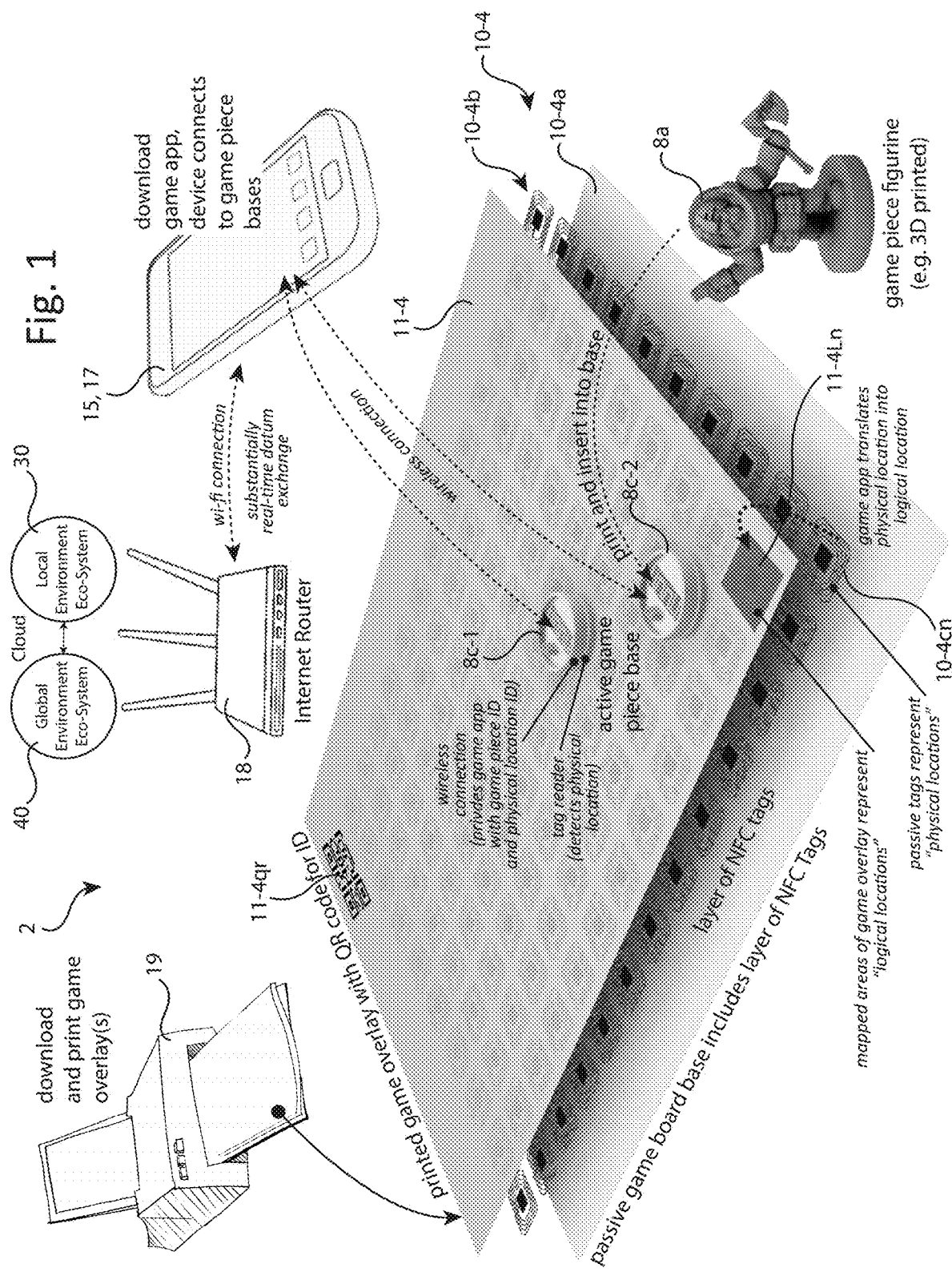

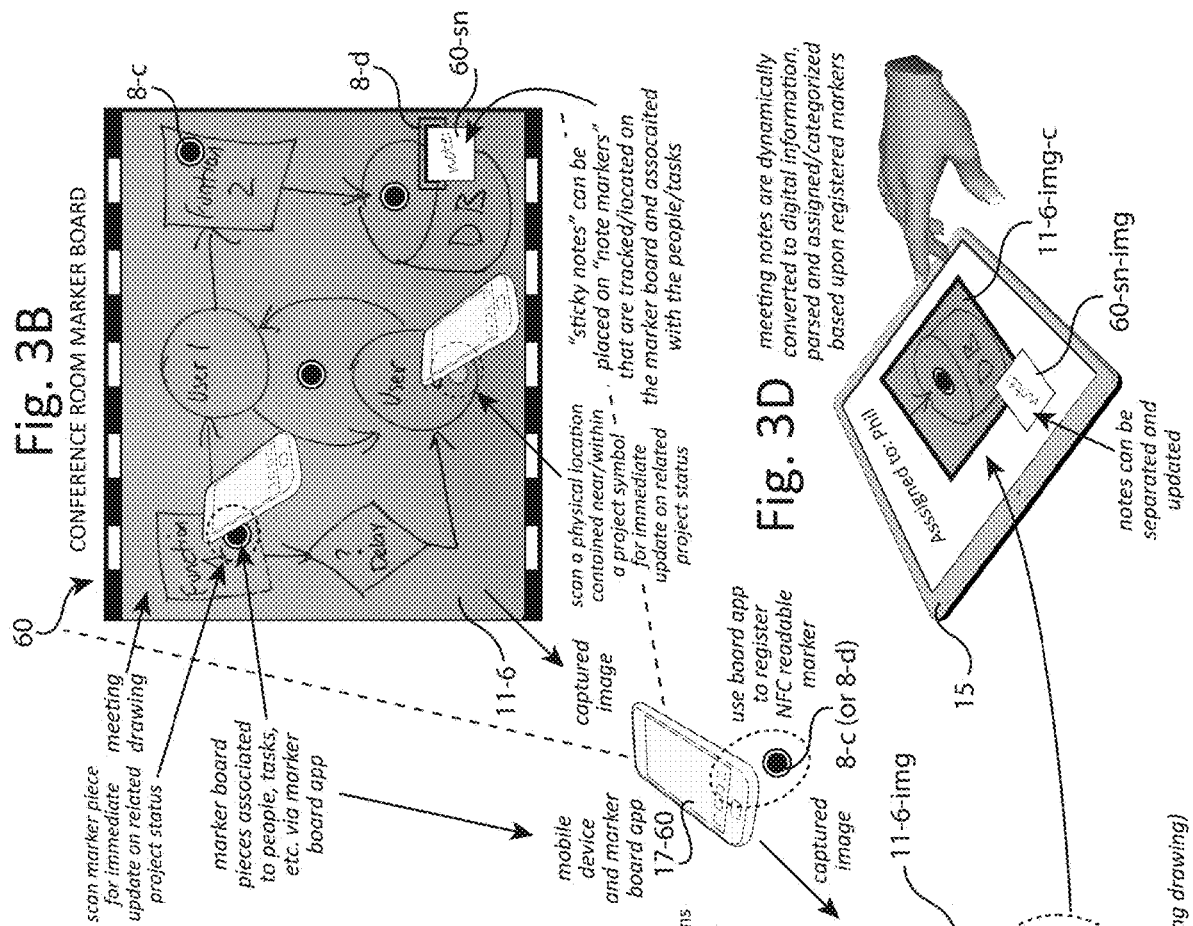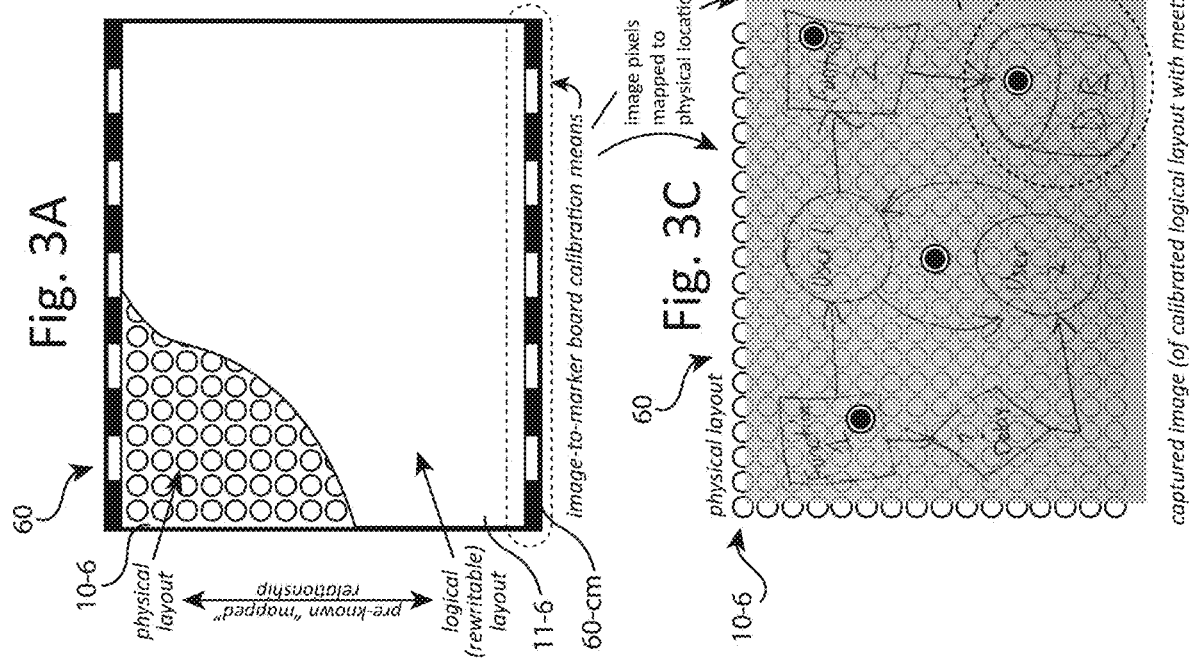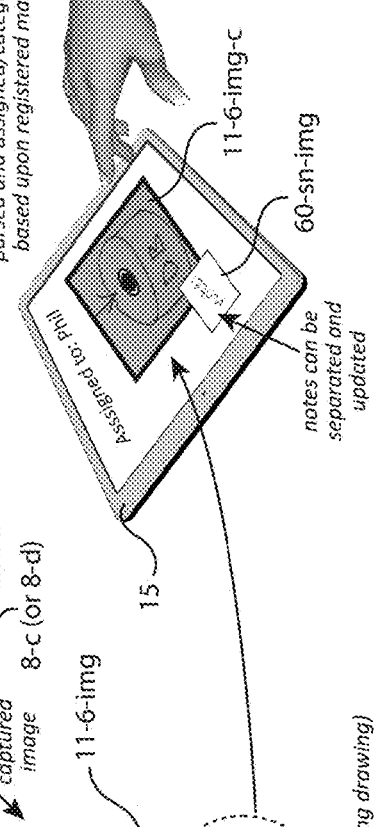

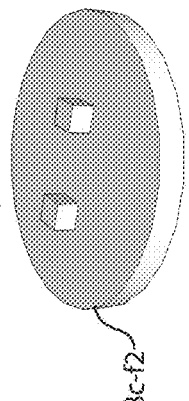

Fig. 5A    Fig. 5B 8c-f1 — game piece base with or without display, for use without game piece figurine 8c-f2 — game piece base without display, for use with game piece figurine

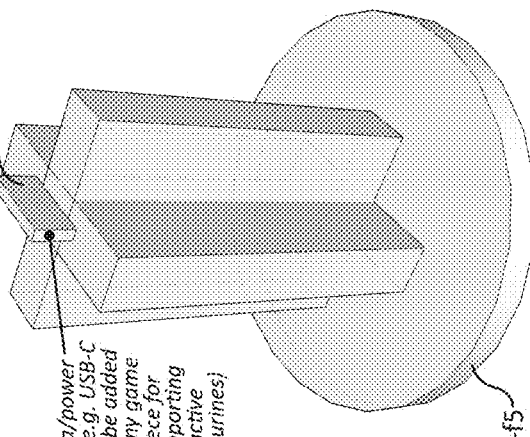

Fig. 5E 8c-f5-pd — data/power port, e.g. USB-C (can be added to any game piece for supporting active figurines)

8c-f5 — game piece base with dual-vertical antenna shaft, and data-power port for use with active game piece figurine

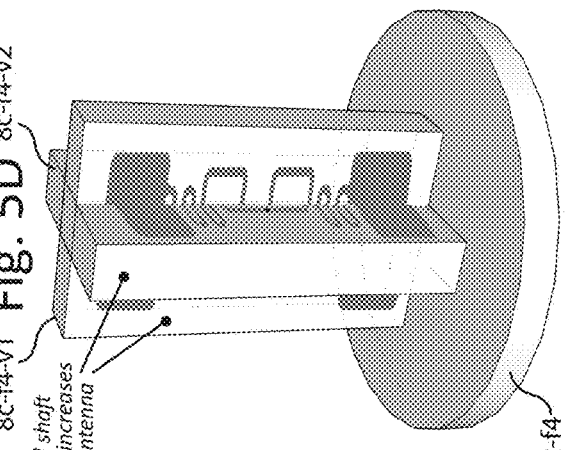

Fig. 5D 8c-f4-v1, 8c-f4-v2 — dual shaft further increases size antenna 8c-f4 — game piece base with dual-vertical antenna shaft, for use with or without game piece figurine

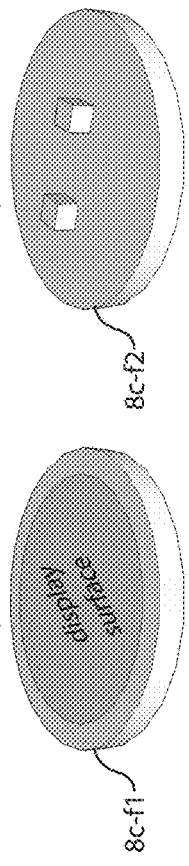

Fig. 5C 8c-f3-v1 — larger space for increased size antenna (especially for passive RFID energy harvesting)

8c-f3 — game piece base with vertical antenna shaft, for use with or without game piece figurine

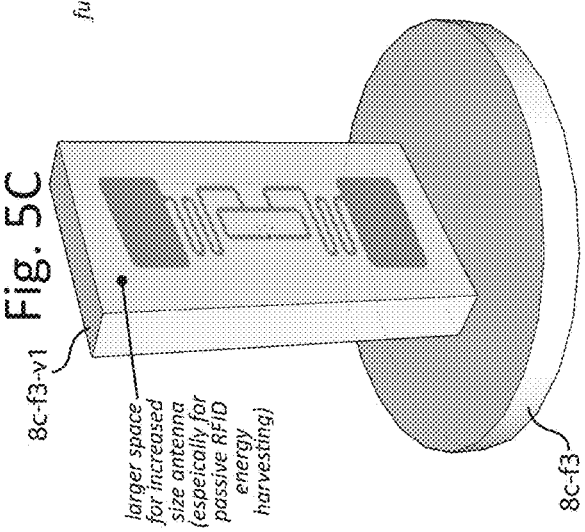

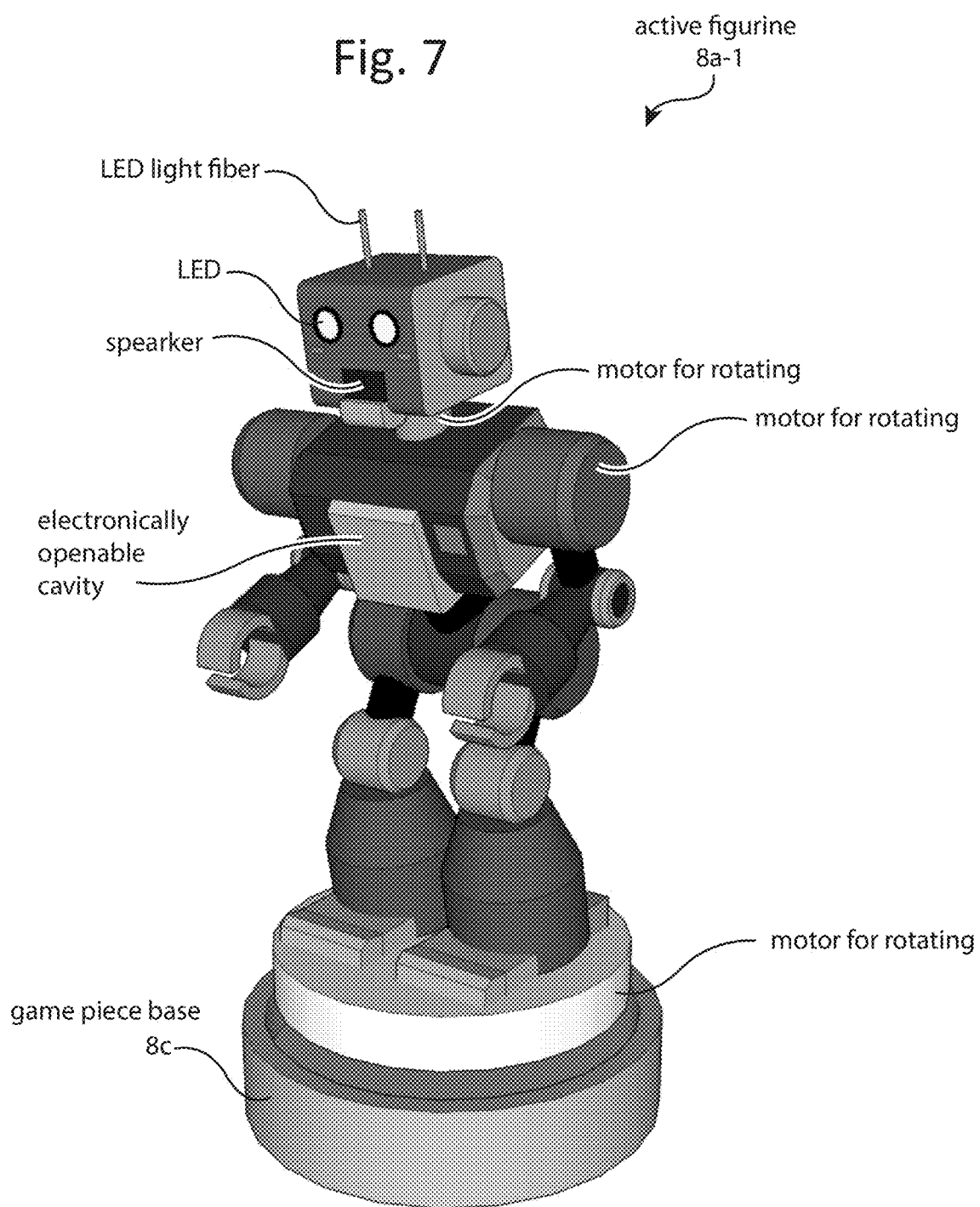

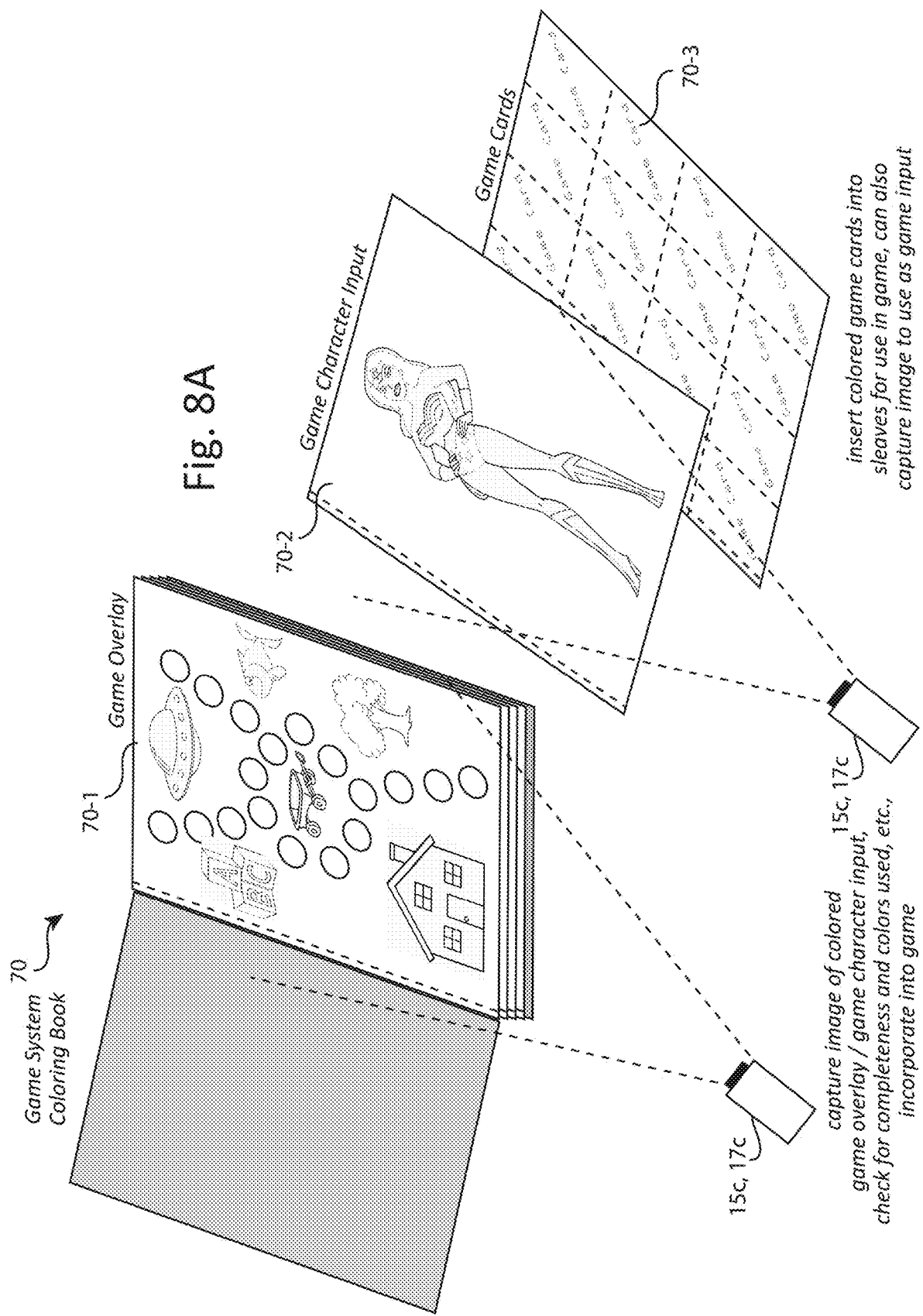

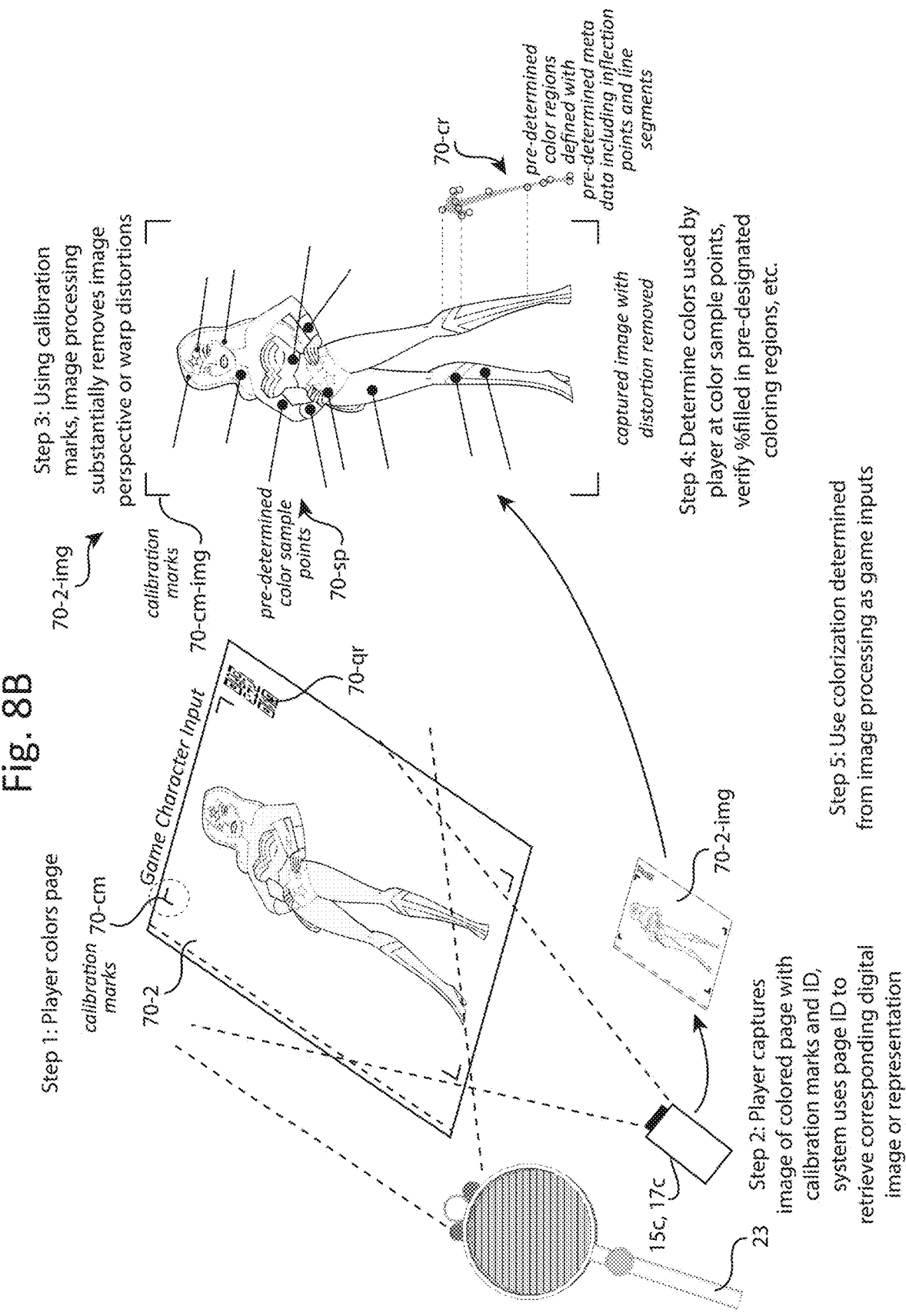

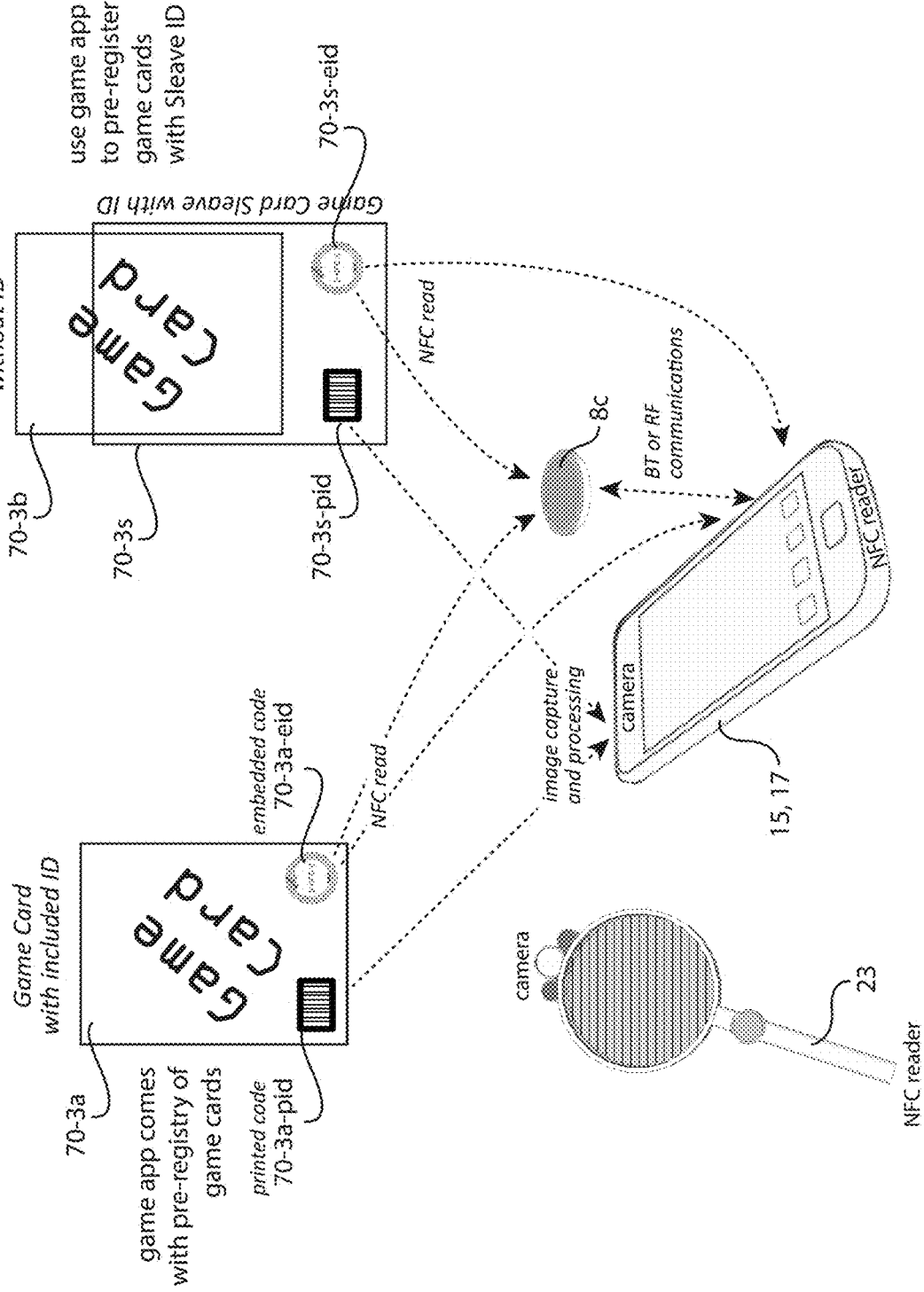

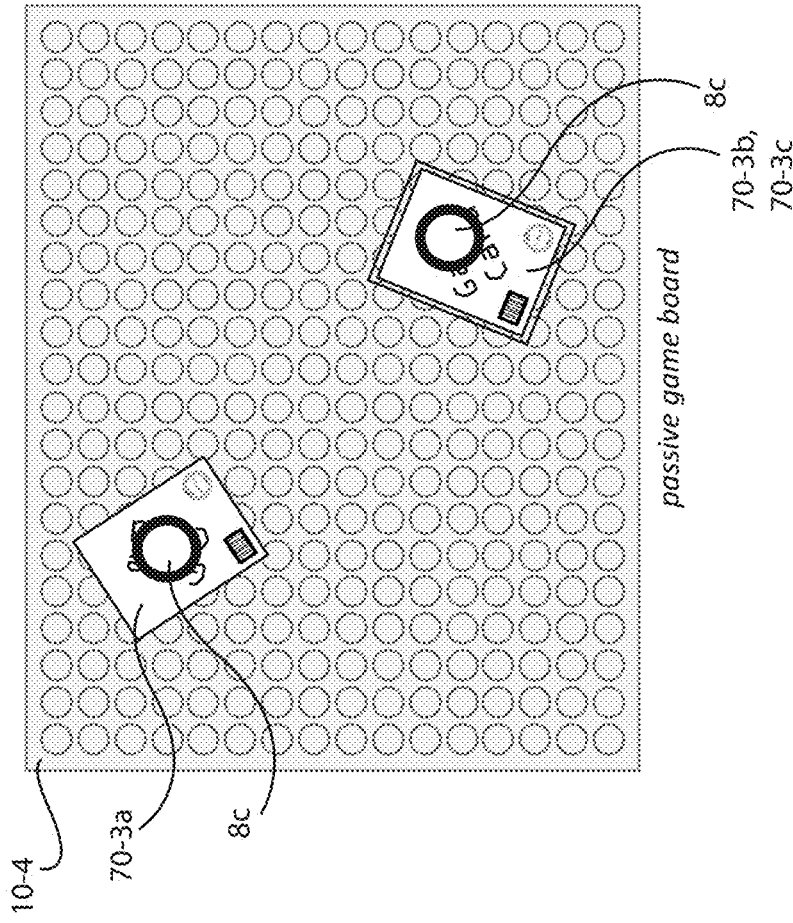
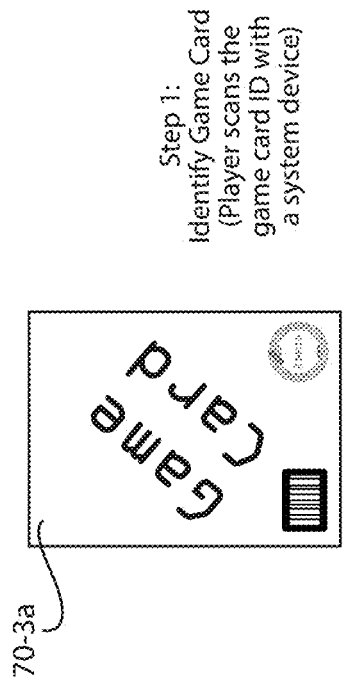
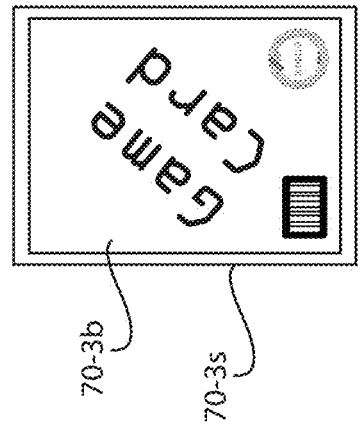

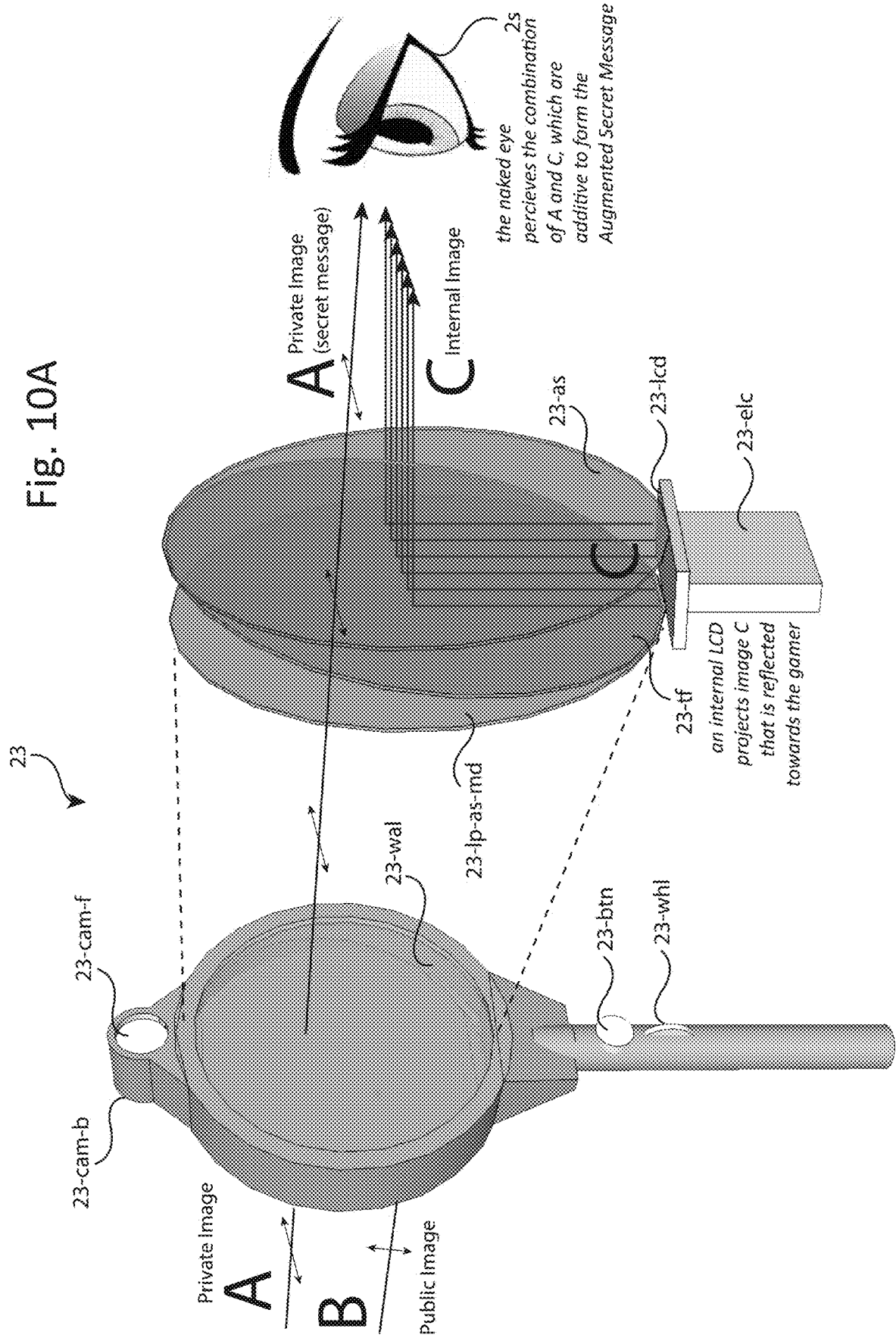

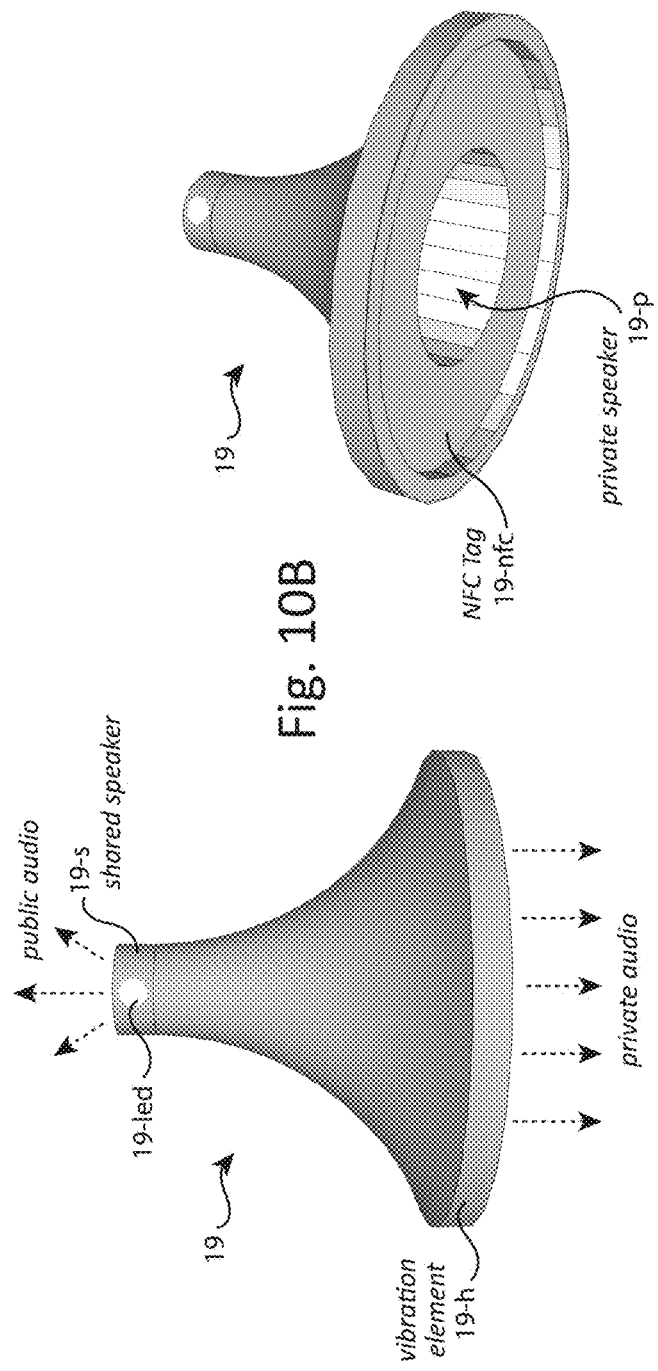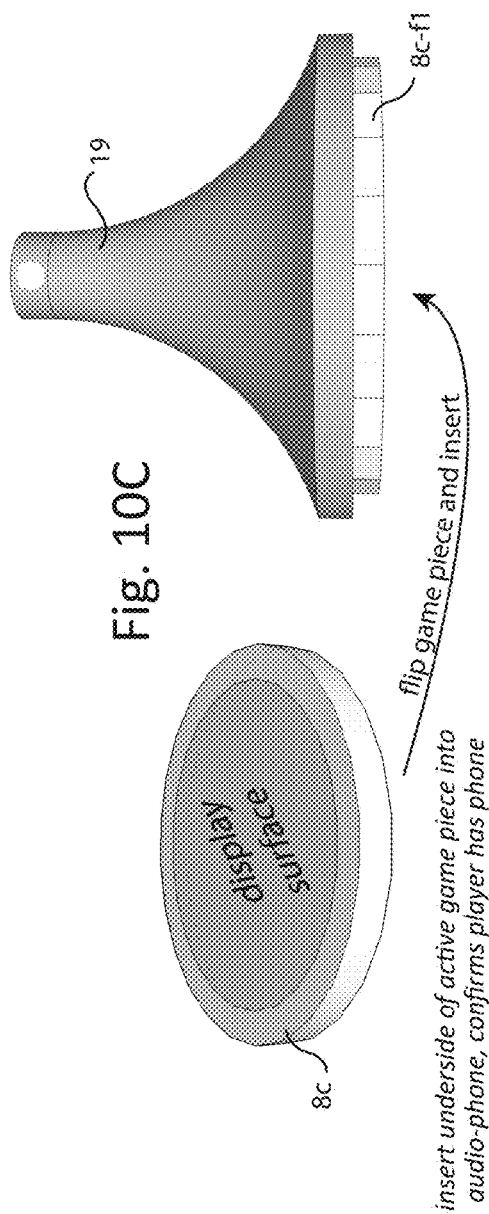

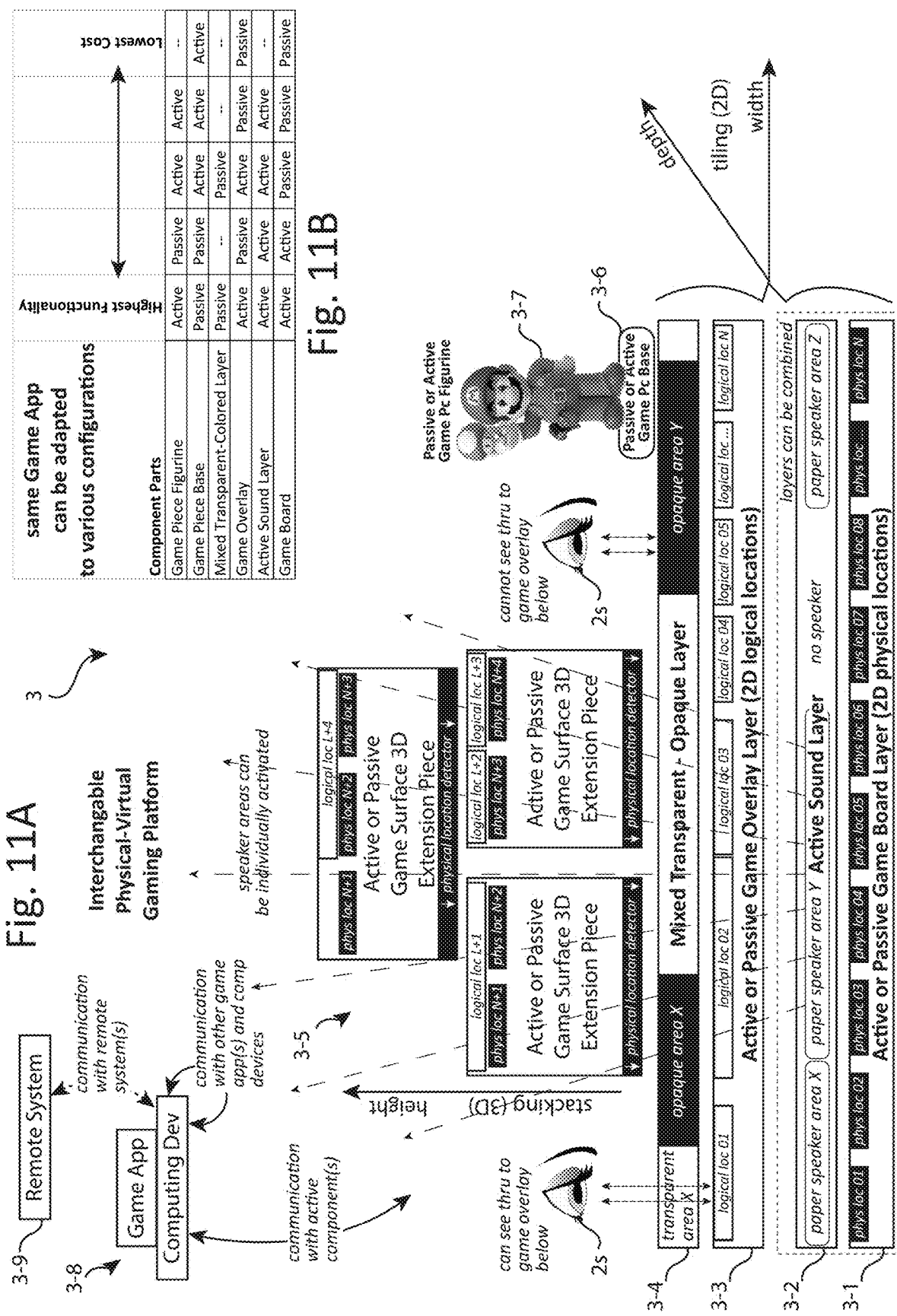

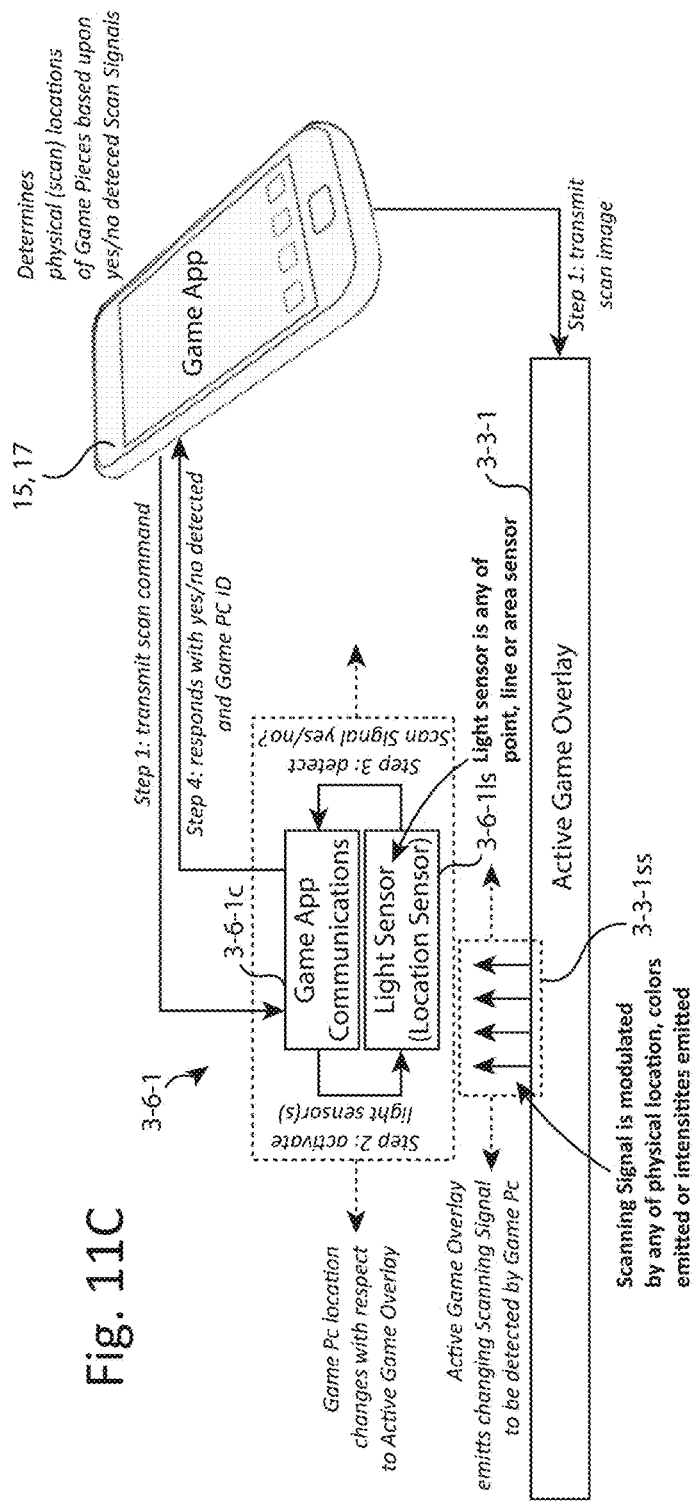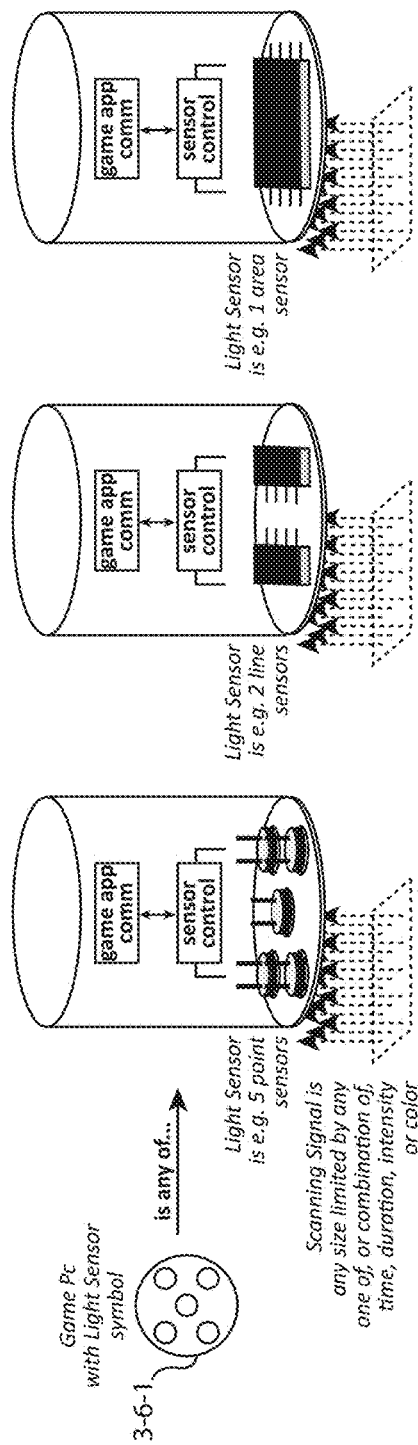

PHYSICAL-VIRTUAL GAME BOARD AND CONTENT DELIVERY PLATFORM

CROSS-REFERENCE TO RELATED APPLICATIONS

This application claims the benefit of U.S. Provisional Application No. 62/716,392 filed on Aug. 9, 2018. The present application is a continuation-in-part of the U.S. Non-Provisional application Ser. No. 16/027,301 entitled PHYSICAL-VIRTUAL GAME BOARD AND CONTENT DELIVERY SYSTEM filed on Jul. 4, 2018. The present application is a continuation-in-part of the U.S. Non-Provisional application Ser. No. 15/975,236 entitled INTERACTIVE OBJECT TRACKING MIRROR-DISPLAY AND ENTERTAINMENT SYSTEM filed on May 9, 2018. The present application is a continuation-in-part of the U.S. Non-Provisional application Ser. No. 16/144,161 entitled INTERACTIVE GAME THEATER WITH SECRET MESSAGE IMAGING SYSTEM filed on Sep. 28, 2018.

FIELD OF INVENTION

The present invention relates to physical board games using a generic game board with replaceable game overlays supporting a multiplicity of games. The generic game board and game pieces cooperate in various configurations to allow for a controlling game app to determine the on-going location of the game pieces with respect to the logical locations defined by the replaceable game overlays in a mapped relationship with fixed physical locations incorporated into the generic game board. The game app provides simultaneous virtual gaming experiences including retrieving and outputting information and content maintained by an entity on a remote system, where the timing of the retrieving and outputting is based at least in part upon the detected movements of the game pieces.

BACKGROUND OF THE INVENTION

In the parent application, U.S. Non-Provisional application Ser. No. 16/027,301 entitled PHYSICAL-VIRTUAL GAME BOARD AND CONTENT DELIVERY SYSTEM filed on Jul. 4, 2018, the present inventor disclosed a physical-virtual board game that amongst other novel features, combined the socialization and physicality of board games with the never-ending possibility of virtual games. One key aspect was a passive game overlay that is placed over an active and generic board game base. The game overlay is ideally very low cost, such as paper, and provides the visualization of the board game surface representative of the game, including specific "logical" locations for placing board game pieces (such as a square in a succession of squares) or general locations where game pieces may be placed (such as the shape of states in a map of the United States.) The game overlay included a means for unique identification, for example a printed bar code. The generic active game board connected either physically or wirelessly to a computing device, where the computing device was preferably shared amongst all players and included a game app that was downloaded from a remote server/game app store. The game app running on the shared computing device can receive or determine the unique identification of the game overlay. The board game base was also described as having a unique identification. Using pre-known mapping information retrievable based at least upon the unique identification of the board game overlay, the game app was able to register the game overlay to the game board base, where the game board base includes a multiplicity of "physical" locations arranged for example as a row/col matrix.

In the parent application, the game pieces were passive, and the active board game base used a sensing technology to detect the passive game pieces as they rested upon the game overlay, where the game overlay was resting upon the game base. The generic game board base detected and communicated to the game app the physical location of each game piece along with a unique game piece ID. The game app used the pre-known mapping information to translate the physical location into a logical location for each game piece and updated an ongoing game database. The game app was also described as retrieving and displaying virtual content on a shared computing device (or private computing devices such as smart phones being used by a single player also including a game app) or sending action control signals to one or more game devices (such as wearables or animatronics) that causes a change in the state of the game device that was perceivable by at least one player.

Many other novel and useful aspects where taught in the prior copending application, all of which are included with the present teachings.

BRIEF SUMMARY OF THE INVENTION

The present application builds upon these prior teachings and provides for an alternate embodiment in which the generic game board base is passive rather than active while the game pieces are active rather than passive. In the preferred alternate embodiment, the passive game base includes a multiplicity of NFC (or similar technology hereafter "NFC") readable tags and the active pieces include at least a communications component for communicating with the game app and a location sensing component for detecting one or more of the NFC readable tags included with the game base above which the active game piece is currently located. Variations of this alternate embodiment of a passive game board and active game pieces rely upon other technologies, where the similarity is that active game piece emits energy that transmits through the game overlay to interact with passive electronics embedded within or attached upon the game board base for the purposes of determining a physical location for translation by the game app into a logical location.

Like the parent application, the preferable game overlay is paper (e.g. printed on a home printer) that is interposed between the generic game board base and the game pieces for providing for any game layout as well as a never-ending game of multiple layouts. Also, like the parent application, variations of the game overlay are active such that the overlay can be electronically altered for example to provide for entirely different games (e.g. Monopoly verses Life) or to change the game layout dynamically during a game (e.g. to play an ever increasingly difficult set of levels in a single game, like playing multiple levels in a video game.) The present invention teaches a variation where the game overlay is a flexible OLED and the active game pieces operate in response to scanning signals emitted by the game app to determine their unique board game locations, where the scanning signal is a detectable change in the light emitted by the flexible OLED (or similar technology hereafter "OLED") and where the active game pieces include light sensor electronics such as a photo-diode. Using this variation of an active game overlay and light sensing active game pieces, the need for the passive game board base underneath the active game overlay is obviated.

The present application teaches that the combined approaches of an active or passive game board, an active or passive game overlay, and active or passive game pieces combine to form a universal gaming platform. This universal gaming platform is extended by an additional active sound layer providing localized sounds perceived by the player as being emitted by the game board, where a possible technology is a new type of paper speakers now emerging in the marketplace, to be discussed herein. The platform is also shown herein to be "tileable," meaning that for example a preferred game board/game overlay physical area is 17"×11", where using two game boards side by side provides a physical piece tracking area of 17"×22" (roughly the size of a traditional Monopoly game board.) More and more game boards can be used in conjunction to increase the physical area used as the playing surface. The 17"×11" size matches the tabloid paper used in a traditional U.S. market home printer such that gamer can purchase a single generic gameboard and pieces platform and then download a specific game app onto their computing device and print the specific game overlay(s) on their home printer.

The present application also teaches game board extension pieces that can be placed on top of the game overlay to build up the game board into the third (height) dimension, something herein referred to as "stacking." For example, a game that uses 4 boards of 17"×11" forms a combined size of 34"×22" upon which an extension piece in the form of a castle or a mountain is added such that the game pieces are moved in three dimensions. Game extension pieces are shown to be either active or passive and designed to be matched with the type of underlying generic game board.

Like the prior taught active game board base and passive game overlay, the herein passive game board base also includes a unique identifier, for example embodied as an NFC tag detectable by a game piece or a computing device supporting NFC communications, or alternately as a bar code or alpha numeric board number. The game app receives or determines the game board base ID which is used to retrieve the game board base size and layout of detectible physical locations for mapping into the logical locations of the game overlay.

Active game piece bases are described in multiple exemplary basic shapes supporting various technological advantages such as providing a larger (vertical) surface area for comprising RF antennae usable for harvesting RF energy for activating passive or semi-passive game piece base functions. Game bases are taught for supporting connections to passive or active game piece figurines. Game bases are also shown without support for an attached figurine, but instead with support for a small display that is usable for outputting game information. Game bases and/or figurines as also taught to include output means such as LEDs, speakers, haptic feedback, etc.

The present teachings are also shown to be adaptable for providing a new type of marker board where the combination of the passive game board with a game overlay are vertically wall mounted. The overlay is preferably made from any of materials generally referred to as a re-markable surface for making erasable drawings. The active game pieces are then magnetized becoming marker board pieces that can placed on the remarkable surface (assuming an added metallic layer for attracting the board pieces.) Using for example a smart phone with marker board app, a meeting member can associate any given marker board piece with project management datum such as staff names, priorities, dates, etc. such that the associated datum is then further associated with the figures and symbols of the drawing. A picture is captured of the re-markable surface drawing preferably using the smart-phone and board app, where the app performs image processing to sub-divide the entire drawing into the component symbols and writing detected in the drawing. The maker board pieces are located with respect to the underlying "game board" physical locations, which are mappable to the re-markable surface and therefore also to the entire drawing as well as sub-divided symbols, such that the placement of a marker board piece is dynamically associated with the drawing symbols.

The present invention also teaches a game coloring book comprising for example perforated pages, where some of the pages are the game overlays for a game, other pages depict virtual characters in the game, while still other pages represent game cards to be used in the game. It is shown that a player can color in any of these pages after which an image is captured using any of multiple apparatus, where the captured image is processed to determine both the extent to which the page has been fully colored in and the colors chosen by the player(s). It is shown herein that the colors for example chosen for a game character can then be applied to the virtual content such that a player feels as if they have colored in their own virtual characters. The game cards are taught in both an active variation that includes electronics or a passive variation that is fit into an active game card sleeve. Game cards are also taught to be detectable as they are placed onto a game board, where both the game card ID and the physical location where the game board is played are determined by the system.

And finally, a magnifying/spy glass game device is taught based upon a prior copending application for further use with the present and parent teachings. The magnifying/spy glass allows a player to view the game board and pieces, where the game app uses pre-know information about the game board overlay and pieces as well as current information about the tracked game state to cause for example various forms of AR to present secret video messages or to animate the game figurines or game overlay spaces. A small audio game device is taught herein to communicate with the game app and to function both as a public/shared game speaker and when held up to the ear a private speaker for giving secret messages to a player. Both the magnifying glass and audio speaker include the ability to read the ID of a passive game piece or the location on a passive game board, or to be read by an active game piece or an active game board, providing increased gaming possibilities. Other apparatus and methods are also herein provided directly or suggested by the teachings herein.

BRIEF DESCRIPTION OF THE SEVERAL VIEWS OF THE DRAWING

FIG. 1 is a perspective drawing of the present physical-virtual board game and content delivery system 2 that is an alternative embodiment of the copending physical-virtual board game and content delivery system 1 taught in the parent application. Like system 1, the present system 2 comprises a game board (herein 10-4) a game board overlay (herein 11-4) game piece bases (herein for example 8c-1, 8c-2) that optionally accept game piece figurines 8a, a game app running on a computing device 15 or 17, where the computing device 15 or 17 preferably has access to a remote system such as 40 or 30 for providing the game app and related datum or receiving game app related datum. In the copending system 1, the game board (therein 10) was active and included powered electronics while the game piece bases (therein 10b) were passive and included passive electronic devices. In the present application, game board 10-4 is passive and includes passive electronic devices while the game piece bases such as 8c-1 and 8c-2 are active and include powered electronics, where the power for activating the game piece bases such as 8c-1 and 8c-2 may be remote power such that in the strictest sense the game piece base 8c-1 and 8c-2 is then also a passive device.

FIG. 3A depicts a vertically oriented game board 10-6 with a rewriteable surface overlay 11-6 that is implemented as a white-board 60. Game board 10-6 can be active (co-pending system 1) or passive as in the present system 2 and as depicted in the present figure. White-board 60 preferably further comprises a calibration mark 60-cm for use aligning physical and logical locations with images captured of the white-board 60.

FIG. 3B depicts the marker board 60 implemented based upon the teachings of either the copending system 1 or present system 2 being used to diagram an exemplary company software project. In the diagram there are several symbols, in relation to which at some point one or more markers such as 8-c or 8-d are placed/attached onto the board 60. Marker 8-d is in a form for accepting notes such as "sticky notes." Marker board app running on a computing device such as a smart phone 17-60 can communicate with either an active marker board 60 (based upon system 1) or active marker pieces such as 8-c or 8-d (based upon the present system 2.) Marker board app running on device 17-60 is also capable of capturing images of marker board 60.

FIG. 3C depicts an image 11-6-img captured of marker board 60 by marker board app and computing device 17-60, where image 11-6-img is calibrated to physical locations layer 11-6 preferably using visual calibration markings 60-cm, and where app 17-60 is capable of removing distortion from the captured image 11-6-img and then clipping the image 11-6-img into one or more sub-images of marker board 60 based upon for example the symbols detected to be written upon the marker board 60. Marker board app 17-60 is then also able to associated one or more marker board markers such as 8-c and 8-d with one or more symbols found to be for example within the proximity of maker 8-c or 8-d, where the physical location of a marker such as 8-c or 8-d is determined by the system (1 or 2) using the physical locations layer 11-6 and then mapped to the logical locations of the marker board 60 and therefore also the image 11-6-img and any of its clipped sub-images.

FIG. 3D depicts a computing device 15 being used by an individual to review a portion of image 11-6-img that has been clipped as 11-6-img-c. After clipping, computing device 15 for example is further updated with any changes in associated markers such as 8-d including any associated marker related datum, including a sticky note image 60-sn-img, where the sticky note image 60-sn-img is clipped from an image captured for example by the marker board app on device 17.

FIG. 5A depicts either of game piece bases 8c-RF or 8c-BT implemented in the form of a coin-shaped piece 8c-f1 including a display, where the display uses any technology including electrochromic, LED, OLED, PMOLED, AMO-LED, E-ink, etc. Coin-shaped piece 8c-f1 lacks the capability for attaching a figurine 8a.

FIG. 5B depicts either of game piece bases 8c-RF or 8c-BT implemented in the form of a coin-shaped piece 8c-f2 including mounting for attaching a figurine 8a. Coin-shaped piece 8c-f1 lacks a display interface.

FIG. 5C depicts game piece base 8c-RF implemented in the form of a coin-shaped piece 8c-f3 including a vertical shaft for holding an RFID antenna to improve either or both connectivity or energy harvesting. The vertical shaft is also usable for attaching a figurine 8a or attaching a display.

FIG. 5D depicts game piece base 8c-RF implemented in the form of a coin-shaped piece 8c-f4 including two vertical shafts for holding additional RFID antenna to improve either or both connectivity or energy harvesting. The vertical shafts are also usable for attaching a figurine 8a.

FIG. 5E depicts a game piece form 8c-f5 that is like 8c-f4 where a power and data connector has been added for communicating with an active figurine 8a. The additional data port can be of any technology for example including variations of USB, and can be implemented on other forms such as 8c-f2 and 8c-f3 for likewise controlling and communicating with an active figurine 8a.

FIG. 7 is a perspective view of an exemplary active figurine 8a-1 that is attached to a game piece base that includes a power and data connection for powering and providing to the active figurine 8a-1 action control signals. Active figurines such as 8a-1 preferably comprise one or more forms of electronically controllable outputs perceivable to a game player for example including light emitters, sound emitters as well as parts that move, where the active figurine receives action control signals from the game app and computing device 15, 17 as transmitted through the game piece base, and where the action control signals are at least in part based upon any of game datum.

FIG. 8a depicts a game system coloring book 70 comprising pages for coloring parts and elements of a game including: game overlays 70-1, game character inputs 70-2 and game cards 70-3. Images of a color page are captured by a camera on devices such as game app computing devices 15 or 17, or on special game toys including a camera such as a magnifying glass 23 (see FIGS. 10A and 10D.) Captured images are analyzed by the system for game input, where game input includes verification of completeness, selecting colors for use in the virtual content associated with the game, and interpreting colors for enabling or disabling features and aspects of the game.

FIG. 8b depicts an exemplary colored page 70-2 that is a game character input page, where a player first colors the page 70-2 with their choices of colors and then captures an image 70-2-img of the colored page 70-2 that is processed by the system to determine game inputs including any of: 1) verifying that pages have been sufficiently colored; 2) selecting colors for use in virtual game content based upon colorization choices of the player, or 3) using colorization choices of the player to enable or disable features and aspects of the game. Any of coloring book 70-2 pages including game overlays 70-1, game characters 70-2 and game cards 70-3 can be processed in this manner for determining game inputs.

FIG. 9A depicts a preferred game card 70-3a within an included game card ID, such as a printed ID 70-3a-pid, e.g. a bar code, or an embedded ID 70-3a-eid, e.g. an NFC tag. Players input the ID 70-3a-pid or 70-3a-eid of a game card 70-3a using for example the game app running on a computing device 15 or 17, where the computing device 15 or 17 further includes for example a camera for capturing and processing printed ID 70-3a-pid and/or an NFC reader for capturing and processing an embedded ID 70-3a-eid. Players preferably have access to a game toy device such as magnifying glass 23 that also includes either or both a camera and an NFC reader, and therefore device 23 can also be used by a player to input a game card ID such as 70-3a-pid or 70-3a-eid.

FIG. 9B depicts a game card 70-3b that does not include a game card ID, where game card 70-3b is then inserted into a game card sleeve 70-3s, where sleeve 70-3s further comprises either or both of a printed ID 70-3s-pid or embedded ID 70-3s-eid, and where IDs 70-3s-pid or 70-3s-eid are detectable by devices such as 15, 17 or 23. A player preferably uses the game app running on a computing device such as 15 of 17 to register individual game cards without IDs 70-3b, matching the game cards 70-3b with the game card sleeves 70-3s into which they have been inserted.

FIG. 9C depicts either of a game card with ID 70-3a or a game card without ID 70-3b inserted into a sleeve 70-3c being identified in a step 1 of game card play, where preferably the player is first prompted by the game app on a device 15 or 17 to identify a game card to play, after which the player uses any of system devices to scan the registered game card 70-3a ID or game card sleeve 70-3c ID, and where system devices include any of computing devices 15 or 17, active game pieces 8c, an active game board 10b (see parent application) or a game toy such as magnifying glass 23.

FIG. 9D depicts an optional step 2 of game card play where a game card with ID 70-3a or a game card without ID 70-3b inserted into a sleeve 70-3c has been placed onto a game overlay after which any of system devices including the game app running on a computing device 15 or 17, an active game piece 8c, an active game board (10b of the parent application) or a game toy such as magnifying glass 23 are used to determine a physical location over which the game card 70-3a or 70-3b has been placed, where the physical location is translatable into a logical location and also usable to direct any of system 2 (or 1) responses to the playing of the game card by the player.

FIG. 10A depicts a magnifying/spy glass 23 that was first taught in the parent application No. 62/564,306 entitled INTERACTIVE GAME THEATER WITH SECRET MESSAGE IMAGING SYSTEM filed on Sep. 28, 2017. The glass 23 as portrayed in FIG. 10A is unmodified with respect to the prior teachings and is being used as a means for a player to view for example either of the game board overlay or a game piece, where upon the game app provides a customized augmented reality that can include secret messages.

FIG. 10b depicts a public/private audio game device 19 providing shared audio intended for either all players to hear, or a secret message intended for only a select player to hear.

FIG. 10C depicts audio game device 19 including an NFC reader for use in identifying the game piece ID being used by a player, such that secret messages are only provided after confirmation of the player/game piece ID.

FIG. 11a is a side-view block diagram showing the components of a universal physical-virtual gaming platform 3 comprising a game board layer 3-1, an audio layer 3-2, a game overlay layer 3-3 and a mixed transparency layer 3-4. The layers can be mixed and matched for providing different benefits, where not all layers are required. The layers can be tiled to form larger areas for providing larger game surfaces. The layers can be extended vertically using extension pieces 3-5, where both the game board and extension pieces 3-5 preferably share similar active or passive technology for tracking passive or active game pieces 3-6, where game pieces 3-6 optionally include attached figurines 3-7. Platform 3 includes a game app 3-8 for communicating with all active platform components and executing and tracking an on-going game. Game app 3-8 is in optional communications with a remote system 3-9, where uses for the remote system 3-9 include providing the game app 3-8, virtual content and action control signals.

FIG. 11B provides a table for showing various, but not all, possible combinations of platform 3 components for use by players to play a game.

FIG. 11C is a block diagram depicting a game app running on a computing device 15 or 17 in communications with a game piece 3-6-1 using for example a Bluetooth communications component 3-6-1c. Game app and device 15 or 17 provides video output to active game overlay 3-3-1 including a scanning signal 3-3-1ss while in synchronization providing signals to game piece component 3-6-1c to activate light sensor 3-6-1ls for detecting the scanning signal 3-3-1ss, where the resulting controlled output and piece detection is usable for determining the logical location of the game piece 3-6-1 with respect to the game overlay 3-3-1.

FIG. 11D is a side view diagram of three variations of a game piece 3-6-1 with a light sensor 3-6-1ls based upon any of a point light sensor, a line light sensor or an area light sensor.

Figure 2C:
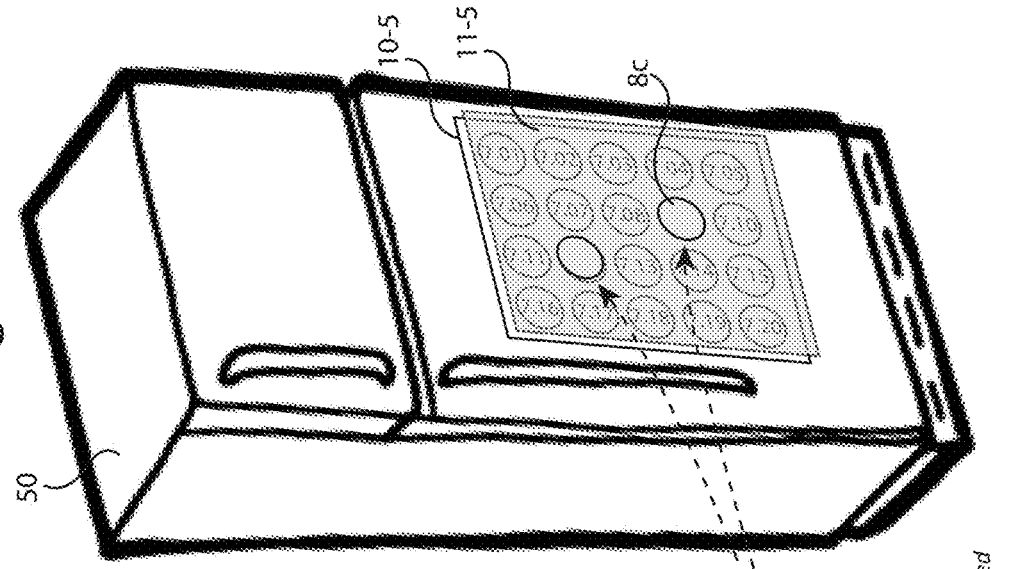
FIG. 2C depicts a vertically oriented surface such as a refrigerator onto which a game board 10-5 has been adhered, on top the game board 10-5 of which is then also adhered a game overlay 11-5. An exemplary game piece 8c is then placed over and adheres to a position on the game overlay 11-5. One anticipated benefit of a vertically oriented game board is for a family game that is for example conducted over several days or weeks and includes family tasks and chores.

In the following description, numerous specific details are set forth, such as examples of specific components, types of usage scenarios, etc. in order to provide a thorough understanding of the present disclosure. It will be apparent, however, to one skilled in the art that the present disclosure may be practiced without these specific details and with alternative implementations, some of which are also described herein. In other instances, well known components or methods have not been described in detail in order to avoid unnecessarily obscuring the present disclosure. Thus, the specific details set forth are merely exemplary. The specific details may be varied from and still be contemplated to be within the spirit and scope of the present disclosure.

DETAILED DESCRIPTION OF THE INVENTION

FIG. 1 is a perspective drawing of a physical-virtual game board and content delivery system 2 that is an alternative to the physical-virtual game board and content delivery system 1 as described in the parent application. Like the co-pending system 1, system 2 comprises a game app running on a computing device, such as a tablet or notebook 15 (not depicted) or a smart phone 17 (depicted.) Also, like system 1, game app and computing device are in communications preferably with a remote system for providing game apps and game related datum and for receiving game related datum, for example comprising any one of, or any combination of a global environment eco-system 40 or local environment eco-system 30, where the communications are preferably conducted over the internet through a router, all as was prior taught. Although not specifically shown with respect to the prior system 1, system 1 made use of a printer such as a home printer 19 for outputting game overlays 11 (in this depiction 11-4) including some form of a game overlay identification such as a QR code 11-4qr. As prior described with respect to system 1, game overlays 11 such as 11-4 depicted included logical locations such as 11-4Ln, where a logical location includes any of: 1) enclosed spaces such as a rectangular or circular shape, or a non-regular shape such as the outline of a state or country, wherein a game player would recognize to place a game piece such as 8c-1 fitted with figurine 8a; 2) semi-enclosed or non-enclosed areas that non-regular shapes such as wooded areas, oceans, mountains, etc., or 3) a hidden location such as a game overlay where the entire overlay is a uniform color such as white or black and a game player cannot specifically tell where the logical locations may or may not be. What is important to see is that logical locations have no specific restrictions with respect to how they are perceived by the game players. However, as prior discussed with respect to system 1, logical locations do have a pre-known relationship with the physical locations of the game board 10 (such as 10-4 depicted) where the game app running on a computing device such as 15 or 17 is able to receive a physical location ID whereupon a game piece such as 8c-1 or 8c-2 has been located and then to translate this received physical location ID into zero or one logical location IDs—again, all as prior described and referred to as "physical to logical mapping."

Still referring to FIG. 1, what is different about alternate game board and content delivery system 2 with respect to system 1 is that in system 1 the game board 10 was active and used electronics to sense the location of a passive game piece base 8b (see FIG. 1 of the parent application) whereas in system 2 the game pieces such as 8c-1 and 8c-2 are active and use electronics to sense their location with respect to a passive game base 10-4. Game base 10-4 preferably includes a multiplicity of passive NFC tags such as 10-4cn that are detectable by an NFC reader included within game piece bases 8c-1 and 8c-2, see upcoming FIGS. 4A, 4B, 6A and 6B for further specification. In system 1, the game board 10 communicated to the game app physical location ID's along with the associated ID of any detected game piece bases 8b determined to be substantially located over the physical location, whereas in system 2, game piece bases such as 8c-1 and 8c-2 communicate to the game app game piece base's ID's along with the associated ID of any detected physical locations such as 10-4cn determined to be substantially located under the game piece base such as 8c-1 and 8c-2.

As discussed in the prior co-pending application, it is important to see that in either approach, the game overlay 11, such as 11-4 depicted, preferably remains a separate part from the game base 10, such as 10-4, so that a single game base 10 can be used with a virtually unlimited number of game overlays 11, where this feature allowed a single game base 10 with game pieces 8 (using either prior system 1 or present system 2) to support multiple different games, each with their own overlay(s) 11, or a single game that continues to extend by using a multiplicity of overlays. This ability to extend a given game, thus making it "never-ending," was compared in the parent application with multiple instances of a video game. There were many benefits discussed in the co-pending application that remain benefits of the present teachings, including: 1) the apparatus of system 1 or 2 represents a physical-virtual gaming platform that is anticipated to be very low cost even to the point where the apparatus is given away as a means of inducing the marketplace to purchase game figurines, game devices such as interactive wearables (see especially element 16 of the parent application FIGS. 1 and 2B) and/or to purchase or subscribe to game apps; 2) the gaming platform provides a new opportunity for an "open-game" marketplace, similar to open-source software where individuals (and not game manufacturers) collaborate to create and build new games that are then downloaded and played by the community, where the new games include game overlay layouts that are digital information for printing at home and where figurines can be designed using CAD packages for printing on 3D printers at very low costs; 3) destination entities such as theme parks and museums can provide never-ending games that relate to their themes and current attractions for more deeply engaging their customer base; 4) advertising entities working with the destination entities or game manufactures, etc. can use the network of connected systems 1 or 2 to perform sophisticated market surveys and analysis, using technique such as A/B testing where some gamers receive variations of the same game such that their responses to these variations can be interpreted; 5) educational entities and communities can use the gaming platform to accelerate the use of novel teaching games within their system and to facilitate internal development of games to custom fit the institution; and 6) providing a platform where games can either be locked or unlocked, where a locked game must be used as originally delivered to the platform and an unlocked game can be modified by the receiving customers, such as a parent acquiring a home-school game that can be easily customized.

Still referring to FIG. 1, the present system 2 shares all the features, uses, benefits of the associated apparatus and methods (such as wearables 16 or glasses 14) and systems (such as remote system 40 and 30) described for system 1, where many of these same features, uses, benefits and associated apparatus are not herein further described but should be understood to be incorporated for use with system 2. Again, what is primarily different is that the game pieces are now active and usable for reading a passive game board, as opposed to vice versa for system 1. However, a careful reading of the co-pending and present applications will show that additional new teachings are provided herein either related or un-related to this primary difference, where the un-related new teachings will be understood to be likewise applicable to the prior taught system 1. And finally, with respect to both systems 1 and 2, while not mandatory, there are significant advantages to providing game boards 10 (in any active or passive variation) that support game overlays 11 which can be printed by a typical home printer. In the US marketplace, such home printers support at least letter size 8.5"×11" and often legal size 8.5"×14" or even tabloid size 11"×17". In the overseas market, it is more common to find such as A1, A2, A3 and A4.

Figure 2A:
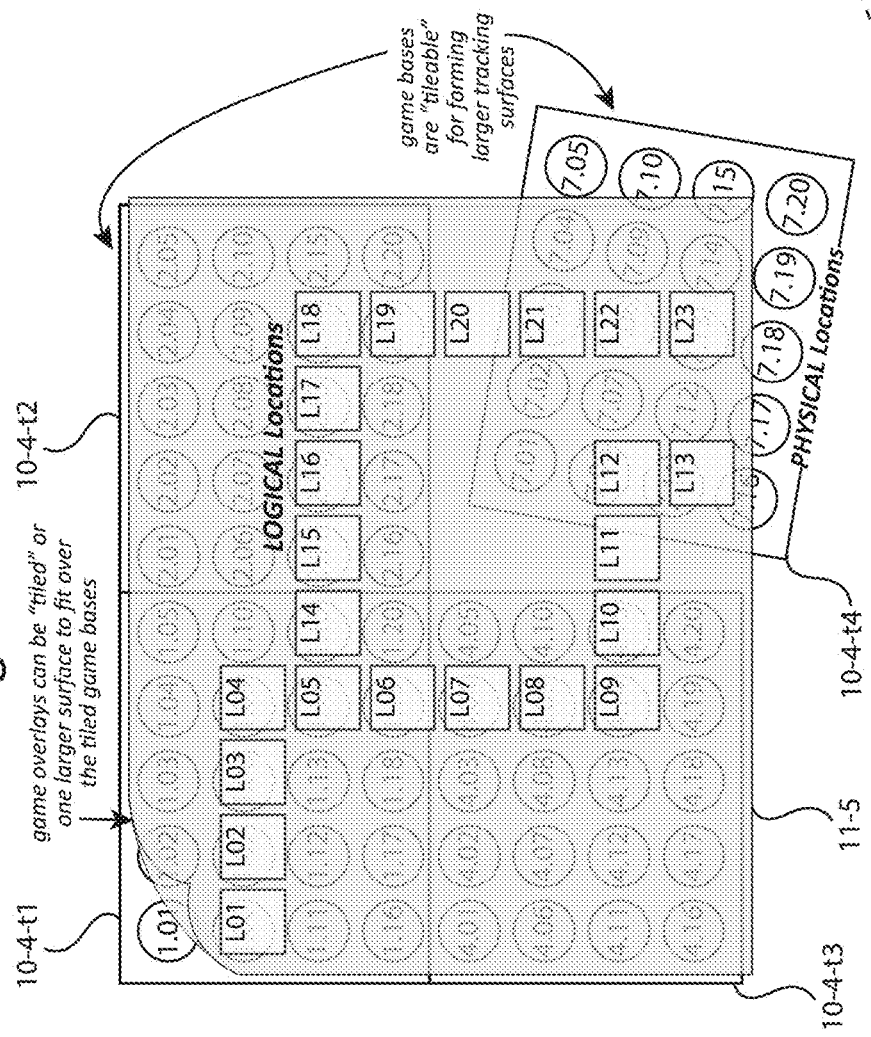
FIG. 2A there is depicted a top view of multiple passive game boards 10-4 being used as tiles 10-4t1, 10-4-t2, 10-4-t3 and 10-4-t4 to form a larger surface area that is then covered by a larger game board overlay 11-5. This same tiling is also applicable for the active game boards 10 with respect to parent system 1.

Referring next to FIG. 2A, there is depicted an arrangement of 4 game boards 10-4 being tiled together to form a larger combined game board surface including game boards as tiles 10-4-t1, 10-4-t2, 10-4-t3 and 10-4-t4. For example, if the game board 10 of either the present system 2 or parent system 1, such as the presently described 10-4 is of a tabloid printer size that is 11"×17", then the combination of 4 tiled game boards 10-4 would provide a combined surface of 22"×34". It is noted that a traditional Monopoly game board measures 20"×20". There is no limit to the number of game boards 10 that can be tiled to form a larger and larger game surface area. Game boards 10-4 can range in rigidity from being relatively firm like a traditional Monopoly game board made of cardboard where the multiplicity of passive NFC readers is preferably inlaid and therefore not visually apparent.

Given a more rigid surface, there are many possible ways that the boards such as 10-4-t1, 10-4-t2, 10-4-t3 and 10-4-t4 can be connected, such as with a larger plastic boarder covering over the edges of the outer perimeter of the combined tiles, or with clips for clasping between tiles along the same outer perimeter. It is also possible that each game board tile such as 10-441, 10-4-t2, 10-4-t3 and 10-4-t4 include a multiplicity of "feet" or small nubs on their underside to create a small gap between the supporting surface such as a table top and the game board tiles. Taking advantage of this small gap, it is then possible to create clasps that are underneath the game boards and attach the boards along the edges that interior to the outer perimeter. It is also possible that individual game board tiles 10-441, 10-4-t2, 10-4-t3 and 10-4-t4 have a thickness such that they can be joined in a "tongue-and-grove" manner with other game boards, where for example one short and one long edge have a female joint while the second short and long edge have a male joint thus allowing boards to be connected into larger and larger groupings. It is also possible that the undersides of each tile have a slightly sticky surface that allows them to be placed on a table to remain together despite normal light forces being applied, or even that the boards are simply placed next to each other without any joining or sticking means.

Still referring to FIG. 2A, what is important to see is that with both the game boards 10 of copending system 1 and 10-4 of the present application, it is possible to use multiple game boards to extend a gaming surface. When using active game boards such as 10 in co-pending system 1, it is preferable that the game boards connect to the computing devices and game apps such as 15 or 17 with a wireless connection, thus more easily supporting a multiplicity or game boards. However, as will be well understood by those familiar with electronic systems, it is possible that a single game board 10 is physically connected to a shared computing device such as a tablet 15 (see the co-pending FIG. 1) and that this then becomes a "master" game board where the additional tiled game boards then connect via any number of means to the master board, such that the single master connection to the computing device 15 is sufficient for communicating with all of the tiled boards. It is also important to see that it is possible to create a larger playing surface from multiple tiles such as 10-441, 10-4-t2, 10-4-t3 and 10-4-t4 that are not physically joined. For example, each of the four tiles 10-4t1, 10-4-t2, 10-4-t3 and 10-4-t4 could be separated from each other tile by some distance such as 4", and where a decorative bridge or similar item is added as a crossing over point between each of the tiles, like going into a different virtual area in a video game. As those familiar with both board games and video games will understand, there are many possible arrangements which speaks to the potential of the gaming systems 1 and 2 since entire new types of games with different board arrangements can be imagined and implemented at a very low cost and even for very small niche marketplaces. It is even possible that each player controls their own personal game board in either a shared or separated setting from other players, where all game boards are sharing information concurrently with the game app running on the shared computing device such as 15 or 17.

Still referring to FIG. 2A, it is possible to print larger single-sheet game overlays such as 11-5 using a plotter. For example, the UPS Store offers to print posters of size 24"×36" (that can easily be trimmed to 22"×34".) Again, there are many possibilities including that when tiling game boards such as 10-441, 10-4-t2, 10-4-t3 and 10-4-t4, each game board tile has its own game overlay such as 11-4 that is still printed with a home printer, or any two or more tiled game boards have a corresponding single game overlay such as 11-5. As prior discussed in relation to co-pending system 1, what is important to see is that: 1) the game overlay(s) be uniquely identified to the game app for sample using a QR code 11-4qr that is scanned by a connected computing device such as 15 or 17, or using a unique code that is entered for each overlay(s) such as 11-4 or 11-5; 2) the arrangement of game overlay(s) be in accordance with the game designers intentions, where when using multiple overlays such as 11-4 with multiple tiles such as 10-4-t1, 10-4-t2, 10-4-t3 and 10-4-t4, each overlay that is printed preferably includes visual indicators for guiding in the proper arrangement, and 3) whether using one or a multiplicity of game overlays 11 such as 11-4, the orientation of the overlays 11 are known with respect to the underlying game boards such as active boards 10 or passive boards 10-4, where the co-pending application discussed several possible ways for ensuring or otherwise determining this orientation. As was also prior taught, after all game overlay(s) are properly placed with respect to each other (assuming a multiplicity) and properly oriented with respect to any one or more game boards 10 or 10-4, it is then possible to map the physical locations associated with either active boards 10 or passive boards 10-4 to the logical locations of any of the game overlay(s) 11. This pre-known mapping was shown in the parent application to be sufficient for mapping physical locations such as 10-4cn associated with specific game piece bases such as 8c-1 or 8c-2 to logical locations such as 11-4Ln on an overlay 11.

Still referring to FIG. 2A, as prior taught with respect to system 1, each game board preferably also includes a unique identifier, where this game board identifier (shown as "1.", "2.", "3." and "4.") in the present figure, is then combined with the unique identifier of the physical location (shown as "0.01" through "0.20") in the present figures, such that all of the physical locations are representable as a unique code that combines the game board ID with the location ID. As will be understood by those familiar with NFC tags, it is possible to hold very large numbers such that it is also possible that each NFC tag includes its own unique ID that is different from any other of a multiplicity of game board 10-4 tiles, where the tiles have their own unique codes. Using this approach, if the game board tiles unique code is visible to the players, it is then possible that the players understand that no two unique tiles with the same ID can be used together when forming a larger surface for a single game, and/or this can be forced electronically as the game board tile's unique ID's are entered and/or detected by the system, where active boards such as 10 can transmit a unique ID code electronically and passive boards such as 10-4 can either include a special NFC tag for encoding the game board ID or encode the ID in all physical locations tags such as 10-4cn. It is also possible that passive boards such as 10-4 can include QR codes (like 11-4qr) or similar approaches for unique identification as used with the game board overlays such as 11-4. What is important to see is that any arrangement of multiple tiled active or passive game boards provides a combined multiplicity of unique physical locations that are translatable to unique logical locations on the one or more associated game overlays.

Figure 2B:
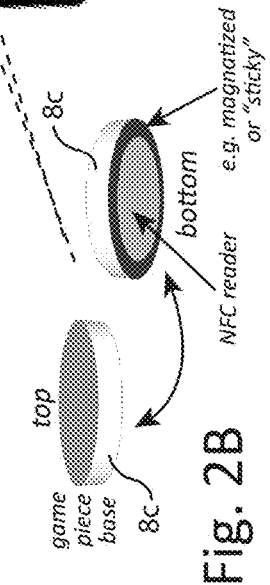
FIG. 2B depicts top and bottom perspective views of a representative active game piece base 8c that includes both a sensing area, for example including an NFC reader, and an attaching area, for example including a material such as a magnet or a sticky substance especially useful for attaching the game piece base 8c to a vertically oriented game board 10-4 and overlay 11-4 attached or being held by a vertically oriented surface such as a refrigerator. A similar attaching area is also anticipated for use with copending passive game pieces such as 8b of system 1.

Referring next to FIG. 2B, there is shown a top and bottom view of a game piece 8c, where the bottom view depicts an arrangement for providing both a sensing area for the preferred NFC reader and contact area for providing a material useful for causing the game piece 8c to adhere to a vertically oriented game board 10-4 and overlay 11-4, where for example the game board 10-4 and overlay 11-4 have been affixed to a refrigerator (see FIG. 2C.) There are many possible materials for providing adhesion such as magnets sticky substances or Velcro. For the metal surfaces such as a refrigerator, the magnetic materials are preferred. What is important is that the either a passive game piece base (such as copending 8b) or an active game piece 8c, in any of its various implementations or forms (see FIGS. 5A, 5B, 5C, 5D and 5E) including or not including an attached figurine such as 8a (see FIG. 1) can work with a vertically oriented active game board 10 from co-pending system 1 or vertically oriented passive game board 10-4 as presently described.

Referring next to FIG. 2C, the is shown a vertically oriented surface of a refrigerator 50 onto which an active game board such as 10-5 (or passive game board such as copending 10) is adhered and over which game board overlay 11-5 is then further adhered. As will be clear to those familiar with boards, it is also possible that the game board 10-5 for example has mechanical clips that can be used to fasten the game overlay 11-5 to the game board. Alternatively, the game board 10-5 could have a first adhering side for joining with the vertical surface for example of the refrigerator 50 and a second adhering side for joining with the game overlay 11-5. In one embodiment, the first adhering for example includes one or more magnets, and the second adhering side has a cork or cork-like material onto which the game overlay 11-5 can be pinned, wherein such a case game pieces 8c can be modified to also include a pin(s) on their underside as a means for adhering to the second side of the game board 10-5. In any case, using a vertical oriented surface requires game pieces such as 8c with a material that provides some means of adhesion such as a magnet, a sticky substance or a pin.

One anticipated use of this arrangement is a family game that is played out over the week where locations on the game board represent tasks or accomplishments and the game pieces are moved by each player to indicate their completed work. As game pieces 8c are moved about, connected game apps for example running on a mobile device such as cell phone 17 are notified. In one example, each parent has a game app running on their cell phone 17 and for example while they are at work if their child moves a piece the parent receives a communication allowing them to see the "game advancement" or change, where this communication can be either through the game app 17 interface or implemented as a "game text" that is received as a normal text message. As was discussed in the copending application, as game piece bases such as 8-*c* (or 8*b*) are moved to new logical locations on a game overlay such as 11-5, the logical locations are determined by the game app on computing device 15 or 17 and used to update a game database along with other game status information. As a game piece base is moved, the system 1 or 2 can cause or otherwise output action control signals, where the action control signals are then transmitted to any connected device such as a game device, and where the action control signals then further cause a change in the state of the connected device. In one example, as a child moves a game piece indicating that they have completed a task, a notification is received on a parent's game app and device 17, where after the parent can select or indicate an appropriate action control signal, and where for example the action control signal causes a power strip providing power to a device (such as a TV or gaming console) to be turned on or off.

Referring next to FIG. 3A, there is shown a vertically oriented game board 10-6 with a rewriteable surface overlay 11-6 that is implemented as a white-board 60. Game board 10-6 can be active (co-pending system 1) or passive as in the present system 2 and as depicted in the present figure. As prior described in relation to systems 1 and 2, there is a physical-to-logical mapping that allows the rewritable surface 11-6 to be associated with locations whereupon a game piece (in this case marker board piece) is placed (see FIG. 3B.) Marker board 60 preferably also comprises calibration means such as 60-*cm* that are visible markings for use when mapping a captured image of the marker board 60 to the logical locations, as will be discussed in greater detail with respect to upcoming FIGS. 3B, 3C and 3D.

Referring next to FIG. 3B, in an exemplary use case, marker board 60 is placed in a conference room and used for example to draw out functions, use cases, databases, etc. for a company software project. As or after symbols such as rectangles, diamonds, circles, traditional DB (database) symbols, and lines are drawn, marker pieces such as 8-*c* or 8-*d* are adhered to the rewritable surface 11-6. Marker pieces 8-*c* and 8-*d* are either active or passive depending upon the implementation of marker board 60's "game" base 10-6, as will be clear from a careful reading of the co-pending and present teachings. Marker piece 8-*d* is different in form from the circular 8-*c* and is designed as a rectangular shape sufficient to act as both a marker piece and as a surface for applying notes, such as what are commonly referred to as "sticky notes." Also depicted in relation to FIG. 3B is mobile device and marker board app 17-60, that is in communications with either an active marker board (based upon the co-pending teachings of system 1) or active marker pieces based upon the present teachings related to system 2. Marker board app and mobile device 17-60 is used to capture one or more images of marker board 60, preferably after all symbols and drawings have been completed, and at any time before or after all/any markers such as 8-*c* and 8-*d* have been adhered to marker board 60.

Referring next to FIG. 3C, captured image 11-6-*img* of the marker board 60 is then processed by either the marker board app 17-60 or a companion app running on a connected computing device, all as will be well understood by those familiar with networked systems. As will be well understood by those familiar with image processing, at least using calibration marks such as 60-*cm*, it is possible to: 1) clip image 11-6-*img* to be substantially limited to the spatial area corresponding to marker board 60, and therefore excluding any surrounding surface such as a wall that marker board 60 might be mounted to; 2) substantially remove all perspective distortion of the clipped image 11-6-*img* as for example caused by taking the image 11-6-*img* using device 17-60 at a viewing angle that is not centered and perpendicular to the surface of marker board 60; 3) process the clipped image 11-6-*img* to determine/locate the multiplicity of drawn symbols such as rectangles, diamonds, circles, traditional DB (database) symbols, and lines, and then further clipping these located symbols into sub-images such as 11-6-*img-c* (see upcoming FIG. 3D) and 4) associate the spatial area comprised within and between each located symbol with the underlying mapped physical locations by relating through calibration information such as 60-*cm* captured image 11-6-*img* with logical space 11-6 and therefore also with physical locations comprised with marker board 10-6.

Also, as depicted in relation to both FIG. 3B and FIG. 3C, marker board app and device 17-60 are useable for: 1) scanning using a (preferably) native NFC reader (that is typically included within state-of-the-art smart phones) each marker piece such as 8-*c* or 8-*d* to be placed on marker board 60, and 2) associating additional marker datum such as project management information including one or more persons, groups, priorities, dates, dollar amounts, or other information, where preferably this associated information is changed at any time before or after the marker 8-*c* or 8-*d* is placed on the marker board 60.

Still referring to FIG. 3C, one or more markers such as 8-*c* or 8-*d* may have already been placed upon marker board 60 prior to the capturing of image 11-6-*img*, in which case as will be understood by those familiar with image processing, each one or more placed markers 8-*c* or 8-*d* can also be determined as being within, near or in between any of the other sub-divided symbols/images such as 11-6-*img-c*. As will also be understood, it is typically preferred that each of markers 8-*c* and 8-*d* be visually distinguishable such that during image processing markers 8-*c* and 8-*d* can then be uniquely identified based upon the pre-known distinguishable features. However, with the present marker board 60 it is preferred that generic pieces 8-*c* and 8-*d* (which are not necessarily visually distinguishable) are used and then identified by the system (using either co-pending system 1 or present system 2) as they are associated with physical locations on the marker board layer 10-6. Once identified using physical-to-logical location mapping as prior discussed, each marker piece 8-*c* or 8-*d* is then associable with an image clip such as 11-6-*img-c* using logical-to-image mapping as prior discussed. This association between any one or more markers such as 8-*c* or 8-*d* with a symbol(s) or some portion of an image drawn on marker board 60 further allows any additional marker datum to also be associated with the symbols(s) or portions of an image such as 11-6-*img-c*.

Referring next to FIG. 3D, the preferred marker board 60 system includes a user application for use by single individuals associated with the meeting or drawing, wherein the individuals can then review any of the entire image 11-6-*img* or the subdivided sub-images such as 11-6-*img-c* sorting and filtering on any of the associated marker 8-*c* or 8-*d* datum, all as will be appreciated by those familiar especially with project management software systems. As a careful reading will show, at some future time after the image 11-6-*img* is captured, marker pieces such as 8-*c* and 8-*d* can be added, removed, or moved upon marker board 60, with or without all the original meeting members present. As the markers 8-*c* or 8-*d* are added, removed or moved, the physical location ID of the markers 8-*c* or 8-*d* is determined by the system and mapped to a new logical location and therefore also possibly new symbol such as 11-6-*img-c*, after which the database of clips such as 11-6-*img-c* associated with markers such as 8-*c* or 8-*d* is then updated by the system as appropriate. It is also possible that any of the additional marker related datum is associated or disassociated with a marker 8-*c* or 8-*d* either before or after image 11-6-*img* is captured, where all marker related datum changes are updated in association with the image 11-6-*img* and/or its sub-images such as 11-6-*img-c*.

Those familiar with the art of project management will understand the many benefits of the present marker board 60 for use separately or in combination with traditional project management software. What is important to see is that the physical locations are mappable to the logical locations which are then also mappable to the image locations, such that markers such as 8-*c* and 8-*d* that are tracked by physical location are ultimately relatable to image locations, for example the clipped sub-image 11-6-*img-c*. There are many traditional project management marker boards such as what is referred to as a "Kanban Board" that is a "work and workflow visualization tool that enables you to optimize the flow of your work. Physical Kanban boards, typically use sticky notes on a whiteboard to communicate status, progress, and issues." Kanban boards are much simpler to use versus project management software that is typically all digital and requires a significant amount of manual updating. With a Kanban board, an individual updates their project status by moving sticky notes on the Kanban board. The present marker board improves on such a system in several ways including: 1) a Kanban board is typically a row and column matrix, whereas the present marker board allows this same row-col format or any format that can be drawn upon the marker board 60 surface 11-6; 3) unless a shared camera is capturing images of a Kanban board, project members only see updates by physically looking at the Kanban board; 4) even with a shared camera, there is no easy way to quickly denote Kanban board changes, whereas with marker board 60 when a piece such as 8-*c* or 8-*d* is added, removed or moved this change is substantially detected and processed in real-time such that change notifications can be provided either for example though marker board app 17 or an associated text messaging interface, and 5) like a Kanban board using markers such as 8-*d* sticky notes can still be used but now each sticky note (via association with a marker such as 8-*d*) comprises additional marker datum and is physically trackable with respect to the various portions of the marker board 60.

Those familiar with project management systems will understand that there are many uses and ways for the present marker board 60 to be used with or without a traditional project management software system, including providing a "digital" Kanban board or similar. Many small companies use what are generally referred to as in/out boards to track employees, shipment boards for tracking in-bound purchases or outbound order fulfillment, etc. all using physical boards that otherwise have no digital information component. The present marker board 60, like the use of system 1 and 2 for providing a physical-virtual game board, provides for a physical-virtual marker board. It should then be understood that the present examples depicted in FIGS. 3A, 3B, 3C and 3D are exemplary and should not be considered as limitations of the present invention with respect to markers boards 60 or associated project management software systems. Many other variations are possible and remain within the spirit and teaching of the present invention. For example, it is possible to have a multiplicity of marker boards such as 60 all sharing information, where for example a group meeting uses a first marker board 60 to diagram a project at a higher level and to assign portions of the project (e.g. represented as a symbol such as depicted in 11-6-*img-c*) to one or more individuals (e.g. represented as related datum associated with a marker such as 8-*d*.) Each of these individuals may then have their own second marker board 60, or be a part of a smaller group having its own marker board 60, where the individual and/or smaller group then leaves the first meeting resulting in a first image 11-6-*img* being processed into assignments and then uses their second marker board 60 to refine for example the sub-system represented by their assigned symbol(s) (i.e. as clipped from first image 11-6-*img*) into a more detailed set of symbols, each of which can then also be further assigned using more markers such as 8-*c* or 8-*d* with additional marker related datum, and/or further detailed by another drawing made on a third marker board 60 or on the first or second marker boards being wiped and reused.

Referring to FIG. 3B, as will be understood by those familiar with NFC technology, the NFC readers typically included with a mobile device 17 such as a smart phone can act both as a reader (receiving information from another NFC tag) and a writer (therefore acting like an NFC tag and providing tag information to another reader.) Using such a mobile device 17 including NFC two-way scanning technology, marker board app and device 17-60 can be used by an individual to tap or scan a marker such as 8-*c* or 8-*d* already placed upon the marker board 60 to receive for example any information associated with the marker piece. Note that in either case of copending system 1, where the marker board pieces are passive and preferably include NFC tags, or the present system 2, where the marker board pieces are active and preferably include NFC readers, device 17-60 is still capable of reading the passive or active marker piece using NFC to determine at least the marker's unique ID for recalling system information. In the case of system 2 active marker pieces, these active pieces could alternatively detect the NFC reader in the device 17-60 and then subsequently provide to device 17-60 the unique ID of the marker piece which is then translatable into other related datum as herein described and anticipated.

Marker board app and device 17-60 can also be used to tap the area of the marker board 60 comprised within or near a drawn symbol (such as depicted) where using an active board based upon copending system 1, the active board then detects the presence of the NFC reader comprised within the device 17-60 and transmits to that same device 17-60 the physical location at which the device was detected, where the physical location is translatable ultimately into the specific symbol(s) over or near which the device 17-60 was tapped and detected and thus providing the system with the ability to provide marker related datum associated with the symbol(s) to the device 17-60. In this same scenario, if the marker board 60 is based upon the present system 2 passive game board 10-6 apparatus, then device 17-60 detects one or more underlying physical locations within board layer 10-6 and uses these detected physical location(s) to translate into specific symbol(s) and associated information.

Referring now to both FIG. 3B and FIG. 3D, another advantage of the present system with respect to marker pieces such as 8-*d* shaped in a form for attaching sticky notes includes the following use case in which: 1) a user scans the marker 8-*d* with their marker app and device 17-60; 2) the user physically attaches a sticky note 60-*sn* to the marker 8-*d* (either before or after scanning the marker); 3) the user takes a picture of the sticky note 60-*sn* using their app and device 17-60 whereupon a sub-image comprising substantially only the sticky note 60-*sn* is preferably clipped from the picture eliminating any background that is not the representative of the sticky note 60-*sn*, and 4) the system automatically associates the clipped picture of the sticky note 60-*sn* with both the marker 8-*d*, any one or more physical locations over which the marker 8-*d* is determined to be located, and any symbol(s) such as 11-6-*img*-*c* determined to be collocated with the marker 8-*d* via processing of the captured image 11-6-*img* as prior described. Other variations in this exemplary use case will be apparent and what is important to see is that the present teachings of marker board 60 provide a convenient means for moving sticky notes 60-*sn* on a marker board 60 and automatically associating these notes 60-*sn* with some underlying symbols such as the database symbol in 11-6-*img*-*c* or a grid symbol (such as an X, Y grid like a Kanban board) and then further digitizing the information written on the sticky note for distribution to uses within for example a project management system. As will be well understood, using state-of-the-art OCR software, it is then also possible to reliably translate any hand-written sticky note into a digital text note to further advantage as will be clear to those familiar with information systems.

Figures 4A, 4B:
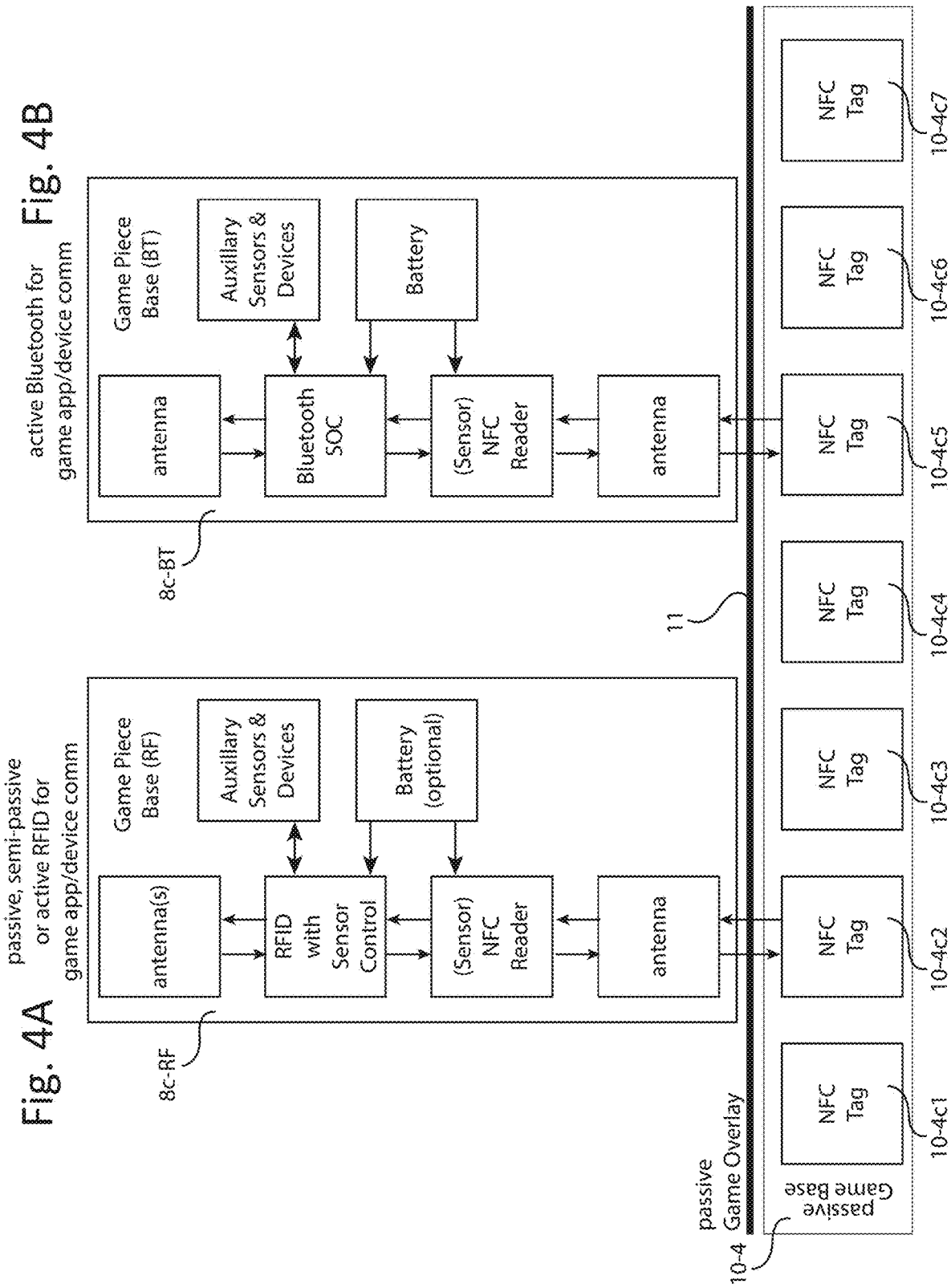
FIG. 4A depicts a block diagram of a game piece 8c-RF that employs any of passive, semi-passive or active RFID technology to communicate with the game app running on a computing device 15 or 17 using what is known as an RFID reader for interrogating the game piece 8c-RF. Game piece 8c-RF further includes an NFC reader for engaging with the passive game board 10-4, where the NFC reader determines a unique physical location such as 10-4c2 or 10-4c3 over which the game piece 8c-RF is currently located. Game piece 8c-RF responds to the interrogation signal provided by the RFID reader being used by the game app and computing device 15 or 17 to provide a game piece ID and a physical location ID.
FIG. 4B depicts a block diagram of a game piece 8c-BT that employs a Bluetooth communications device to directly communicate with the game app running on a computing device 15 or 17, thus obviating the need for the use by device 15 or 17 of an RFID reader for interrogating the game piece. Like game piece 8c-RF, game piece 8c-BT further includes an NFC reader for engaging with the passive game board 10-4, where the NFC reader determines a unique physical location such as 10-4c5 or 10-4c6 over which the game piece 8c-BT is currently located. Game piece 8c-BT responds directly to the Bluetooth communications signal provided by the game app and computing device 15 or 17 to provide a game piece ID and a physical location ID.

Referring next to FIG. 4A, there is shown a block diagram of a system 2 game piece 8*c*-RF that employs a component for communicating with the game app and computing device 15 or 17 that is based upon passive, semi-passive or active RFID. As will be well understood by those familiar with RFID technology, RFID uses a reader to interrogate one or more RFID at a varying distance that depends upon several factors including the RF frequency and the antenna size and power. RFID systems are typically distinguished as using passive or active RFID tags, where passive tags harvest the energy from the interrogation signal for activating the RFID chip on the tag and then responding with modulated datum indicative of for example a unique RFID ID. Passive tags are typically much lower cost but limited in range. For the use in the present gaming system 2, the limited communication ranges of passive RFID are sufficient, and therefore using a passive game piece 8*c*-RF has advantages for providing a lower cost game piece.

Still referring to FIG. 4A, a game piece such as 8*c*-RF also includes an NFC reader component for detecting the game piece 8*c*-RF's physical location, where the physical location as prior described is preferably represented as an inlaid NFC tag such as any of 10-4*c*1 through 10-4*c*7 as depicted with game board 10-4. There are currently passive RFID tags for use in the communicating with device 15, 17 (via a RFID reader) that support attached sensors, where energy harvested by the passive RFID antenna(s) provides the electrical current for activating the sensor and retrieving the data, wherein the interrogation signal therefore remains "on" for a duration sufficient for energizing the passive RFID tag and then the associated sensor. Typically, the energy harvested from the interrogation signal is one the order of 10-20 MA and depends upon the output power of the interrogation signal, all as is well known. The power necessary for driving an NFC reader can be more than this harvested energy, in which case it is necessary to augment the harvested energy with additional on-board battery current, a technique referred to in the art as a semi-passive RFID with sensor. In another approach, the RFID tag for communicating with the app and device 15, 17 is active and includes an onboard battery, wherein this same battery is then usable for driving the NFC reader that determines the game pieces 8*c*-RF's current physical location, such as 10-4*c*2.

What is important to see is that it is possible to use any of passive, semi-passive or active RFID for implementing at least the communications between game piece 8*c*-RF and the game app running on device 15 or 17, wherein the RFID provides at least information useable as a Game Piece ID, all as prior described herein and within the parent application. Using at least a semi-passive and active RFID that includes an on-board battery, it is also possible that the RFID energies a sensor that is an NFC reader for detecting an NFC tag such as 10-4*c*2 comprised within the game board 10-4 and representing a unique physical location that is mappable to a unique logical location, all as prior discussed herein and in the parent application. Upcoming FIGS. 5C and 5D will describe alternate forms of a game piece 8*c*-RF for including larger and more antennas for harvesting the interrogation signal, thereby increasing the energy available for providing a passive RFID communications link with sufficient current for also driving the NFC reader for detecting the physical location.

Referring next to FIG. 4B, it is possible to implement the communications between the game piece such as 8*c*-BT using active Bluetooth technology verses any of passive, semi-passive or RF technology. While active Bluetooth requires an on-board battery, the Bluetooth component can communicate directly with the native Bluetooth technology supported within most mobile and computing devices anticipated for uses game app devices 15 or 17. This direct communication thus eliminates the need for system 2 to further comprise an RFID reader in communications with the device 15 or 17 for interrogating a game piece such as 8*c*-RF, all as will be understood by those familiar with typical mobile devices and RFID technology. Given that the Bluetooth solution game piece 8*c*-BT includes an on-board battery, this same (or an additional battery) is then also usable to power the NFC reader for detecting the game piece 8*c*-BT's current physical location such as 10-4*c*5. In either game piece embodiment 8*c*-RF or 8*c*-BT the NFC reader portion of the game piece is substantially the same apparatus with the main variation being the source of power for the NFC reader. There are currently many Bluetooth chips available on the market such as the DA14585 low power Bluetooth 5 SoC sold by Dialog Semiconductor. This chip can manage both the communications with the game app and device 15 or 17 and the activation and control of the associated NFC reader for detecting the game piece physical location. There are currently many NFC readers available on the market such as the PN532/C1 NFC controller sold by Nordic Semiconductor.

Referring now to both FIGS. 4A and 4B, assuming that the game piece 8*c*-RF includes an on-board battery similar to game piece 8*c*-BT, both game pieces 8*c*-RF and 8*c*-BT preferably also support auxiliary sensors & devices including any one of, or any combination of: 1) displays for outputting visual information (see FIG. 5A); 2) light emitting elements such as LEDs; 3) sound emitting elements; 4) motion sensors such as an accelerometer, a gyroscope, or a magnetometer, or 5) other environmental sensors for example to sense lighting or temperature. In the case of game piece 8*c*-BT employing Bluetooth communications, the sound emitting element can be a speaker where the Bluetooth chip for example receives and outputs streaming audio to the speaker for creating audible game piece affects. As will be discussed further in relation to upcoming FIG. 5E, with on-board battery power it is also anticipated that the game piece 8*c*-RF or 8*c*-BT will support a power and data connection to an attached active figurine such as 8*a* (see FIG. 1) whereby using the provided power and data signals the active figurine 8*a* then provides various outputs including light, sound and motion. And finally, another important anticipated benefit of the communicating components described for game piece 8c-RF and 8c-BT is that a player can use the game app running on a (preferably mobile) computing device such as 15 or 17 to search for misplaced game pieces 8c, where in this case the communicating components are serving the function of what is generally referred to as a proximity tag.

Referring next collectively to FIGS. 5A, 5B, 5C, 5D and 5E there are show five variations of game piece bases 8c, each of which can be implemented using either of the technology stacks discussed in relation to FIGS. 4A and 4B, i.e. RFID-to-Game App communication game piece 8c-RF or Bluetooth-to-Game App communication game piece 8c-BT. The form designs are exemplary and should not be considered as limitations of the present teachings. What is important to see is that game pieces can: 1) be either capable, or not capable, of attaching a game piece figurine such as 8a (see FIG. 1); 2) include a power/data connection for at least providing power and action control signals to any attached active figurine such as 8a; 3) include an extended vertical member or shaft for including additional antenna to for example to improve either connectivity or energy harvesting, and 4) include auxiliary sensors & devices such as a display surface. It is also important to note that all the five variations are based upon a coin-shaped game piece base, where this should be seen as exemplary rather than as a limitation of the present invention as other base shapes such as square, rectangular, a star or even non-uniform shapes are possible.

Referring to FIG. 5A, there is shown a coin-shaped game piece 8c-f1 that is a base (see FIGS. 4A and 4B) without the capability of attaching a figurine 8a but including a display surface. As will be understood by those familiar with display technology, there are many choices for use as a display, where the present inventor notes the benefits of a newer technology referred to as electrochromic displays. One company providing electrochromic displays is ynvisible headquartered in Vancouver, Canada. Another company is Tintable Electrochromics located in Taiwan. Electrochomic displays consume very low power during transition and thereafter maintain their colored or transparent state without requiring additional power. While the range of colors and brightness provided with electrochromic displays is considerably less than traditional display technologies such as LED, OLED, PMOLED, AMOLED, E-ink, etc., the colors and resolution are more than sufficient for use both as a game piece auxiliary display and as a variation game overlay (see element 11a in parent application FIG. 5 and related specification.) Electrochromic is a printed electronics technology and as such it is both lower cost and flexible, where flexibility is beneficial at least for use as a game overlay. However, using any display technology other than electrochromic including any of LED, OLED, PMOLED, AMOLED, E-ink, etc. is possible and provides at least the advantage of a greater color gamut (except for E-ink that is grayscale.)

Referring next to FIG. 5B, coin-shaped variation 8c-f2 excludes a display surface in favor of a mounting structure such as the two posts depicted for attaching a figurine 8a.

Referring next to FIG. 5C, a vertical shaft in the form of a rectangular column has been added to the coin-base, where the shaft serves both to enclose a larger antenna and to work as a single post onto which a figurine 8a (with a similar shaped hollowed out cavity) can be fit over. As will be well understood by those familiar with RF technology, increasing the size of an antenna benefits both connectivity and power transfer. This increased antenna profile is applicable to the technology stack discussed in FIG. 4A for game piece 8c-RF, where the antenna is connected to the RFID with Sensor Control and is used to communicate with game app and computing device 15 or 17 via an RF reader, all as prior discussed. It is also possible to use the shaft surface area to provide a display surface that is vertically oriented, for example using any display technology including electrochromic, LED, OLED, PMOLED, AMOLED, E-ink, etc.

Referring next to FIG. 5D, a second vertical shaft preferably at an orthogonal orientation is added to further increase connectivity and energy harvesting, where in particular the increased energy harvesting is especially useful for the passive RFID version of game piece 8c-RF, where the power harvested from the interrogation signal is then sufficient to drive the NFC reader, thus allowing for a fully passive game piece 8c-RF that will be lower in cost and not susceptible to battery failure.

Referring next to FIG. 5E, a power and data port is added for at least providing power and action control signals to an active, or activatable figurine 8a. As will be well understood by those familiar with electrical devices and connectors, there are many options for implementing the power and data port including various forms of USB ports. What is important to understand is that a game piece base such as 8c-f5 (or any of the forms intended to also mount a figurine such as 8c-f2, 8c-f3 and 8c-f4 along with any of their possible form variations) provides power and data signals to an active figurine 8a, and is also capable of receiving data from active figurines 8a that additionally include for example sensors.

Figure 6A:
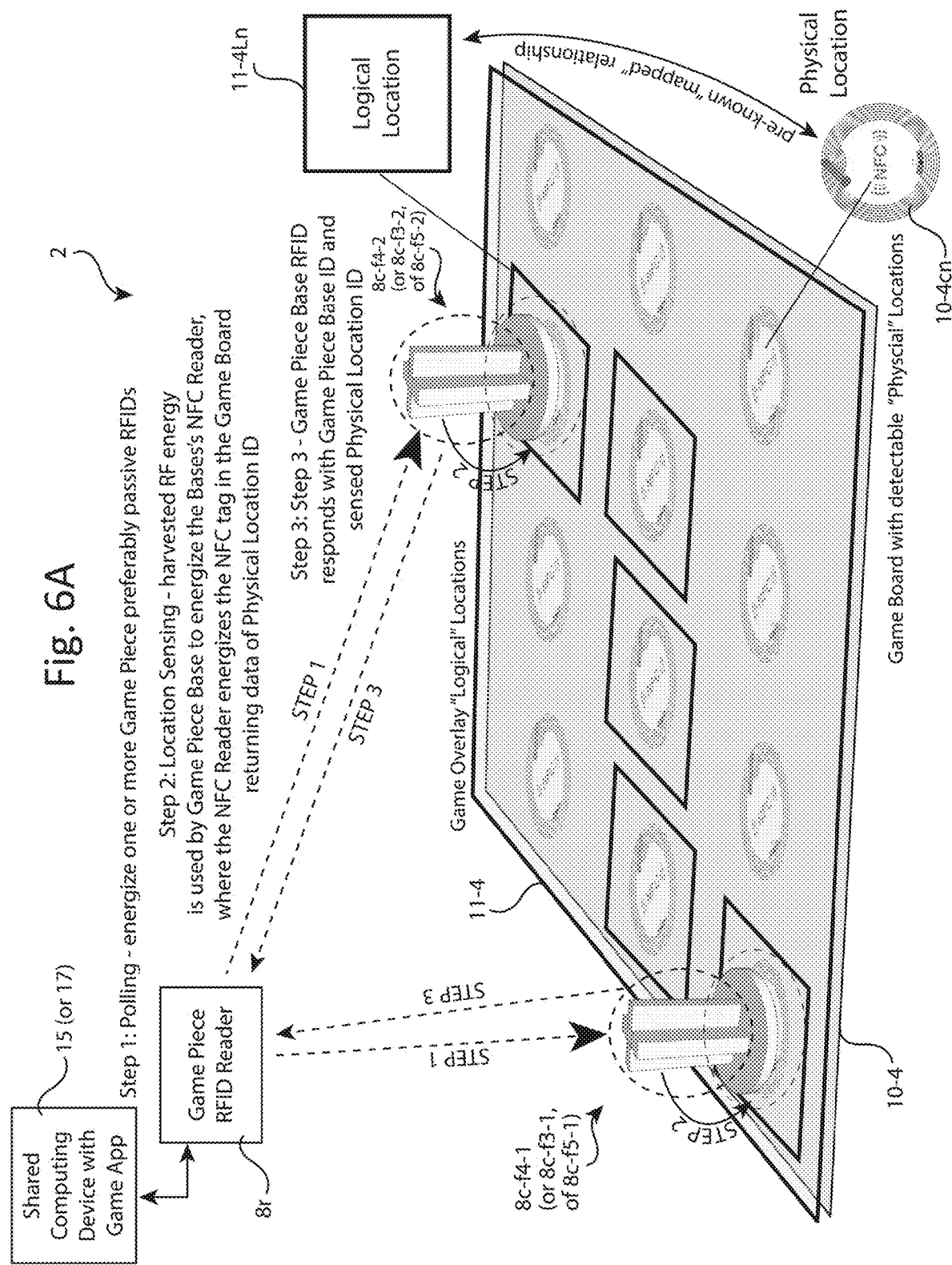
FIG. 6A depicts system 2 in operation using a RF communications-based game piece 8c-f4-1 or 8c-f4-2. The operation includes three basic steps including a step 1 where the game app and computing device 15, 17 direct an RFID reader 8r to interrogate the game pieces 8c-f4-1 and 8c-f4-2, a step 2 where the game pieces 8c-f4-1 and 8c-f4-2 RFID communications component after receiving an interrogation signal initiates the NFC reader component located within the game piece for detecting and NFC tag such as 10-4-cn comprised within the passive game board layer 10-4, and a step 3 where the game pieces 8c-f4-1 and 8c-f4-2 RFID communications component after receiving an physical location ID as sensed by the NFC reader component transmits back to the NFC reader 8r preferably the game piece ID and physical location ID, where the NFC reader 8r then transmits this information to the game ap which uses pre-known mapping to translate the physical location ID into a logical location such as 11-4Ln ID. While game pieces 8c-f4-1 or 8c-f4-2 preferably include a passive RFID component for communicating with the RFID reader 8r, it is possible to use either of a semi-passive or active RFID component.

Referring next to FIG. 6A, there is shown system 2 in operation including the communications between a preferably shared computing device with game app 15 or 17, a game piece RFID reader 8r, a game piece such as 8c-f4-1 or 8c-f4-2, and a passive game board 10-4 with detectable physical locations such as 10-4cn. As discussed in relation to FIG. 4A, game pieces such as 8c-f4-1 or 8c-f4-2 are based upon RF communications with the game app and computing device 15, 17. This RF communications in turn requires a game piece RFID reader 8r to intermediate the signals between the computing device 15 or 17 and the game piece, all as will be well understood by those familiar with RF technology. Game pieces based on RF technology were described as 8c-RF in FIG. 4A and include at least 1 RF antenna, preferably housed in a vertical shaft such that the game piece has improved connectivity with the reader and at least receives more power from the interrogation signal. The present figure depicts game piece form 8c-f4 as taught in relation to FIG. 5D that comprises two vertical shafts for housing two antennas or one elongated antenna for communications with the RFID reader 8r. While it is preferable that game pieces such as 8c-f4-1 and 8c-f4-2 are passive, the present figure describes a three-step communications path that is applicable to passive, semi-passive or active RFID implementations of 8c-RF (see FIG. 4A.)

Still referring to FIG. 6A, in a Step 1, game app running on computing device 15, 17 initiates a polling sequence wherein a signal is provided to RFID reader 8r to commence with interrogation. As will be understood by those familiar with RFID technology, RFID reader 8r then emits an interrogation signal at a proper frequency matched to the RFID antennas and chips included within game pieces such as 8c-f4-1 and 8c-f4-2. The interrogation signal is received by the one or more antennas within pieces 8c-f4-1 and 8c-f4-2 and converted into an electrical current for at least operating the normal RFID chip processing. Either using additional on-board battery power, or using the electricity harvested from the interrogation signal, in a Step 2 pieces 8c-f4-1 and 8c-f4-2 energize their on-board NFC readers to determine the ID of a physical location including and NF tag such as 10-4cn over which the piece pieces 8c-f4-1 and 8c-f4-2 are currently located. Assuming that the pieces 8c-f4-1 and 8c-f4-2 are located over a physical location, the on-board NFC readers retrieve information from the NFC tag such as 10-4cn either identifying or useable for identifying the physical location ID, where this information is then communicated to the on-board RFID chip that is controlling the on-board NFC reader. In a Step 3, the on-board RFID chip communicates a return signal to the RFID reader 8r preferably including both a unique game piece ID and a unique physical location ID, where the reader 8r then communicates this information or similar to the game app and computing device 15, 17. As prior discussed especially in the parent application, the game app and computing device 15, 17 has access to pre-known physical-to-logical mapping relating the game board 10-4 physical locations such as 10-4cn to the game overlay 11-4 logical locations such as 11-4Ln, such that by receiving the physical ID the game app is then able to translate the physical ID into a logical ID.

As will be understood by those familiar with RFID technology, if game pieces 8c-f4-1 and 8c-f4-2 are implementing active RFID, then the Step 1 interrogation signal can function as an "on" command to commence a time loop where the active RFID conducts Steps 2 and 3 without further interrogation signals (i.e. Step 1) from reader 8r until receiving another Step 1 interrogation signal that functions as an "off" command. It is also possible that with active RFID the game pieces 8c-f4-1 and 8c-f4-2 include and active motion sensors to only active the on-board NFC reader once motion is detected followed by a period of no motion, whereupon Steps 2 and 3 are conducted. Again, those familiar with active RFID will understand these various possibilities all of which are considered of use for the present invention, and each of which have tradeoff costs and benefits providing the possibility of various game piece implementations as herein described and anticipated.

Figure 6B:
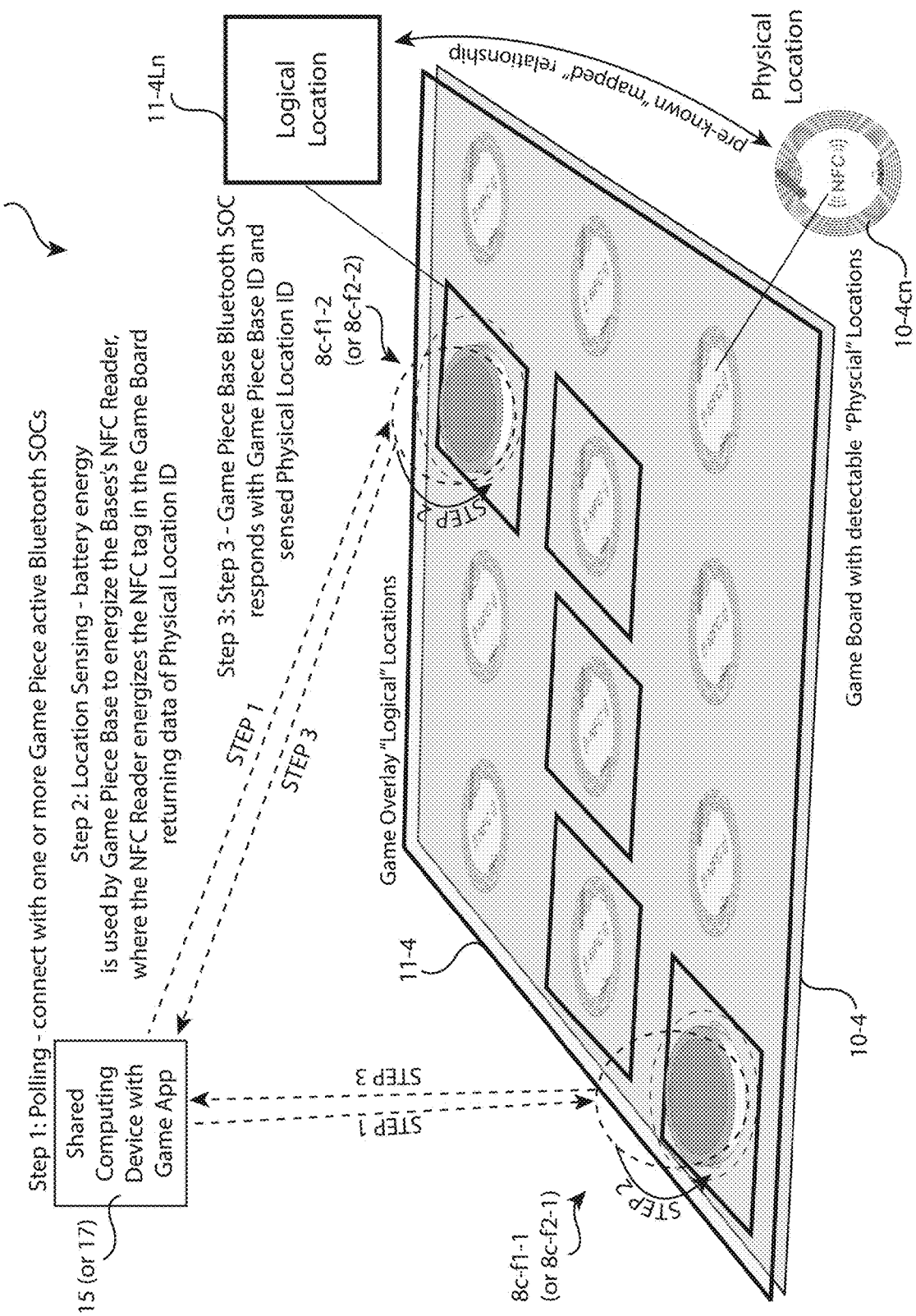
FIG. 6B depicts system 2 in operation using a BT communications-based game piece 8c-f1-1 or 8c-f1-2. The BT based game pieces 8c-f1-1 or 8c-f1-2 communicate directly with the game app and computing device 15, 17 and therefore the NFC reader 8r of FIG. 6A is omitted. The use of the active BT technology is like the step 1, 2 and 3 descriptions as adapted for RF based game pieces 8c-f4-1 or 8c-f4-2 described in FIG. 6A, where the RFID communications component is an active RFID.

Referring next to FIG. 6B, the main difference is the use of the Bluetooth based technology stack described in relation to FIG. 4B for a game piece 8c-BT versus the RFID stack of game piece 8c-RF described in FIG. 4A and used in FIG. 6A. One key advantage with the BT game pieces such as 8c-f1-1 or 8c-f1-2 is that these pieces communicate directly with shared computing device with game app 15 (or 17) and therefore do not require an RFID reader such as 8r (see FIG. 6A.) Similar to the prior discussion in relation to FIG. 6A that used an active RFID game piece, the game pieces 8c-f1-1 and 8c-f1-2 implementing the Bluetooth tech stack 8c-BT are also active and therefore a Step 1 of polling can be limited to a first transmission from computing device 15, 17 to game pieces 8c-f1-1 and 8c-f1-2 of an "on" signal followed by a later transmission of an "off" signal. Once the on signal is received by the Bluetooth based game pieces 8c-f1-1 and 8c-f1-2, either a time loop or a motion activated loop comprising Steps 2 and 3 is preferably implemented. Those familiar with wireless communications and active remote devices will recognize that there are several possible variations all of which stay within the spirit and anticipation of the present invention.

Referring to both FIGS. 6A and 6B, the depictions of the various system 2 parts are illustrative and are not meant to be of scale or even indicative of for example the number of physical locations (for example as implemented by NFC tags such as 10-4cn) where this number of physical locations is also referred to as the physical resolution of the game board 10-4 and can vary with cost tradeoffs and benefits that will be well understood to game designers. Additionally, the depictions are not meant as a limitation regarding the size or shape of the minimum determinable logical location such as 11-4Ln, that may take on any size and shape as prior discussed herein and in the copending application. What is important is that a logical location is sufficiently co-located over at least one physical location, where this is a controllable requirement addressable during the game design. The size of the NFC reader and therefore also the game piece base (such as any of 8c-f1, 8c-f2, 8c-f3, 8c-f4 or 8c-f5) is also a factor of consideration, where the present invention anticipates game pieces designed of any size but generally large enough to detect at least one physical location.

Referring next to FIG. 7, there is shown an exemplary active figurine 8a-1 attached to a game piece base that includes a power and data connection for powering and providing to the active figurine 8a-1 action control signals. As those familiar with toys and miniature robotics will understand, there are many exciting and interesting electronically controllable actions that can be incorporated into an active figurine, such as the depicted robot 8a-1. For example, it is possible to incorporate light emitting elements such as LEDs or LED strings. It is also possible to incorporate speakers, where at least with the Bluetooth technology stack 8c-BT discussed in relation to FIG. 4B, it is also possible to receive from the game app an audio file for communications to the figurine 8a-1 for output on a speaker incorporated into figurine 8a-1. Miniature motors are also available in the marketplace that are of dimensions less then 10 mm and therefore small enough to provide rotational power for moving various parts of a figurine such as 8a-1. It is also possible to include small cavities within the figurine 8a-1 that can for example be electronically opened if not then also closed for example by activating one or more magnets, where the cavity contains a small object that is desirable for game play.

As discussed in the copending application, all of these electronically controllable actions are preferably directed by action control signals determined and provided by the game app on a computing device 15 or 17 or either of the local 30 or global 40 ecosystems (see FIG. 1 and the copending application) where the determination of the action control signals is based at least in part upon any determined or changing game datum, such as a newly determined logical location of a game piece such as 8a-1 or a calculated game state (such as a score relative to a player.) What is important to see is that a game piece base such as 8c is sufficient for providing game piece ID and physical location ID information to the game app and computing device 15 or 17, and that game piece bases such as 8c can be further modified to support active figurines such as 8a-1 of many variations that are responsive to action control signals determined by the system based at least in part upon any of game datum, where the active figurines such as 8a-1 provide outputs that are perceivable to at least one player, and where the outputs are provided based at least in part as a response to the action control signals.

Referring next to FIG. 8a, there is shown a game system coloring book 70 comprising one or more pages of line art representing parts and elements of a game including: game overlay(s) 70-1, game character inputs 70-2 and game cards 70-3. Preferably the coloring book pages are perforated, and the tear-off size matches the required game overlay 11-4 size for fitting on one or more game boards 10-4, where for example the overlay size is 8.5"×11" (letter) or 11"×17" (tabloid). As will be discussed in more detail with respect to FIG. 8b, after coloring a page a player uses a camera such as a device camera 15*c* or 17*c*, a web-camera, a camera toy built for use with the game (see magnifying glass 23 in upcoming FIGS. 10A and 10D) etc. to capture an image of the coloring book page such as 70-1, 70-2 or 70-3 to determine game input, where game input includes verification of completeness, selecting colors for use in the virtual content associated with the game, and interpreting colors for enabling or disabling features and aspects of the game. For example, after sufficiently coloring and verifying a game overlay 70-1, a player removes the overlay page 70-1 from the color book 70 and places it over the game board 10-4, thus becoming the game overlay 11-4. As will be discussed in greater detail with respect to upcoming FIGS. 9A, 9B, 9C and 9D, game cards 70-3 can also be colored or be pre-printed with colors, after which the cards are removed from the book 70 and preferably cut with scissors or torn along perforations to form individual cards for use with the game.

Referring next to FIG. 8*b*, there is shown an exemplary coloring page that is a game character input 70-2 but that could be any page such as a game overlay page 70-1 or a game cards page 70-3. There are 5 key steps in the use of the coloring book for determining game inputs including any of: 1) verifying that pages have been sufficiently colored; 2) selecting colors for use in virtual game content based upon colorization choices of the player, or 3) using colorization choices of the player to enable or disable features and aspects of the game. In Step 1, the player colors a selected (or instructed) page from coloring book 70, such as character input page 70-2. Preferably the page such as 70-2 includes multiple calibration marks such as 70-*cm* and at least one identifying ID such as a number, bar code, QR code 70-*qr* or an embedded NFC tag. In Step 2, an image such as 70-2-*img* is captured of the coloring book page such as 70-2 using a camera such as the camera 15*c* or 17*c* included with computing devices 15 or 17, respectively, or an axillary camera such as a web-cam or a game toy/game device camera such as magnifying glass with camera 23.

Still referring to FIG. 8*b*, as will be understood by those familiar with image processing, preferably for each coloring book 70 page such as 70-1, 70-2 and 70-3 to be verified or used for game input the system 2 (or system 1) maintains a digital image or representation of that same page that can be recalled for example by using at least in part the coloring book page ID, such as 70-*qr*. As a part of Step 2, game app running on computer 15 or 17 receives a unique coloring page ID from the player by data entry or uses an image processing function to translate an identifying ID such as 70-*qr* within the image 70-2-*img* to then determine a page ID, all as will also be understood by those familiar with image processing functions. After receiving or determining the page ID such as 70-*qr*, either the game app running on computer 15 or 17, or an image processing function running for example remotely on an eco-system such as 30 or 40 that is in communications with game app and computing device 15 or 17, retrieves the digital image or representation associated with the currently identified page being processed such as 70-2. In Step 3, as will be understood by those familiar with image processing, any perspective or warp distortions of image 70-2-*img* can be substantially removed at least in part by using image processing to find and measure calibration marks 70-*cm-img* within image 70-2-*img*, where the calibration marks 70-*cm-img* are of pre-known distance separation that is useful for directing the unwarping of an image. After adjusting captured image 70-2-*img* to remove distortions, it is then possible to perform a registration function that relates the pixels in the undistorted captured image 70-2-*img* with the retrieved digital image or representation associated with the colored page 70-2.

Still referring to FIG. 8*b*, in the processing of Step 4, it is preferred that the registered retrieved digital image or representation includes pre-determined meta-data indicative of one or more pre-determined color sample points 70-*sp*, where for example the sample points 70-*sp* are expressed as relative row, col coordinates defining a sample point or area within the digital image or representation. Using the undistorted and registered image 70-2-*img* of the colored page, it is then possible to map the color sample points 70-*sp* from the retrieved image or representation onto the captured image 70-2-*img*, where a player selected color(s) is then retrieved from the captured image 70-2-*img* substantially at the mapped sample points 70-*sp*. In Step 5, retrieved colors are then used for game inputs. For example, one or more sampled colors from points 70-*sp* are preferably incorporated into the virtual content of the game that is later displayed via the game app running on a computing device such as 15 or 17. Examples of virtual content include a computer animation of any of the game parts such as a game overlay 11-4 (e.g. page 70-1) a game character (e.g. page 70-2) or a game card (e.g. 70-3.) In the use case of a character input page 70-2 there is a corresponding virtual avatar with substantially the same features as the game character depicted on the colored page 70-2, where at least some of the colorization of the virtual avatar is representative of colors sampled from the corresponding processed image 70-2-*img*, and therefore the virtual avatar appears to be colored in by the player.

Furthermore, in relation to Step 4, it is also preferred that an image corresponding to a coloring book 70 page such as 70-1, 70-2 or 70-3 further includes pre-determined meta-data representative of color regions 70-*cr* in addition to color sample points, where for example a color region 70-*cr* is a portion of the coloring page that is intended to be colored by the player in a similar fashion, such as an area on the character's boots as presently depicted. As will be understood by those familiar with image processing, regions can be defined by a collection of points (row, col) addresses which are assumed to be connected by straight lines or splines, where the splines can also be represented as digital information and stored in association with any of the point addresses. In Step 4, after the retrieved digital image with any such coloring regions as 70-*cr* is registered, then the points and splines as defined for the coloring region 70-*cr* can be mapped to the captured image 70-2-*img*, such that the captured image 70-2-*img*'s pixels substantially defining the same color region 70-*cr* can be analyzed. In one use, analyzation calculates the percentage fill of the mapped color region 70-*cr* in the colored image 70-2-*img*, where the percentage fill in Step 5 is then compared to a threshold as set by the game such that a player is instructed to continue coloring either the page 70-2 in general, or even the specific areas such as 70-*cr* that are not sufficiently completed, where these specific areas could be shown to the player via the game app and a computing device such as 15 or 17. In another use, analyzation determines a best color representation for the given color region 70-*cr*, obviating the need for color sample points such as 70-*sp* for mapping player chosen colors onto virtual representations of the game elements represented in the coloring book 70, such as a game character 70-2.

Still referring to FIG. 8*b* and Step 5, in yet another use of player chosen colors as game inputs, certain color regions 70-*cr* or sample points 70-*sp* can be used to alter the game play. For example, if the colored page is a game overlay such as 70-1, a color region 70-*cr* of the overlay 70-1 might represent sky. If the sky is colored by the player to be a colorization light blue vs. dark blue vs. red, etc., the game play can be set with a different difficulty level, or a different type of questions, tasks or challenges. In this sense, a player can set the "mood" of a game, where game app running on a device 15 or 17 either: 1) informs the player of color regions 70-*cr* that will effect an aspect(s) X of the game; 2) in addition to (1) informs the players as to which colors cause which change or setting to a game aspect(s) X, or 3) does not inform the player with respect to any one or more color regions 70-*cr* that can change game play aspect(s) X, such that the changes are a surprise. And finally, in a Step 5, depending upon the game rules, a player may be required to continuing coloring one or more pages such as 70-2 before play commences or continues, such that these external activities become critical to the game play.

As will be understood by those familiar with image processing, the exact ordering of system image processing as represented by the Steps 2 through 5 can be altered, where even some functions are omitted, and other useful functions not described are added. As such, at least Steps 2 through 5 should be considered as exemplary rather than limitations of the present invention. For example, it is possible that Step 2 is for image capturing only and in Step 3 a QR code such as 70-*qr* in the captured image 70-2-*img* is analyzed to determine a page ID, where using the determined page ID the corresponding digital image or representation of example page 70-2 is retrieved for processing. It is further possible that the corresponding information is only meta-data representations of color sample points 70-*sp* or color regions 70-*cr*, where a corresponding digital image of the page 70-2 is not necessary. It is also possible that during Step 2, when the player is capturing an image 70-2-*img* of the colored page 70-2, the game app running on device 15 or 17 is providing a visualization that assists the player in aligning the colored page 70-2 with respect to the image capturing camera such as 15*c* or 17*c* such that the captured image 70-2-*img* is substantially free of warping and distortion, thus obviating the need for any further image processing in a Step 3 to remove any such distortion. It is further possible that in Step 3, rather than removing distortion from the image 70-2-*img*, the image processing uses the determined image coordinate locations of the calibration marks 70-*cm* to mathematically adjust the predetermined color sample points 70-*sp* or color regions 70-*cr*. What is important to see is that a player is given the opportunity to color a page such as 70-1, 70-2, 70-3 and by processing image data such as 70-2-*img* the system 2 (or 1) can determine game inputs based at least in part upon any of colors chosen by the player or features of the player's coloring of the input page such as the percentage filled of a given color region 70-*cr*.

Referring next to FIG. 9A, there is shown game card with included ID 70-3*a*, where the included ID is preferably either a printed ID 70-3*a*-*pid* such as a bar code, QR code or an alpha-numeric code, or an embedded ID 70-3*a*-*eid* such as an NFC tag or an RFID tag. Those familiar with image processing will understand that the printed ID 70-3*a*-*pid* can be imaged and decoded using an image processing function preferably included with the game app running for example on a mobile device including a camera such as a tablet 15 or smart phone 17. As discussed herein, game bases such as 8*c* in any of its various technology stacks (see FIGS. 4A, 4B) and forms (see FIGS. 5A, 5B, 5C, 5D and 5E) includes an NFC controller capable of reading an imbedded ID 70-3*a*-*eid* such as an NFC tag. As also discussed, game bases 8*c* are also in communications with game app and computing devices such as 15 or 17 such that game card IDs scanned by a game base 8*c* are then provided to the game app via the communications path such as Bluetooth or RFID. Many mobile devices including cell phones now also include NFC readers and as such are capable of directly reading an embedded ID 70-3*a*-*eid* that is for example and NFC tag.

When using game cards that have been produced with included ID 70-3*a*, it is expected that the game app has access to or includes a dataset of registered game cards 70-3*a*, such that for example if the game is based upon the popular "Yu-Gi-Oh! Trading Cards" that typically already include identifying printed numbers on one of the surfaces, the game app will already be able to identify any given card 70-3*a* once it is properly scanned, where identification additionally includes accessing any other set of datum associated with the identified card 70-3*a*, such as character names, special powers, gear, etc. Also, as will be discussed in greater detail with respect to upcoming FIGS. 10A and 10D, a game toy such as magnifying glass 23 preferably also includes both a camera and an NFC reader and therefore can be used to detect and determine either of game card printed ID 70-3*a*-*pid* or embedded ID 70-3*a*-*eid*, where this for example removes the need for younger children to have access to a smart phone such as 17 for playing with gaming system 2 (or 1.)

Referring next to FIG. 9B, there is shown game card without ID 70-3*b* that has been inserted into game card sleeve including ID 70-3*s*, where the sleeve included IDs are like those of game card 70-3*a* for example being either a printed ID 70-3*s*-*pid* or an embedded ID 70-3*s*-*eid*. Whether using a game card with included ID 70-3*a* or game card without ID 70-3*b* (that has been inserted into a game card sleeve 70-3*s*) it is possible for the game app running on a computing device such as 15 or 17 to identify the game cards using either of image processing or NFC reading. Unlike using game cards with ID 70-3*a*, when using game cards without ID 70-3*b* it is necessary to register each card preferably using a function included with the game app running on a computing device such as 15 or 17. In this case, the game app preferably already has a game card list of the possible cards (and therefore also any other set of datum associated with the card as discussed above) and for example this list includes a card name and image of the card front surface. During registration, a player for example first scans an ID included with a sleeve 70-3*s*, such as printed ID 70-3*s*-*pid* or embedded ID 70-3*s*-*eid*, after which the player selects a game card without ID 70-3*b* from the game card list, thus associating the game card 70-3*b* with the sleeve 70-3*s*. Once all game cards 70-3*b* and associated sleeves 70-3*s* are registered, either of game cards with ID 70-3*a* or game cards without ID 70-3*b* are usable in an active game board-based gaming system 1 (described in the parent patent) or an active game piece gaming system 2 as herein described.

As will also be appreciated by those skilled in the art of image processing, it is possible that an image of either the front or back surface of a game card without an ID 70-3*b* be used as a unique identifier. In this case, the game app running on a computing device such as 15 or 17 has a pre-known registry of game card front (or back) surface images and uses image processing of a captured image of the card 70-3*b* to perform feature matching against the pre-known registry surface images, where the feature matching is like facial recognition or other well-known pattern and texture matching algorithms. The result of the comparison uniquely identifies a match (or a short list of possible matches where the card match is then confirmed by the player.) As with game card 70-3*a*, magnifying glass 23 is also usable for capturing any of game card surface images for registration or game card sleeve IDs 70-3*s-pid* or 70-3*s-eid*.

Referring next to FIG. 9C, whether using a game card with ID 70-3*a* that preferably comes with a game that includes a pre-registered list of game cards or using game cards without ID 70-3*b* that must be identified and registered (preferably using a pre-known list of unregistered game cards) it is then possible using the present system 2 or copending system 1 for a player to play these game cards 70-3*a* or 70-3*b* onto a game board and overlay such as 10-4 providing additional game card physical/logical location information. In preferred game play, regardless of using copending system 1 or present system 2, step 1 includes the game app running on a computing device such as 15 or 17 to prompt the player to select the game card such as 70-3*a* or 70-3*b* (preferably in sleeve 70-3*c*) that they wish to play for their turn. In response to the game app prompting, the player then uses a system device for identifying the card as prior discussed, where system devices include a computing device 15 or 17 camera, a computing device 15 or 17 NFC reader, an active game piece base 8*c* NFC reader, an active game board NFC reader (see 10*b* variations in copending system 1, copending FIGS. 7 and 8) or a game toy device such as magnifying glass 23 camera or NFC reader (see present FIGS. 10A and 10D.)

Referring next to FIG. 9D, once a player has identified the game card such as 70-3*a* or 70-3*b* (in sleeve 70-3*c*) that they intend to play for their turn, in an optional step 2 the player places the game card onto for example the passive game board 10-4, after which they place an active game piece 8*c* on top of the played card when using system 2, or a passive game piece 8*b* on top of the played card when using system 1. When using system 2 as herein described, game piece 8*c* is then able to detect the physical location where the game card has been played on the passive game board 10-4, as a careful reading and understanding of the present invention will make clear. When using system 1 as described in the parent application, active game board base 10*b* is then able to detect passive game piece 8*b* to be located at a specific physical location on the active game board 10, as a careful reading and understanding of the copending invention will make clear. In either case, the determined physical location of the active game piece 8*c* or passive game piece 8*b* is then usable by the respective gaming system as a physical location of the played game card 70-3*a* or 70-3*b*.

For many games it will be sufficient and exciting simply to perform step 1 (of FIG. 9C) such that the gaming system 1 or 2 can cause further actions such as displaying video content on a shared computing device (such as tablet 15) and/or private computing device (such as smart phone 17.) For example, the popular "Yu-Gi-Oh!" game has a companion TV show where the TV characters play their cards that then come to life as an animation. Using the present teachings, after a player selects their card in step 1, a similar animation could then be played via the game app running on a computing device such as 15 or 17. Or, the similar animation could be played on the device 15 or 17 only after a step 2 is performed. Another benefit of including the optional step 2 in a game is that the game functions can then be further adapted to cause for example different questions, clues, assignments, tasks, action control signals, etc. as discussed in the copending application based upon what portion of the game board onto which the game card is played. As will be clear from a careful reading of the present invention, it is also possible to determine a physical location where a game card 70-3*a* or 70-3*b* has been played using system devices such as 15, 17 or 23.

And finally, with respect to both game cards 70-3*a* and game card sleeves 70-3*c*, the present invention teaches a variation where the card 70-3*b* or sleeve 70-3*c* can be detected as being laid down upon the game board either facing up or facing down providing for further game functionality. A preferred apparatus for implementing this feature is the provision of a multi-layer composition including: 1) a "face of the card is facing down" NFC tag; 2) a "backside of the card is facing down" NFC tag, and 3) a shield layer for substantially blocking any interrogation signal attempting to read an NFC tag, where the shield layer is placed such that an NFC tag (1) or (2) is substantially detectable from only one direction such as the up direction or the down direction. As a careful consideration will show, when the top or face of a further adapted active game card or sleeve is placed such that the "face of the card is facing down" upon an active game board capable of detecting NFC tags (such as used with passive game pieces) then the (1) NFC tag is substantially detectable while the (2) NFC tag is shielded by the shielding layer (3). Conversely, when the bottom or backside of a further adapted game card or game card sleeve is placed such that the "backside of the card is facing down" upon the game board, then the (2) NFC tag is substantially detectable while the (1) NFC tag is shielded by the shielding layer (3). Thus, an active game board detects only one of the "face-down" or "backside-down" NFC tags such that the game app receives this indication allowing for different "face-down" vs. "backside-down" game responses. If the game board base is passive, then an active game piece placed on top of a further adapted game card or sleeve will detect the NFC tags oppositely from the just described active game board detection, wherein the game app considers this reversal before responding.

Referring next to FIG. 10A, there is shown a magnifying glass 23 as described in a copending provisional application No. 62/564,306 entitled INTERACTIVE GAME THEATER WITH SECRET MESSAGE IMAGING SYSTEM filed on Sep. 28, 2017. (Note that in the copending application the magnifying glass was element number 15 and has been herein renumbered to 23 to not be confused with the presently described computer system 15 for running the game app.) The copending patent taught the magnifying glass 23 for use with displays and projectors capable of emitting various combinations of public and private images, where private images where useful for providing secret messages to a guest or gamer participating in a physical-virtual game at a destination such as a theme park, museum, resort, etc. The magnifying glass 23 had several variations and itself was a single lens variation of dual lens glasses 14 first taught in the parent application INTERACTIVE OBJECT TRACKING MIRROR-DISPLAY AND ENTERTAINMENT SYSTEM. Key parts of the magnifying glass 23 include a linear polarizing, active shutter lens 23-lp-asmd that was further adapted to include a modulator for electronically rotating the polarization angle of the incoming light. The purpose of the present FIG. 10A is to present the magnifying glass 23 as described in prior teachings to further teach how it can be used with the copending system 1 or present system 2. The present inventor has filed additional co-pending provisional applications further addressing enhancements to both the glasses 14 and magnifying lens 23 entitled SUB-CHANNEL VIDEO-AUDIO PROVIDER FOR ADJUSTABLE STORIES AND GAM- ING SYSTEMS including U.S. Provisional No. 62/582,458 filed on Nov. 7, 2017, U.S. Provisional No. 62/614,854 filed on Jan. 8, 2018, U.S. Provisional No. 62/625,570 filed on Feb. 2, 2018 and U.S. Provisional No. 62/652,486 filed on Apr. 4, 2018.

Figure 10D:
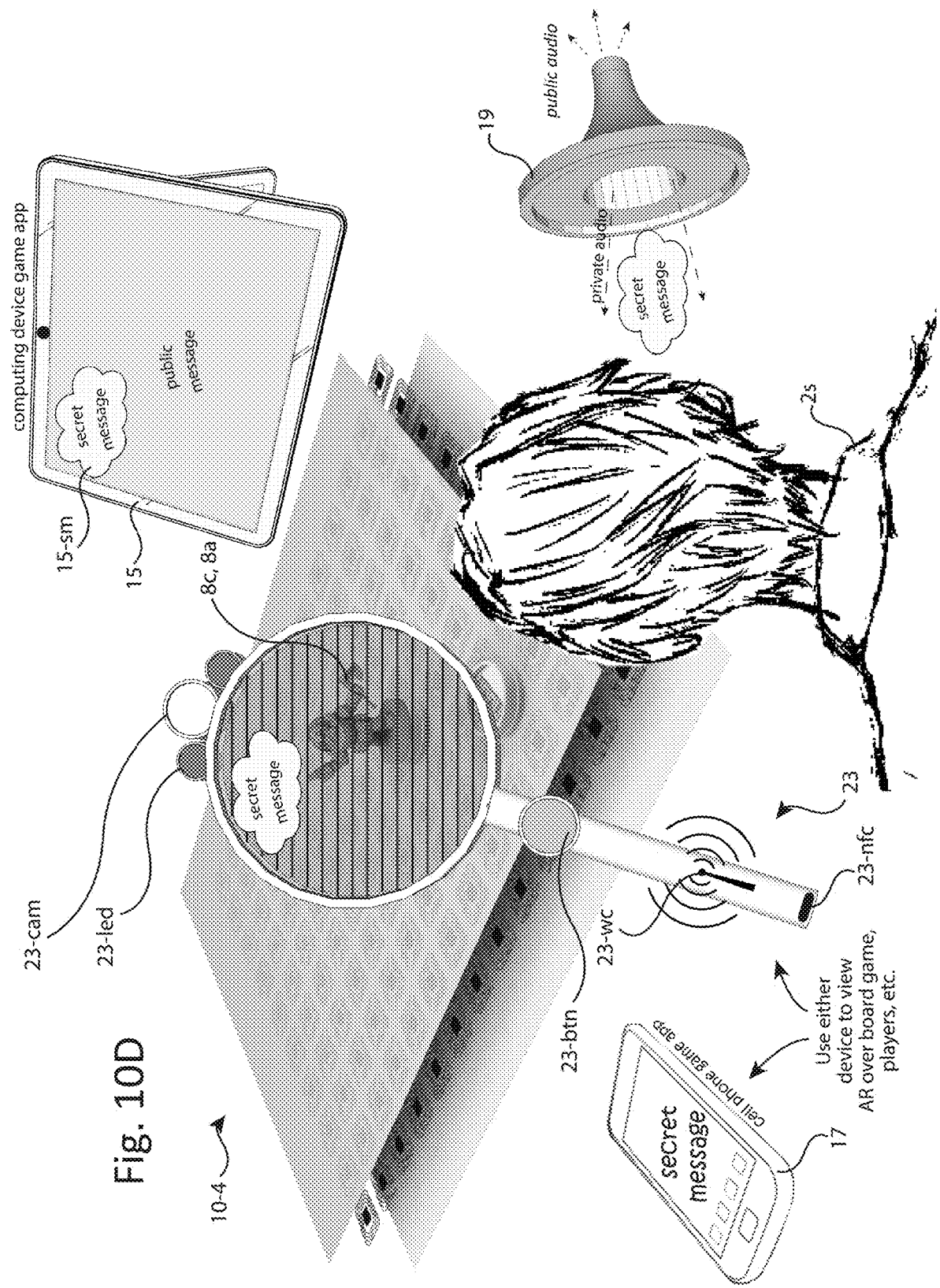
FIG. 10D is a perspective view depicting a player 2s playing a game with the presently taught system 2 comprising: passive game board 10-4, active game piece base 8c holding figurine 8a, game app running on shared computing device 15, game app running on (preferably) private computing device 17, where game piece base 8c is in communications with computing devices 15 and 17 for example using a Bluetooth connection, as well as magnifying glass 23 and audio game device 19 that are both in communications with the game app running on either of computing devices 15 or 17.

Still referring to FIG. 10A, the copending system 1 and presently taught system 2 are capable of working with any of the variations taught in these copending applications, and what is important to see is the magnifying glass 23: 1) is capable of causing the lens 23-Ip-as-md to be substantially opaque (active shutter closed) or transparent (active shutter open) or alternatively opaque and transparent in coordination with an video stream emitted from a display (such as on a computing device 15 or 17); 2) is capable of providing private video emitted by a display on a computing device such as 15 or 17 as a secret message to a viewer 2s at least when the active shutter is coordinated with alternately displayed public and private images by the device 15 or 17, where the active shutter is opaque when the device 15 or 17 is emitting the public image and transparent when the device 15 or 17 is emitting the private image, and 3) is capable of emitting an internal image C for example using an LCD projector 23-LCD that either a) combines with light being transmitted through lens 23-Ip-as-md (i.e. when lens 23-Ip-as-md is transparent) thus providing a first type of augmented reality, or b) is exclusively received by a viewer 2s (i.e. when lens 23-Ip-as-md is opaque); 4) is capable of capturing images and video of the view substantially in front of the magnifying glass 23 using back facing camera 23-cam-b; 5) is capable of providing a second type of augmented reality by a) causing lens 23-Ip-as-md to be opaque thus blocking all incoming light, b) causing camera 23-cm-b to receive images of the front view, c) processing the images of the front view to include additional visual features using for example a computing device included with electronics 23-elc, and d) emitting the front view image with additional features as an augmented reality internal image C; 6) is capable of communicating with the game app running on a computing device such as 15 or 17, for example using Bluetooth; 7) is capable of receiving input indications such as with a button 23-btn, wheel 23-whl or a touch input means included with lens 23-as, and 8) is capable of providing output indications such as by causing LEDs 23-led (see variation 23 in upcoming FIG. 10D).

Referring next to FIG. 10b, there is shown a public/private audio game device 19 preferably comprising a shared speaker 19-s, light output means such as LED(s) 19-led, vibration element 19-h, private speaker 19-p and NFC tag 19-nfc. Audio game device 19 further comprises (but not depicted) communications means such as Bluetooth for at least receiving action control signals or datum such as audio streams from game app and computing devices such as 15 or 17, along with necessary power apparatus including any of battery and or wireless charging components.

Referring next to FIG. 10C, in a preferred form, audio game device 19 is shaped as a cone as depicted, or any shape where one end of the shape serves both as an opening for fitting over the ear to receive private audio and as an opening into which the bottom side of any form of active game piece 8c can be fitted, where active game piece 8c may or may not include a figurine such as 8a, where any form includes base pieces 8c that are for example square in shape rather than the depicted circular. Once fitted into the mated end of the audio game device 19 in the exemplary shape of a cone, active game piece 8c is then able to detect and read a unique ID stored in audio device NFC tag 19-nfc, where this audio device 19 ID is then communicated by game piece 18 to game app running on a computing device 15 or 17. When using copending system 1 with passive game pieces 8b rather than active pieces 8c, audio device 19 is further adapted to include and NFC reader rather than an NFC tag for component 19-nfc, where upon audio game device 19 is then able to confirm a player by reading for example the passive NFC tag in the game piece base 8b, after which audio device 19 communicates this game piece base 8b ID to the game app running on a computing device such as 15 or 17. As will be understood by those familiar with game toys, there are many shapes possible other than the depicted cone shape 19 for which the present teachings are equally or similarly applicable and what is most important is that the audio device 19: 1) is in communications with the game app running on a computing device such as 15 or 17, and 2) is able to either a) provide a unique audio device ID to the game app on device 15 or 17 through detection and transmission using an active game piece 8c, or b) provide a unique game piece base ID (e.g. using copending system 1's passive game piece bases 10b) to the game app on device 15 or 17, such that by using either approach (a) or (b) the game app on device 15 or 17 is capable of receiving both the unique ID of the audio device 19 and the unique ID of the player's game piece 8b or 8c where in so doing the game app can deliver customized audio messages including private audio through private speakers 19-p to a selected player.

It is necessary that the audio game device 19 have sufficient power and computing elements (not depicted but considered well-known) along with private speakers to function as a secret message audio device, where computing elements include communication means such as a Bluetooth chip as prior discussed for communicating with the game app running on a computing device 15 or 17. Given advancement in the state-of-the-art of wireless power, it is possible to design an audio game device 19 that has a battery that is dynamically recharged such that the device 19 appears to the players to be permanently powered such that replacing batteries is not necessary. Again, it is most desirable that audio game device 19 have means for confirming the player identity prior to providing in conjunction with the game app any of secret messages as private audio, where using an identification means such as NFC tags and readers that align with the means of the gaming system 1 or 2 implementation is also preferred. And finally, as will be shown in relation to upcoming FIG. 10D, there are also exciting uses for shared speaker 19-s that output public audio, lighting such as 19-led and vibration element such as 19-h for at least drawing additional attention to audio game device 19, although these elements are not required for the core purpose of providing secret messages to a selected player.

Referring next to FIG. 10D, there is shown a perspective view of a player 2s playing a game with the presently taught system 2 comprising: passive game board 10-4, active game piece base 8c holding figurine 8a, game app running on shared computing device 15, game app running on (preferably) private computing device 17, where game piece base 8c is in communications with computing devices 15 and 17 for example using a Bluetooth connection, as well as magnifying glass 23 and audio game device 19 that are both in communications with the game app running on either of computing devices 15 or 17. In addition to the descriptions in relation to FIG. 10A relating to the prior copending teachings for the magnifying glass 23, the preferred magnifying glass 23 for use with either of systems 1 or 2 includes an NFC element 23-nfc, where the NFC element is preferably an NFC reader similar to that used in game piece bases 8c and can therefore either read other passive NFC tags (such as in passive game pieces 8b or passive game boards 10-4) or can exchange data with other NFC readers (such as in active game pieces 8c or active game boards 10 where therefor element 23-*nfc* is acting like an NFC tag.)

Still referring to FIG. 10D, what is important to see are the number of ways to communicate video, audio and video-audio information and content to a player 2s, where often this content is a secret message. The parent application described how content being displayed by the game app on a computing device such as shared computer 15 can at least provide an alternating sequence of public and private images, where when coordinated with glasses 14 (see parent application) or magnifying glass 23, each comprising an active shutter for blocking the public image and transmitting the private image to a player 2s, where only the player 2s using the glasses 14 or magnifying glass 23 perceives the private and therefore secret message, while all other players perceive for the temporal blend of the public and private images. The parent application also discussed how a computing device 17 (such as a smart phone) can provide selected game app functions and content to a specific player, rather than a shared computing device such as 15, thereby also function to provide at least secret messages.

The present inventor anticipates that either in some situations (such as a classroom) or with some age groups (such as under 10 years old) players may not have cell phones such as 17 for use in playing a game and therefore be limited in receiving secret video and audio. The present invention anticipates that a magnifying glass 23 for providing many functions including secret messages can be shared by many players of a game and will be a much lower cost device than a smart phone. Like a smart phone 17, the magnifying glass 23 is capable of capturing images of the scene substantially in front of the device and for then presenting these same captured images with augmentation to the player 23, thus providing augmented reality where a game piece figurine 8a comes alive at some point during the game based at least in part upon information in the game database including current or changed game piece logical locations (see the parent application for more details on the game database.) What is important to see is that the gaming systems 1 or 2 provide exciting shared/public virtual content, secret/private messages and augmented reality that is based at least in part upon the on-going changes in the game as preferably represented in the game database. Using both the smart phone 17 and magnifying glass 23, each of which include an NFC reader, it is possible for a player to for example scan a game board location, game card, game piece, or other related game device including a NFC tag component, where after scanning the player is presented by the system 1 or 2 with public or secret information using the scanning device 17 or 23 respectively, and/or the same or different public information such as a movie video clip is presented on a shared computing device such as 15. (It is also important to see that using magnifying glass 23 with the built-in camera 23-*cam*, images can be captured of the coloring book 70 pages such as 70-1, 70-2 and 70-3, where the use of these images such as image 70-2-*img* was discussed in relation to FIG. 8b.)

Still referring to FIG. 10D, the cost of audio game devices 19 is expected to be very low such that a game system can include one device 19 per player, or otherwise multiple players share a single device 19. What is important to see is that using an audio game device 19 a player 2s can receive secret/private audio preferably based at least in part upon the on-going changes in the game as represented in the game database. Audio game device 19 also includes means for providing shared/public audio. All of game app running on a smart phone 17, magnifying glass 23 and game audio device 19 have further exciting elements for causing lighting and vibration to draw the attention of one or more players 23 in accordance with the on-going game state.

Referring next to FIG. 11a there is shown a component level depiction of a universal physical-virtual gaming platform 3, where the various components have different implementations based upon whether they are: 1) exclusively meant to work in a system 1 wherein the game board is active and the game pieces are passive; 2) exclusively meant to work in a system 2 wherein the game board is passive and the game pieces are active, or 3) meant to work in either system 1 or 2. Starting from the bottom of FIG. 11a, the general components include: 1) an active or passive game board layer 3-1 that provides a multiplicity of physical locations; 2) optional active sound layer 3-2 that provides one or more distinct speaker areas, where game board layer 3-1 and sound layer 3-2 are optionally combinable into a single layer; 3) active or passive game overlay layer 3-3 providing one or more logical locations; 4) optional mixed transparent—opaque layer 3-4 providing one or more substantially transparent areas and one or more substantially opaque areas, where collectively board layer 3-1, optional and combinable sound layer 3-2, game overlay layer 3-3 and optional mixed transparent-opaque layer 3-4 present a 2D interface in the dimensions of width and depth, where the interface is tillable using additional similar components so as to increase the total 2D area presented as an interface (see FIG. 2A); 5) active or passive game surface 3D extension piece(s) 3-5, where extension pieces 3-5 are stackable on the 2D interface presented by the possible combinations of layers 3-1, 3-2, 3-3 and 3-4 to then further provide a height dimension to the game interface; 6) passive or active game piece base 3-6, and 7) passive or active game piece figurines 3-7.

Still referring to FIG. 11a, the preferred active game board layer 3-1 has been described as element 10 with respect to the parent application, including several alternative variations while the preferred passive game board layer 3-1 has been described herein as element 10-4. Active sound layer 3-2 is introduced with respect to the present figure. Currently, there are many low-cost speaker designs for providing an optional sound component to gaming platform 3, and therefore either of gaming systems 1 or 2. A preferred product for use as layer 3-2 is called "T-paper" and is manufactured and sold by the Institute for Print and Media Technology and can be seen at the URL https://www-user.tu-chemnitz.de/~schg/t-paper/wordpress/startseite/. The T-paper is described as "a technology which allows the manufacturing of loudspeakers solely by means of conventional mass printing technologies on flexible substrates like foil or even paper. More precisely, we are talking about printed piezoelectric loudspeakers, i.e. a piezoelectric crystal transfers an applied AC voltage to a mechanical deformation and a vibration of the whole substrate. If the frequency of the AC in our case a piezoelectric polymer is sandwiched between two organic electrodes, i.e. we have truly fully plastic speakers without magnets. All layers can be printed step by step on a substrate but thanks to new developments during the last three years, we are now able to integrate all electronic layers within a special paper—the tone paper—or shorter T-paper—was born making it possible to print on both sides of the paper color pictures or whatever you are used to print (or write) on paper. The printed electronics part keeps hidden and invisible signal is in the frequency range of 20 Hz to 20 kHz, audible sound is generated." One described use is for a "T-book" where each page is essential its own speaker.

The present invention anticipates that there is a multiplicity of "paper speaker areas" such as X, Y and Z along with some areas for layer 3-2 that provide no speaker, where the individual paper speaker areas are not necessarily the same size. The preferred layer 3-2 incorporates a multiplicity of paper speaker areas that align with one or more consecutive physical locations. It is then further preferred that the supporting electronics is constructed so one or more of paper speaker areas can be operated simultaneously thus providing for a dynamic game board soundscape. As those familiar with speaker technology will understand, there are many micro speaker devices for embedding sound into toys and other low-cost products, any of which can also function for the active sound layer 3-2. What is important to see is that active sound layer 3-2 is capable of producing sound in response to action control signals provided by the game app running on a computing device 15 or 17, such that sounds are generated at least in part based upon any of the game datum tracked in the game database all as described in the parent application, where any of the game datum includes a player's current game piece 3-6 location with respect to the game overlay 3-3.

What is preferred is that the sound emitted from the active sound layer 3-2 can be localized to any of a number of areas that are smaller than the size of the entire layer 3-2 (such as 8.5"×11" or 17"×22"), where for example a multiplicity of physically separated layer speaker areas are selectable via an analog multiplexer for providing a preferred analog audio signal to the selected speaker. In such an arrangement, it will also be clear that the sound emitted by the active sound layer 3-2 can be made to "move" about the game board e.g. from speaker area X to speaker area Y to speaker area Z, etc., where the movement is based at least in part upon any of the current state of the game based as tracked in the game database. In another use, as a player lays down a game card such as 70-3a or 70-3b (see FIG. 9D) onto the game overlay 3-3 and game board 3-1 combination, the location of the game card is confirmed and associated with the ID of the game card (see FIGS. 9C and 9D) where after preferably the game app then causes the area substantially underneath, or perceived to be underneath (i.e. through sound averaging by two or more other speakers) or otherwise near the game card 70-3a or 70-3b to emit sounds in accordance with the game. In other situations, it is preferable that the entire active sound layer (again, e.g. all 8.5"×11" or 17"×22") emits the same audible sounds and therefore substantially all if not all speakers are simultaneously activated to emit a game relevant audio file as provided by the game app. Those familiar with techniques for creating 3D soundscapes including stereo will also see that it is possible to operate multiple speakers with variations of simultaneous sound to generate the perceived illusion of virtual speakers that are effectively an average of the sounds emitted by the physical speakers.

Referring still to FIG. 11a, passive game overlays such as 11 with respect to copending system 1 and 11-4 with respect to the present system have been described. The parent application also described various embodiments of an active game board overlay 11a (see parent FIG. 5) where the active elements where discussed as including thermochromic and electrochromic technologies. Regarding electrochromic, a preferred technology was identified as provided by "ynvisible," where the main applications are for smart labels. While thermochromic and electrochromic technologies offer flexible and lower cost solutions, flexible OLED, PMOLED, AMOLED technologies are now entering the marketplace that provide essentially full "HD TV quality" displays as flexible layers. The present invention anticipates a tileable active game overlay using for example flexible OLED technology produced by Royole of Shenzhen, China. While these technologies are expected to substantially increase the cost of the game overlay component, they will eliminate the need for replacing the overlay in order for example to play a new game or new instance/overlay of an existing game. These technologies are primarily plastic and have a thickness in the mm range and otherwise will not impede the detection for example of passive game pieces by active game boards or the detection of the passive game board by active game pieces all as prior described. Since the active game overlay also represents a "never ending game surface," it is possible to accomplish the many uses and benefits of the universal gaming platform 3 when incorporating an active game overlay 3-3 (using any technology) with a game board layer 3-1 and optionally also an active sound layer 3-2. In upcoming FIG. 11C, the present invention teaches the use of an active game overlay implementation of layer 3-3 that interfaces directly with an active game piece to determine game piece locations, thus eliminating the need for game board layer 3-1.

Referring still to FIG. 11a, when using a passive game overlay for layer 3-3, there is less anticipated benefit for then also using a transparent—opaque layer 3-4, that is also passive and for example can be printed in various typical home-printed sizes such as letter, tabloid or A4. Furthermore, when using an active game overlay for layer 3-3 using a full-color technology such as OLED, PMOLED or AMOLED, the benefits for using layer 3-4 are diminished. However, when using a "non-full color" technology such as electrochromic or thermochromic, the transparent—opaque layer 3-4 offers the benefit of optionally providing more vivid colorations to the game surface interface that are possible with the non-full color technologies that tend to be what is referred to as monochromatic. When using a non-full color active game overlay for layer 3-3, it is anticipated that the uses for transparent—opaque layer 3-4 are like those for passive game overlays 11 and 11-4, wherein fixed logical locations are defined for use in a game, and by replacing a transparent layer 3-4 then new fixed logical locations can be defined. As a careful consideration with show, the transparent areas of the mixed transparent—opaque layer 3-4 then provide a "see-thru" window for the player 2s to see the active overlay implemented for example using ynvisible's electrochromic material or using what is referred to as "e-ink" technology that is also used for example in the Kindle books and is a black-and-white interface, where then within these transparent areas the active game overlays can dynamically change the monochromic or black-and-white appearance allowing many exciting possibilities all as prior discussed in the parent application, including opening up new logical locations based upon the state of the game.

Still referring to FIG. 11a, active or passive game surface 3D extension pieces 3-5 share the same general features including: 1) they are not restricted to a certain width, depth or height, but however are meant to add at least some height to a game surface including for example structured objects like a house or car or unstructured objects like a mountain, hill or tree; 2) they have a physical location detector on their lower surface facing the game overlay preferably implemented to match the means for physical location detectors being used for the implemented system 1 or 2's game pieces, hence if the game pieces 3-6 are implemented as passive for use with an active game board, than similar technology (such as resonance coils or NFC tags as described in the parent application) is preferably implemented as the physical location detector means for the extension piece 3-5, whereas if the game pieces 3-6 are implemented as active for use with an active game board then similar technology (such as NFC readers as described herein) are preferably implemented as the physical location detector means; 3) they provide one or more physical locations on the upper surface thus extending the game overlay into the third dimension of height preferably implemented to match the means for providing physical locations being used in implemented system 1 or 2's game board, hence if the game board layer 3-1 is active for use with passive game pieces than similar technology (such as transmit/receive scanners for locating game pieces with resonance coils or NFC antenna scanners for locating game pieces with NFC tags all as described in the parent application) are preferably implemented for providing the physical locations such as N+1, whereas if the game board layer 3-1 is passive for use with active game pieces than similar technology (such as NFC tags) is preferably implemented for providing the physical locations such as N+1, and 4) they provide a visually apparent extension piece overlay (that is optionally attached or not attached to the extension piece 3-5) where the extension piece overlay is like a game overlay 3-3 in that the extension piece provides at least one logical location such as L+1, where the logical location can comprise the entire surface area of the extension piece 3-5 or some smaller portion of the surface area using any shape including regular or irregular shapes.

Still referring to FIG. 11*a*, the present invention anticipates active or passive game surface extension pieces 3-5 that incorporate game piece bases 3-6, where for example the extension pieces 3-5 have cavities in their lower surface wherein one or more of the appropriate game pieces 3-6 (i.e. either active or passive) can be inserted thus acting as the physical location detector means. What is important to see is the extension pieces provide a means by which the gaming platform can extend the game play into the third/height dimension, such that unlike a typical game board that does not track game pieces, does not have changeable overlays and therefore also does not extend the trackable game pieces or changeable overlays into in even two dimensions, the present universal game platform provides for both extending the game in the two dimensions of width and height through tiling and extending the game in the third height dimension through stacking. It is also important to see that the extension piece 3-5's physical location detector provides datum regarding the one or more physical locations onto which a particular extension piece 3-5 is stacked, where the extension pieces 3-5 are of pre-known dimensions and therefor the logical locations are mappable similar to the logical locations of the game overlay as prior discussed. In a first use case, it is sufficient that an extension piece 3-5 (such as a castle) is uniquely identified, where its specific location on the game board is of less importance. In this first use case the castle extension piece has a pre-known mapping between its upper surface physical locations and logical locations, like described for the game board and game overlay, where the physical locations of the extension piece 3-5 preferably include a unique code distinct from any of the physical location IDs of any other extension piece 3-5 or a game board 3-1. Thus, as a passive game piece 3-6 is detected at a specific physical location on an active extension piece 3-5, or an active game piece 3-6 detects a specific physical location on a passive extension piece 3-5, this information is transmitted to the game app running on a computing device such as 15 or 17 that has access to the pre-known mapping information and translates the specific physical location into a specific logical location, like prior described for the system 1 and 2.

Still referring to FIG. 11*a*, in a second use case the extension piece is preferably mapped with a very tight correspondence to the underlaying game board in which situation preferably 3 or more physical location detectors means are included with the extension piece 3-5, whereby using the preferred 3 physical locations as will be well understood by those familiar with geometry, it is possible to map the physical location of the extension piece 3-5 with high accuracy to underlaying game board, whereby also then any logical locations included with the extension piece 3-5 are also mappable to the underlying game board with high accuracy. In either use case, extension pieces are useful for providing an exciting third dimension to a game board with virtually limitless game functions as those familiar with board games will understand, thus adding a valuable aspect to the physical-virtual universal gaming platform 3. And finally, game pieces 3-6 and FIGS. 3-7 remain as prior described with respect to the copending system 1 and present system 2.

Still referring to FIG. 11*a*, universal physical-virtual gaming platform 3 preferably comprises at least one computing device with game app 3-8, such as 15 or 17 that is both in communications with the various active platform components and executes a game app for maintaining the current game state and a game database and otherwise causing the various active components to activate in accordance with the game. For example, in some games there is a single tablet or pc 15 running the game app, tracking the game pieces and controlling all active components using what the parent application referred to as action control signals. In other games, the game is controlled by the same game app being run on a smart phone 17. In yet other games, both the shared device 15 and multiple personal devices 17 are in use and communication, all as prior described in the parent application. It is also preferred that the platform can communicate with a remote system 3-9 such as eco-systems 30 or 40, either before, during and/or after the game, all as prior described in relation to the parent application, where for example when the implemented platform 3 uses game app and computing devices such as 15 or 17 that are in substantially real-time communications with an external content provider (such as eco-systems 30 or 40) it is also possible the eco-systems 30 or 40 not only provide for example virtual content but also provide action control signals for activating any of the same platform 3 game devices addressable by computing devices 15 or 17. The parent application and the present application also specify a number of active game devices that are not represented in the present figure but are included as means for extending the platform 3's general functionality, where for example magnifying glass 23 and game audible device 19 are examples of active game devices.

Referring next to FIG. 11B, there is shown a table of several exemplary implementations of the universal physical-virtual gaming platform 3 ranging from an anticipated highest functionality to an anticipated lowest cost, all with useful benefits and all interfacing a similar game app running on a computing device such as 15 or 17 and preferably in communications with a remote system component 3-9 such as eco-systems 30 or 40. The table of FIG. 11B is exemplary, and not all possible combinations of game platform 3's components have been represented, and therefore the table should be not be construed as a limitation of the types of combinations of components but rather as an indication of the flexibility of the platform 3.

Referring next to FIG. 11C, there is shown a block diagram comprising a game app running on a computing device such as 15 or 17 that is in communications with one or more game pieces 3-6-1 and one or more active game overlays 3-3-1, where for example an game piece is an active game piece comprising a game app communications component such as a Bluetooth system on a chip that is capable of controlling one or more light sensors, and where for example an active game overlay 3-3-1 is an flexible OLED display. When using an active game overlay 3-3-1, the preferred implementation of active overlay 3-3-1 emits 30 to 60 image frames per second where game players perceive the emitted image frames to be any combination of a static image or dynamic image, where a static image for example is a traditional board game layout such as a Monopoly Board (see FIG. 11D) where a dynamic image might for example be a portion of the Monopoly Board looking like Hotels being flooded with water or on fire, where all pixels of all emitted image frames have a minimum Red, Green, Blue (R,G,B) intensity level referred to as black floor (BF), and where for example the BF=10% of the maximum pixel intensity. As those familiar with image processing will understand, a typical intensity range of a given R,G,B pixel is between 0 and 255, where R=G=B=0 represents the darkest black and R=G=B=255 represents the brightest white, such that for a BF=10% all R, G and B pixels have an intensity range of 25-255 and therefore are never expected to emit intensity between 0-24.

Still referring to FIG. 11C, in a Step 1, game app on computing device 15 or 17 causes an image frame including a scanning signal 3-3-1*ss* to be displayed on active game overlay 3-3-1 while substantially simultaneously transmitting a scanning command to game app communications component 3-6-1*c* for causing all game pieces 3-6-1 to activate light sensor(s) 3-6-1*ls* to detect or not detect a scanning signal 3-3-1*ss*. In one case, the scanning signal 3-3-1*ss* includes all pixels within a given contiguous area representative of a single logical location where a game piece 3-6-1 is expected to be located by a player. Preferably all pixels in a scanning signal are set to R=G=G=0 or at least some intensity value that in accordance with the light sensor 3-6-1*ls* is detectably less than the BF threshold. The scanning command transmitted to all game pieces 3-6-1 includes any one of, or any combination of the following datum: 1) activate light sensor(s) 3-6-1*ls;* 2) duration of activation after which a response is necessary; 3) BF threshold value, e.g. an intensity value of 25, and 4) signal-to-BF relationship, e.g. "less than" meaning that the signal must be less than the BF (e.g. 25) where any of datum 2, 3 or 4 can be pre-established on game pieces 3-6-1 and therefore would not need to be included in the scanning command.

Referring now to FIGS. 11C and 11O, in a Step 2, game app communications component 3-6-1*c* activates light sensor(s) 3-6-1*sl* such as any of a point light sensor (e.g. a photo-diode) a line light sensor (e.g. a line-scanner) or an area sensor (e.g. a CMOS camera sensor) all as will be understood by those familiar with light sensor and detection systems. Various point, line and area light sensors are available from numerous sources, where the sensors are typically available as monochromatic or color sensors. The preferred light sensor is a monochromatic point sensor such as a photodiode, where point sensors in general are lower cost and require less power than line or area scanners. Point sensors also provide simpler data output and therefore typically require less sophisticated supporting electronics, all as will be well understood by those familiar with light sensing systems. Regardless of the type of light sensor 3-6-1*ls* chosen, in a Step 3 light sensor and associated circuitry detect light emitted by active game overlay 3-3-1 as comprised in the image frame including a scanning signal 3-3-1*ss*. Given the exemplary constraints, all pixels that are not included in the scanning signal 3-3-1*ss* are set to an R, G or B intensity value that is >BF, e.g. >an intensity value of 25, while all pixels included in the scanning signal 3-3-1*ss* are preferably set to an R=G=B intensity value of 0, where again it is understood that for example the scanning signal 3-3-1*ss* pixels coincide with a single game board overlay logical location where a game piece 3-6-1 is expected to be possibly located by a player, and where all other pixels not included in the scanning signal 3-3-1*ss* are outside of the single logical location. As will be apparent from a careful consideration of the present teachings, any game pieces 3-6-1 that are outside of the scanning signal 3-3-1*ss* area will detect an RGB intensity equal to or exceeding the BF while any game pieces 3-6-1 that are inside of the scanning signal 3-3-1*ss* area will detect an RGB intensity of substantially 0.

Referring to FIG. 11C, in a Step 4, each game piece 3-6-1 responds to the game app on computing device 15 or 17 with an indication as to whether or not a scanning signal 3-3-1*ss* was detected, such as a "1=yes" or "0=no" encoding, along with the game piece's unique ID. As will be appreciated from a careful consideration, using such an exemplary apparatus and method, game app running on computing device 15 or 17 is able to search all possible logical locations of an active game board overlay and determine where each game piece 3-6-1 is located based upon each game piece 3-6-1 detecting a specific scanning signal 3-3-1*ss*, where the scanning signal 3-3-1*ss* is controllably moved throughout all possible logical locations, one logical location at a time.

Figure 11E:
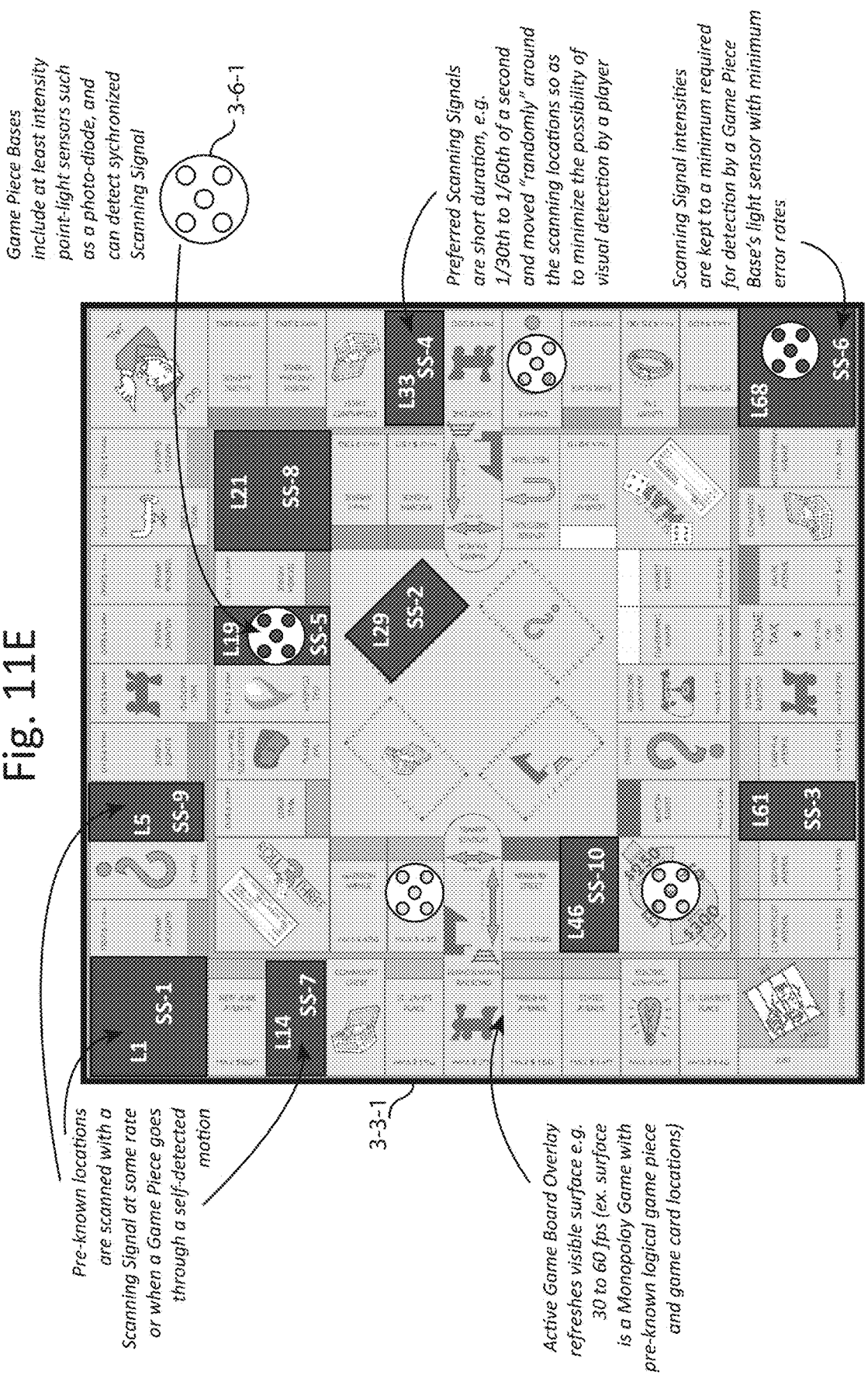
FIG. 11E depicts an exemplary active game overlay 3-3-1 (using e.g. a flexible OLED technology) outputting an image of a Monopoly Game. Several game locations such as L1 through L68 are being searched by game app on computing device 15 or 17 controlling scanning signals such as SS-1 through SS-6 as described in FIG. 11D.

Referring to FIG. 11E, there is shown an exemplary active game overlay 3-3-1 (e.g. using a flexible OLED technology) outputting an image frame of a Monopoly game. In the depicted image frame, several (but not all) of the possible logical locations such as L1, L5, L14, L19, L21, L29, L33, L46, L61 and L68 have been colored in as gray signifying a scanning signal 3-3-1*ss* such as SS-1, SS-9, SS-7, SS-5, SS-8, SS-2, SS-4, SS-10, SS-3 and SS-6, respectively. The scanning signals 3-3-1*ss* have been numbered in an exemplary order that jumps around the image frame as opposed to following some consecutive order, such as the left-to-right, top-to-bottom order used in the present example to number the logical locations L1 through L68. Assuming that the active game overlay 3-3-1 is implemented with a technology that supports a video frame rate of 60 fps, then scanning the 68 possible logical locations one-at-a-time per each output image frame would require just over 1 second to detect the location of any and all game pieces 3-6-1. As will be apparent to those skilled in the art of image output, each given location such as L1 will be refreshed 67 times with the actual gameboard look and 1 time with a dark gray scanning signal for every scanning cycle of just over 1 second. As will be understood by those familiar with human vision temporal perception, the "dark frame" of the given location such as L1 will be substantially unnoticeable to the normal human perception. Preferably jumping the scanning signal around to various non-consecutive logical locations is anticipated to help further disguise the scanning signal 3-3-1*ss*.

Still referring to FIG. 11E, those familiar with image processing systems will understand that it is possible to create multiple intensity thresholds for detecting a given signal scan 3-3-1*ss*, where the factors for determining the number of possible thresholds are based at least upon the sensitivity of the light sensor and the amount of light intensity that can be devoted to the scanning signal 3-3-1*ss* without causing substantially unwanted perception of the scanning signals 3-3-1*ss* by a game player looking at the output of the active game overlay 3-3-1. For example, if a light sensor is capable of accurately distinguishing between every 5% change in the output light emission of a given active game overlay 3-6-1 technology such as flexible OLED (e.g. outputting a typical 300 NITs of illumination) and a player will not reasonably notice an inserted "black frame" of up to 20% of the total N ITs, then it is possible for the game app running on device 15 or 17 to output an image frame with 4 different scanning signals 3-3-1*ss* during a single output image frame, where each scanning signal corresponds with 1 of the 4 different logical locations. For example, the single output image frame could include a first scanning signal SS-1 with an R=G=B=0 (i.e. 0% of the total light intensity assuming a 0 to 255 scale) a second scanning signal SS-2 with an R=G=B=13 (i.e. 5% of 255) a third scanning signal SS-3 with an R=G=B=26 (i.e. 10% of 255) and a forth scanning signal SS-4 with an R=G=B=38 (i.e. 15% of 255) where each of any game pieces 3-6-1 residing on top of the corresponding locations such as L1, L29, L61 and L33 would respectively detect a scanning signal of intensity substantially 0, substantially 13, substantially 26 and substantially 38, and where any other game piece residing over any other logical location would detect a scanning signal >51 (i.e. 20% of 255.) In practice, it is possible to have a point light sensor such as a photo-diode with a sensitivity similar to a line scanner or area scanner and as such to be able to detect intensity differences of 2% of total or less, thus doubling the possible number of simultaneous scanning signals 3-3-1*ss* for a given single image frame.

Still referring to FIG. 11E, by for example scanning 4 different locations using 4 different thresholds it is possible to scan the 68 exemplary location in 25% of the previously estimated time of just over 1 second, hence completing a scan cycle encompassing all possible 68 locations in just over 0.25 seconds. As those familiar with sensor data processing will understand, increasing the number of thresholds often leads to decreasing the gap between thresholds which in turn can increase the error rate, especially if the sensors are subject to noise such as being partially covered by a substance (i.e. being "dirty") or perhaps only being partially oriented within a given scanning signal area. Conversely, completing more scans in the same time period allows for averaging that can decrease the error rate and also increase system responsiveness (i.e. how quickly the game app running on computing device 15 or 17 responds to the movement of a game piece 3-6-1 by a player.)

Referring still to FIG. 11E, another anticipated technique for implementing a scanning signal is to use 2 consecutive image frames A and B per each logical location scanned, i.e. rather than 1 image frame comprising the scanning signal 3-3-1*ss* as prior described. In this alternative 2-frame approach, in a Step 1 the game app 15 or 17 directs a game piece 3-6-1 to sense the intensity of its location during the emission of the first frame A that includes the normal image of the location. In a Step 2 and 3, the game piece light sensor 3-6-1*ls* is activated and then detects the current light intensity (e.g. using for example a photo-diode that is a point light sensor.) Where Steps 1-3 are like the steps discussed in relation to FIG. 11C, a Step 4 does not respond to game app 15 or 17 with a "yes/no" detected signal as discussed in FIG. 11C. In the present example, in a Step 4 the game app 15 or 17 instead sends another signal to game piece 3-6-1 causing the currently detected light intensity to be stored in a local game piece memory as the "frame A reading." In a Step 5, game app 15 or 17 directs the game piece 3-6-1 to sense the intensity of its location during the emission of the second frame B that includes the normal image either increased or decreased in intensity by some threshold value X (e.g. 2% to 5%.) In a Step 6, the game app 15 or 17 then sends a signal to the game piece 3-6-1 to compare the current "frame B reading" with the prior saved "frame A reading" and to transmit the result of the comparison as the "yes/no" response back to the game app 15 or 17, where if "no" difference is detected, then the game piece is determined to be not presently over a location currently being scanned.

Those familiar with image processing will recognize that using a differential between the normal image output for a location and an essentially darkened or brightened version of the same normal image will further hide the scanning signal 3-3-1*ss* from the perception of the game players. However, using 2 image frames for every scanning signal 3-3-1*ss* will halve the scanning frequency, thus slowing the game app's perceived responsiveness. As a compensation for this slowing, it is possible to stagger the A-B frames for each scanning signal 3-3-1*ss* such that a first location such as L1 outputs a normal image/frame A during time t1, after which the first location L1 outputs a brightened image/frame B during time t2, while at the same time t2 for a location L2 a normal image/frame A is output. At time t3 a brightened image/frame B is output from L2 while a normal image/ frame A is output for a location L3, and so on. As a careful consideration will show, this interleaving of frame A and B during the scanning cycle will effectively keep the scanning rate equal to the prior mentioned single-frame technique while simultaneously allowing for better hiding of the scanning signal 3-3-1*ss* from the player's perception. Hence, given the same number of detectable thresholds, e.g. 1, both the 1-frame and 2-frame scanning cycles will detect all pieces in substantially the same number of total image frames emitted and therefore the same amount of total elapsed time.

Furthermore, using the 2-frame approach and assuming that the average intensity of all normal locations is greater than 0 intensity+1 threshold value (e.g. 12), it is possible to scan multiple, for example 2 different locations during the same A/B 2-frame output, where both locations output the normal image during frame A while during frame B the first location emits the normal image less the threshold amount while the second location emits the normal image plus the threshold amount. Using this technique, the game piece sensor will determine a positive A-B intensity difference for the first location and a negative A-B difference for the second location, thus making the first and second locations distinguishable by the sign of the difference. This technique then effectively doubles the scanning rate of the 2-frame technique versus the 1-frame technique first described in relation to FIG. 11C. If multiple thresholds are used for either the 1-frame or 2-frame technique, this increases the frame rate by the number of thresholds as prior described such that by using 2 thresholds (e.g. 2.5% and 5%) in the 2-frame technique, it is possible to scan 4 locations per each output frame (assuming the prior described interleaving.)

While it is preferred for cost and electronics simplicity that the light sensor is implemented as one or more photo-diodes, it is possible to use either of a line scanner or area scanner. As those familiar with image processing will understand, line scanners and area scanners create significantly more data and require more complex electronics and data processing. However, one benefit is that both line and area scanners will best support using color within the scanning signal 3-3-1ss, where using color variations in addition to intensity variations increases the number of possible unique scanning signals and thus the overall scanning rate. For some types of game overlays and games, it is possible that the desired game pieces 3-6 are smaller and the logical locations are also smaller, in which the number of scans required in a scan cycle to detect pieces at any given logical location can be significantly increased, such that using a line or area sensor can be of increased benefit. What is most important to see is that the present platform 3 supports game overlays 3-3 that are active and for example implemented using a full-color display technology such as OLED, AMO-LED or PMOLED. In such a case, it is still possible to combine the active game overlay 3-3 with an active game base 3-1 that uses electronics to sense the physical locations of passive game pieces 3-6 through the interposed game overlay 3-3, which is described as system 1 in the parent application. Furthermore, it is possible to combine an active game overlay 3-3 with a passive game base 3-1 and active game pieces 3-6 described in the present application as system 2, where similarly the active game pieces 3-6 use electronics to sense the physical locations of passive game board 3-1 through the interposed game overlay 3-3. However, using the apparatus and methods as taught in relation to FIGS. 11C, 110 and 11E, it is possible to have a gaming system that for example uses an active game overlay 3-3 without requiring any game base 3-1, wherein the game pieces are either active or energized with remote power and function as described for game piece 3-6-1.

Those familiar with electronics will understand that there are many variations possible with respect to the apparatus and methods described in relation to FIGS. 11C, 110 and 11E and as such the provided teachings should be considered as exemplary rather than as limitations of the present invention. For example, within a game piece 3-6-1 it is possible to use 3 point sensors (i.e. photo-diodes) each combined with a different R, G or B color filter, thus providing a lower cost approach that can detect both color encoding and intensity encoding in a scanning signal 3-3-1ss. It is also possible to detect light intensities with the point sensors, where the light intensities are converted to digital information and transmitted to the game app running on computing device 15 or 17 for further processing and comparisons (such as between a frame A and B) thus reducing the electronics necessary for implementing on the game piece 3-6-1. What is important to see is that the game app 15 or 17 is controllably coordinating the output of a scanning signal 3-3-1ss via active game overlay 3-3-1 with the substantially simultaneous detection of a scanning signal by any of a number of game pieces 3-6-1, where the game pieces 3-6-1 are located over one of many possible logical locations and the scanning signals 3-3-1ss are located at one (or more as discussed) of the possible locations during a given frame, and where all logical locations can be scanned over a cycle comprising N image frames depending at least upon the number of logical locations and the number of distinctly detectable scanning signals 3-3-1ss. As a careful understanding will also show, the teachings for game piece bases that comprise light sensors for supporting the determination of a physical location are also applicable to the design of a game card sleeve such as 70-3s (see FIGS. 9B, 9C and 9D.)

Referring again to FIG. 11a, there is considerable work being expended to develop technologies for reading finger prints, especially in relation to smart-phone access. There are three basic technologies including what is known as optical scanners, capacitive scanners and a newer ultrasonic scanner. The optical scanners typically include a multiplicity of light sources such as LEDs the emit light at an angle toward the area where the fingerprint is to be read after which the reflected light is detected by a sensor such as a CCD or CMOS imager. The three-dimensional ridges and valleys of the fingerprint cause detectable contrast in the fingerprint image that is then processed for verification using well-known techniques. Typically, these optical scanners required their own fingerprint area that was distinct from the display area on the smart phone. With recent new technology such as Synaptics Natural ID FS9100 optical fingerprint sensors it is now possible to locate this fingerprint scanning area underneath of an OLED display (but not an LCD display because that would interfere with the LCD's backlighting.) These in-display scanners are small and are not flexible as they are printed circuit boards with silicon chips. The present invention anticipates that either a unique game piece "fingerprint pattern" that is printed as a 2D image or a 3D construction of ridges and valleys can be combined with optical scanners placed at each physical location for determining the presence of each piece. In this alternative arrangement, active game board layer 3-1 would comprise and operate the multiplicity of optical scanners each located at a designated physical location, over which an active game overlay 3-3 preferably using an OLED display would be placed and operate to visually present the logical locations that are mapped to the physical locations all as previously described.

Still referring to FIG. 11a, capacitive fingerprint scanners include a multiplicity of very small surface capacitors to sense the capacitance of the finger, where a ridge of the fingerprint causes a skin capacitance that is different from the valley of the fingerprint which is then essentially the capacitance of air. These sensors are considered to be more accurate than optical sensors in that they cannot be tricked for example by presenting to an optical scanner a mear picture of a fingerprint, and hence the finger itself must be present and have both the necessary ridges and valleys. In a typical arrangement of these capacitive sensors, there are a larger number of densely packed surface capacitors to as to create the sufficient resolution require for reading the finger. This density and requirement for direct contact with the finger precludes the use of capacitive sensors placed underneath a display. However, in a typical board game, the number of unique game pieces is expected to be extremely small compared to the number of possible human fingerprints, for example less than 50 game pieces would have to be uniquely identified. The present invention anticipates game piece bases with a capacitive underside including a unique pattern of ridges and valleys that are sensed by a mesh of surface capacitors either placed over the active game overlay 3-3 or built into the display, where this mesh of surface capacitors is then acting as the active game board 3-1. What is necessary is that each physical location to be detected includes a sufficient number of capacitive surface sensors to detect for example 1 out of 50 unique game pieces "fingerprint" patterns. It is possible that these capacitive sensors are either constructed to also detect human skin or are constructed to detect a different capacitance as presented by a game piece.

Referring to FIGS. 4A and 4B, active game pieces such as 8c-RF and 8c-BT can be constructed to replace the NFC reader element with an underside surface including electrical properties that can be controllably operated for example by the Bluetooth system on a chip. In this exemplary design, the active game piece 8c receives a communication signal from the game app on a computing device 15 or 17 where in response the game piece causes a detectable change to an electrical property such as capacitance of the bottom of the game piece 8c that is in contact with the sensor mesh functioning as the active game board 3-1. In such an arrangement, having a pattern of ridges and valleys on the bottom side of the active game piece 8c is not necessary. For example, if 50 different game pieces 8c were all resting upon the sensor mesh implementation of active game board 3-1, then by controllably signaling only 1 game piece 8c to alter an electrical property, it is then possible to determine the location of this 1 game piece 8c in association with that game piece 8c's pre-known identity.

As those familiar with electrical systems will understand, the electrical property does not need to be capacitive, and therefore a mesh of surface capacitors for use as an active game board 3-1 should be considered as exemplary, rather than as a limitation for active game boards 3-1 that sense the contact of a game piece. For example, using an active game piece 8c modified to emit a small electrical charge under the control of a time signal emitted by the game app and computing device 15 or 17, it is possible to detect the location of this controlled electrical charge using a matrix of row and column wires, where even if 50 game pieces were present on the surface of the game overlay (active or passive) only the game piece that has undergone the change in an electrical property such as a change in electrical charge will be detected, therefore providing a means for determining the 1 piece currently emitting and electrical charge for associating with the unique game piece ID for which the game app and device 15 or 17 is in communications. What is important to see is that by coordinating the timing of a change in an electrical property of a game piece along with the detection by an active game board such as a mesh of capacitive sensors or a matrix or row-col wires, it is possible to uniquely identify the physical location of a game piece in association with the ID of the game piece.

Referring again to FIG. 11a, the third and newest type of fingerprint sensing technology uses ultrasonic emitters and detectors located underneath the display surface. The ultrasonic signal is first emitted from underneath the display, transmits through the display, impinges upon the pattern of ridges, valleys and other features of the finger, is reflected back in accordance with the pattern, transmits through the display and is received underneath the display for conversion into digital information that is then processed to uniquely identify the fingerprint. Again, it is possible to create game figurines 8a (without a separate game piece base 8b or 8c) or game piece bases 8b or 8c with an underside comprising a unique "game piece fingerprint" of 3D features that are then detectable using an ultrasonic scanner. In this implementation, each ultrasonic scanner represents a physical location such that the matrix of the ultrasonic scanners is the active game board 3-1. What is important to see is that game piece figurines 8a or bases 8b and 8c can be constructed to: 1) include underside surfaces that either reflect visible light or ultrasonic energy according to a unique pattern of 3D surface features such as ridges and valleys so as to be compatible with optical or ultrasonic fingerprint or touch sensing technologies; 2) include underside surfaces that reflect visible light energy with a unique pattern of 2D contrast features so as to be compatible with optical fingerprint or touch sensing technologies; 3) include underside surfaces that present a unique pattern of 3D surface features (such as ridges and valleys) of varying capacitance so as to be compatible with ultrasonic fingerprint or touch sensing technologies, and 4) include an underside surface that can controllably change an electrical property in coordination with a timing signal from the game app running on a computing device 15 or 17, where the change in the electrical property including any of capacitance, electrical charge or resistance can be sensed by electrical sensors comprising an active game board 3-1 either placed underneath the game overlay 3-3, integrated with the game overlay 3-3, or placed over the game overlay 3-3.

Still referring to FIG. 11a, in another exemplary case, the active game board 3-1 comprises a matrix of reed switches for sensing each of the physical location, where for example each physical location is represented by at least one reed switch. In this example case, the active game piece base 8c includes an electronically controllable magnetic field, where upon receiving a control signal from a game app on a computing device 15 or 17, a specific game piece base 8c activates the magnetic field which in turn radiates through the game overlay 3-3 to activate a reed switch in the game base 3-1. Once activated, the game board base 3-1 combines the unique ID (physical location ID) associated with the activated reed switch(es) for combination with the game piece ID of the game piece 8c that is currently being signaled by the game app one device 15 or 17 to activate the game pieces 8c's magnetic field. It is further possible that the game app on device 15 or 17 causes the game piece 8c to activate the magnetic field multiple times, thus producing an encoded signal for the active game board 3-1. It is important to see that any other game pieces 8c that might also be resting upon the active game board 3-1 are not then also being currently signaled by the game app on device 15 and 17 and therefore these other game pieces 8c have deactivated magnetic fields that are not causing any of the reed switches in the underlaying active game board 3-1 to be activated, thus allowing that only one game piece 8c is being uniquely located at any given time based upon the timing of the control signal from the game app on device 15 or 17, where the unique ID of the only one game piece 8c is known to the game app on device 15 or 17 which can then combine the physical location ID as determined by the active game board 3-1 with the game piece ID thus uniquely tracking the game piece 8c.

CONCLUSION AND RAMIFICATIONS

As the careful reader will see, the present invention combines with the parent specifications to teach a new universal gaming platform wherein the platform supports a virtually unlimited number of games requiring minimal additional investment beyond the platform, where the platform itself has multiple configurations using low-cost elements. All games today fit into distinct and separate categories, for example single-game platforms such as physical board games (where each board game is a separate physical board) multi-game virtual-only platforms such as video games (with limited local socialization) and multi-game full-immersion-only VR games (with high-tech gear required and extreme local separation.) Some platforms such as AR support real 3D physicality with virtualization but have no cross-over with board games or video games. The present novel universal physical-virtual gaming platform combines the traditional benefits of board games including enabling local socialization and based in 3D reality with the benefits of virtual games including enabling remote socialization with never-ending 2D virtual content.

The present platform allows for AR based upon the current board game state, such that one or more players watch as a portion of the board or their game piece(s) for example come to life using their smart phone or magnifying/spy glass to see an augmented reality from their personal perspective. In the presently taught solutions, the game app has access to pre-known game overlay layouts and pre-known game piece base and/or figurine 3D structures. As those familiar with AR will understand, having this pre-known information is extremely useful for providing customized AR. For example, the game overlay layouts and figurine 3D structures are preferably stored as meta-data comprising key features, such that the AR devices including a smart phone or magnifying glass capture player perspective video images of either the game overlay or figurine which are then registered in substantially real-time using image processing to the pre-known meta-data, where this registration then allows the virtual augmentation of the game board or figurine that is tightly mapped to the viewpoint of the player as well as the current state of the game. In one example, a player looks through their smart phone at a potential Monopoly Board game location that represents a location to put a hotel, and while looking they see fumes emitting from the ground, or an unsightly haze, or conversely a buried treasure. In another example, two players land their game piece bases with figurines onto a location representative of a fighting arena, where then both players use their magnifying glasses to watch from their perspective as an animation shows their two figurines battling. With game cards, it is anticipated that when a player lays down their card there may be a virtual animation displayed on a shared computing device such as a tablet. In another possible use, if several game cards are placed faced down, a player may receive a special game power to see a chosen card, where the player substantially places the chosen game card in the view of their smart phone and then taps the smart phone screen to see the hidden face of the card. The present platform also allows for video game sequences to be woven into board game actions, and vice versa. As those familiar with board game mechanics will see, there are many new and exciting possibilities.

The present universal game platform has a special focus on at-home specific-game delivery, where the platform is not any specific game and the final specific game is able to be delivered locally, for example where the players print their own overlays and game cards, and even print character sheets to color and provide customization of virtual characters, all of which is also supported by a system coloring book for those perhaps without the local printer. The virtual game itself can be either of a traditional downloaded app or preferably what is referred to as a web-app, where the web-app shares most of the higher functionality of a traditional app but is executed out of the browser. As will be understood by those familiar with traditional embedded apps (specific to an operating system and therefore a single-platform) versus web-apps (typically able to run in any browser on any operating system and therefore cross-platform) web-apps offer many advantages including being significantly easier to keep up-to-date for the gamer, where each time the game uses the web-app it is accessed from a server an is automatically the most recent version, whereas for an installed app any new version must be re-downloaded to the necessary computing devices for supporting the game.

Game piece figurines can even be printed at home on a 3D printer, or at least locally for example at a craft store offering 3D printer services. A future specification from the present inventor will address novel apparatus and methods for allowing a player to purchase or receive a game for example from an open community after which they enhance or modify the game, thus allowing for a new sharing and evolution of games across wide communities and sub-cultures. Organizations such as The Institute of Play are focused on how schools can use games in classrooms to enhance education and are currently relegated to creating customized games in a hit-or-miss, school-by-school approach. The present platform offers exciting opportunities for educational systems to work together as a community of developers, creating and testing new games across a wide range of subjects, age levels and localities quickly learning and evolving to the most effective games.

The present system offers exciting opportunities for marketers and advertisers, as board game locations can be associated with advertising spaces, where for example some demographics are pre-identified with respect to the players before the game starts such as age, sex, nationality, favorite teams, etc. and when this player lands on a certain location, answers a certain question, or based upon virtually any of an unlimited number of game-state trigger conditions the advertisement is provided to either the group for example on the shared computer such as a tablet, or the individual on a smart phone, or a secret message via the magnifying glass or game audio device. Content providers such as movie and tv series studios now can create games to match new or upcoming releases of content to theaters, cable channels or streaming service such as Netflix or Amazon. Players can play along with their favorite characters where the studios craft A/B games for market testing of potential new storylines, characters, possible endings, etc.

Currently board game manufacturers have limited access to know how or if their games are used. Board game designers can now gather very important statistics about game usage, length of play per session, the amount of times questions are answered correctly, competitiveness of games at least in terms of the closeness in player scores, etc., where this information is simply not available for any traditional board game such as Monopoly. Even the board game itself presents new advertising possibilities as large companies can for example pay the cost of the generic board game bases, where printed on the bases are their logos and taglines. If the generic board game incorporates an audio technology such as T-paper as herein taught, then when the generic game board first communicates with the game app a short audio file can be played introducing the game and also an advertisement, where the advertisement can be changed over time to remain exciting, or even fit to the pre-known demographics of the player(s). Again, there are many possibilities only afforded by the present physical-virtual universal gaming platform approach.

Games can be designed around destinations such as a theme park, museum or major city, where players land on locations and are instructed to put on their VR headset for a special tour, after which they are challenged with a question or related task. Restaurants for a favorite city might purchase a location in a board game where players come and eat to learn important clues from a game character, where after landing on the game location using any of video display on a computer, VR device or AR device, the real-life restaurant has an opportunity to share exciting content showing players their attractive interior and menu. Unlike a traditional board game where the set of questions or meaning of board locations is static and therefore less interesting, using the present system with any of virtual content (e.g. output on a display of a tablet) VR content or AR content (e.g. as seen by the player when looking at a game space or their piece through their smart phone in response to a question) the game can have significantly different experiences each time it is played, thus creating a new level of surprise and challenge. Using the specified sound layer, players can land on game piece locations with exciting results, such as the sound of a siren blaring or a bomb going off, substantially emanating from their location, or perhaps being emitted by a speaker in an 3D extension piece representing a police station. Using the herein taught active figurines, it is possible to create figurines with mechanisms to essentially tip-themselves over, such that when a player lands on a location an audible countdown starts and the player is challenged to pick and laydown on the game board the correct card, where if they fail a bomb sound does off and the active figurine activates to knock itself over.

The components of the universal game board platform including the game board layer, sound layer and game overlay layer have be described as preferably rectangularly shaped and sized to best match home printers. However, it is also possible to create any number of specialized board game layer shapes that are for example circular to fit a gaming table, in the shape of a portion of a golf course, or even a doughnut shape where the game board has an interior area for other game activities that is not a game piece tracking surface. The described extension pieces for providing 3D height to a game can themselves be "kits" where a player must first construct and color the extension piece, that is for example made of pre-cut cardboard, after which the player must place stickers that are NFC tags onto pre-marked locations. In a variation, the kit is for example a doll-house, and the stickers including NFC tags represent redefinable locations, where a player chooses where to put each sticker and then using the game app how to define the game responses based upon each sticker, etc. When using multiple game boards, herein also taught as tiling, there is no requirement that the game boards are in some way physically touching to form a single surface. For example, a 3D multi-game board holder could be constructed to provide what would essentially appear to the players to be 3 or 4 levels of the game forming a spiraled column, like what some may remember as the 3D chess board depicted on Star Trek.

In a copending application entitled SUB-CHANNEL VIDEO-AUDIO PROVIDER FOR ADJUSTABLE STORIES AND GAMING SYSTEM filed as a series of Provisional Applications including No. 62/652,486 dated Apr. 4, 2018, the present inventor describes various embodiments for a further adapted display to provide secret messages based upon temporal-spatial sub-channels, where any person (i.e. player) wearing special temporal-spatial eye glasses can be controlled to see secret messages. It is further anticipated that active game board overlays include at least some of these teachings and that players wear glasses (as specified in the parent application or the copending SUB-CHANNEL application) or use a magnifying glass as similarly specified to view the active game board, where each player is at times seeing game overlay surface information that is private or secret to the player, thus adding for further exciting and novel possibilities.

While only certain features of the invention have been illustrated and described herein, many modifications and changes will occur to those skilled in the art. It is, therefore, to be understood that the appended claims are intended to cover all such modifications and changes as fall within the true spirit of the invention.

We claim:

1. A physical-virtual gaming platform, comprising:
   one or more active game pieces comprising active electronic means for emitting an active signal;
   one or more game board overlays, where each overlay provides one or more logical locations for placing a game piece, and where a game piece is moved upon a game board overlay;
   one or more passive game boards comprising passive electronic means for responding to an active signal emitted by an active game piece, where a game board overlay is placed over a game board, and
   one or more computing devices for communicating with the active electronic means of an active game piece, where the computing device determines a location of a game piece with respect to a logical location on a game board overlay based at least in part upon the communications with the active electronic means, and where the computing device determines a unique game output based at least in part upon the determined location of the game piece.

2. The system of claim 1 where the active electronic means include any of RFID or NFC reader means and the passive electronic means include any of RFID or NFC tag means.

3. The system of claim 1 further comprising:
   an active sound layer for outputting sound, and
   where any of the one or more computing devices is further adapted to communicate with the active sound layer for providing audio information to the active sound layer, where the active sound layer at least in part uses the audio information for causing the outputting sound.

4. The system of claim 1 where the game board overlay is active and is in communications with any of the one or more computing devices, where a computing device provides any of layout change information to the game board overlay, where the game board overlay at least in part uses the layout change information to change at least one logical location of the game board overlay, and where the caused change includes any one of, or any combination of removing a location, adding a location or connecting two or more locations.

5. The system of claim 4 where the active game board overlay comprises a display.

6. The system of claim 5 where the combination of the display and the game pieces include the electronic means for determining the location of a game piece with respect to the logical locations of a game board overlay.

7. The system of claim 6 where the combined electronic means includes any of light emitting components and light detecting components.

8. The system of claim 1 further comprising:
   a visualization game device for providing an augmented view to a gamer, and
   where any of the one or more computing devices is further adapted to communicate with the visualization game device, where the further adapted computing device provides visualization information to the visualization game device, and where the visualization game device at least in part uses the visualization information to cause a change that is perceived by the viewer as an augmentation.

9. The system of claim 8 where the visualization game device is a magnifying glass or glasses.

10. The system of claim 1 further comprising:
    an audio game device for providing audio output, and
    where any of the one or more computing devices is further adapted to communicate with the audio game device, where the further adapted computing device provides audio information to the audio game device, and where the audio game device at least in part uses the audio information to output any one of, or any combination of public audio or private audio.

11. The system of claim 1 where any of the one or more computing devices determines visual output as unique game output and where the visual output includes any of public visual messages or private visual messages.

12. The system of claim 1 further comprising:
a game board overlay database comprising game board overlay information for describing features including any one of, or any combination of visual features, logical locations or the identity of a game board overlay, and
where the game board overlay is printed based at least in part upon any of game board overlay information.

13. The system of claim 1 further comprising:
a remote game content database comprising game content information for output as unique game output by any of the one or more of the computing devices, where the outputting computing device is in remote communications with the game content database over the internet, and where the outputting computing device retrieves at least one game content information for output from the content database.

14. The system of claim 1 where at least one determined location of a game piece is used at least in part to determine an on-going game state, and where the unique game output is determined at least in part upon the on-going game state.

15. The system of claim 1 where a combination of at least one game piece, at least one game board overlay, at least one game board, and at least one computing device comprise a local game system for use by at least one gamer, further comprising:
a remote game content database comprising game content information for output as unique game output by any of the one or more of the computing devices associated with a local game system, where the outputting computing device is in remote communications with the game content database over the internet;
two or more local game systems in remote communication with the game content database, and
where the unique game output of a computing device being used in a first local game system is based at least in part upon the determined location of a game piece being used in a second local game system.

16. The system of claim 15 where the remote game content database is at least in part maintained on a gaming entity computing system that is networked to the local game systems, further comprising:
an ongoing multi-game-state database for tracking the on-going game-states of the two or more local game systems, where the ongoing multi-game-state database is at least in part maintained on the gaming entity computing system, and
where at least one determined location of a game piece in any first local game system is used at least in part to determine the on-going multi-game state, and where at least one unique game output provided by any of a second local game systems is determined at least in part based upon the on-going multi-game state.

17. A physical-virtual gaming system, comprising:
one or more active game pieces where an active game piece emits an active signal, receives responses to the emitted active signal, and communicates with a computer application running on a computing system or device, and where each active game piece comprises a unique ID;
one or more passive game board overlays comprising one or more logical locations over which an active game piece can be placed in accordance with an on-going game, where each game overlay comprises a unique ID for associating with logical layout digital information describing the layout of logical locations associated with the overlay;
one or more passive game board bases comprising one or more physical locations, where each game base comprises a unique ID for associating with physical layout digital information describing the layout of physical locations associated with the game base, where each physical location comprises passive electronic means for responding to an active signal emitted by an active game piece;
one or more computer applications running on one or more computing systems or devices, where the one or more computer applications receive or determine the game overlay ID and based at least in part upon the game overlay ID retrieves the associated logical layout digital information, where the one or more computer applications receive or determine the game base ID and based at least in part upon the game base ID retrieves the associated physical layout digital information, where at least one of the one or more computing systems or devices is in communications with the active electronic means of a given active game piece, where at least one of the one or more computer applications determines the unique identity of the given game piece and the current logical location over which the given game piece is substantially located, and where the determination of the current logical location is based at least in part upon communications with the active electronic means, the logical layout digital information and the physical layout digital information, and
providing a unique sensory output to a gamer in accordance with the on-going game, where the determination of the unique sensory output is based at least in part upon a determined current logical location of a uniquely identified game piece.

18. The system of claim 17, further adapted to comprise means for:
providing a player with a customized visual experience in accordance with the on-going game, where the customized visual experience is any one of, or any combination of an augmented visual experience or a secret visual message, and where the determination of the customized visual experience is based at least in part upon any one of, or any combination of a determined logical location of a uniquely identified game piece or an on-going game state.

19. The system of claim 17, further adapted to comprise means for:
providing a player with a customized audio experience in accordance with the on-going game, where the customized audio experience is any one of, or any combination of a public audio message or a private audio message, and where the determination of the customized audio experience is based at least in part upon any one of, or any combination of a determined logical location of a uniquely identified game piece or an on-going game state.

20. The system of claim 17, further adapted to comprise means for:
providing a player with an operable game piece with one or more features that can be controllably altered in accordance with the on-going game, and where the determination of the alteration is based at least in part upon any one of, or any combination of a determined logical location of a uniquely identified game piece or an on-going game state.

21. The system of claim 17, further adapted to comprise means for:
   providing a player with the ability to alter at least one aspect of game play by uniquely coloring at least one location on a game board overlay.

22. The system of claim 17, further adapted to comprise means for:
   providing a player with the ability to alter at least one aspect of game play by placing a detectable game card onto the passive game board overlay.

23. The system of claim 17, wherein one game overlay with one set of logical locations is used to overlay two or more game boards each comprising a set of physical locations, or wherein two or more game overlays each comprising a set of logical locations are overlaid upon one game board comprising a set of physical locations, and where the computer application is further adapted to correlate logical locations with physical locations when the number of game overlays does not match the number of game boards.

* * * * *